(12) United States Patent
Stearns et al.

(10) Patent No.: US 11,863,117 B2
(45) Date of Patent: *Jan. 2, 2024

(54) HEIGHT ADJUSTMENT BRACKET FOR ROOF APPLICATIONS

(71) Applicant: EcoFasten Solar, LLC, Phoenix, AZ (US)

(72) Inventors: Brian Cecil Stearns, Tucson, AZ (US); Alexander Grant Bornemann, Burlington, VT (US)

(73) Assignee: EcoFasten Solar, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,572

(22) Filed: Feb. 3, 2021

(65) Prior Publication Data
US 2021/0167720 A1    Jun. 3, 2021

Related U.S. Application Data

(63) Continuation of application No. 17/122,817, filed on Dec. 15, 2020, now Pat. No. 11,374,531, which is a
(Continued)

(51) Int. Cl.
*H02S 20/23*    (2014.01)
*F24S 25/632*    (2018.01)
(Continued)

(52) U.S. Cl.
CPC ............ *H02S 20/23* (2014.12); *F16M 13/02* (2013.01); *F24S 25/632* (2018.05);
(Continued)

(58) Field of Classification Search
CPC ........ H02S 20/23; F24J 2/5203; F24J 2/5256; F24J 2002/4663; F24J 2/5254; F24J 2/5264; F24J 2/5258; F24J 2/5207
See application file for complete search history.

(56) References Cited

U.S. PATENT DOCUMENTS 4,321,745 A * 3/1982 Ford .................. E04D 13/1407
29/525.04
4,558,544 A * 12/1985 Albrecht ............. E04F 15/0247
52/126.1
(Continued)

FOREIGN PATENT DOCUMENTS

DE        10062697       6/2006
DE     102005002828      8/2006
(Continued)

OTHER PUBLICATIONS

Non-Final Office Action from the United States Patent and Trademark Office for U.S. Appl. No. 14/928,235 dated Mar. 1, 2016 (6 pages).
(Continued)

*Primary Examiner* — Gisele D Ford
(74) *Attorney, Agent, or Firm* — KW Law, LLP

(57) ABSTRACT

A roof mount system supports a solar panel above a roof and includes a base positioned on the roof and a first fastener connected to the base and extending away from the roof and moveable along the base in a direction generally parallel to the roof. A first clamp supports a bottom surface of a solar panel frame and adjusts the height of the solar panel above the roof by moving the first clamp along a first fastener in a direction perpendicular to the roof. A second clamp is connected to a second fastener and moves with respect to the first clamp perpendicular to the roof. The solar panel is clamped between the first clamp and the second clamp portion. A protrusion extends from the first or second clamp to form an electrical bond between the solar panel frame and the respective first or second clamp.

8 Claims, 44 Drawing Sheets

Related U.S. Application Data continuation of application No. 16/836,636, filed on Mar. 31, 2020, now Pat. No. 10,897,223, which is a continuation of application No. 16/022,691, filed on Jun. 29, 2018, now Pat. No. 10,644,643, which is a continuation-in-part of application No. 15/990,752, filed on May 28, 2018, now Pat. No. 10,476,425, and a continuation of application No. 15/236,175, filed on Aug. 12, 2016, now Pat. No. 10,014,818, which is a continuation of application No. 14/928,235, filed on Oct. 30, 2015, now Pat. No. 9,431,953, said application No. 15/990,752 is a continuation of application No. 14/680,226, filed on Apr. 7, 2015, now Pat. No. 9,985,575.

(60) Provisional application No. 62/238,517, filed on Oct. 7, 2015, provisional application No. 62/134,205, filed on Mar. 17, 2015, provisional application No. 62/131,480, filed on Mar. 11, 2015, provisional application No. 62/106,406, filed on Jan. 22, 2015, provisional application No. 62/106,410, filed on Jan. 22, 2015, provisional application No. 62/106,282, filed on Jan. 22, 2015, provisional application No. 62/073,867, filed on Oct. 31, 2014, provisional application No. 61/976,448, filed on Apr. 7, 2014.

(51) Int. Cl.
*F24S 25/636* (2018.01)
*H02S 30/10* (2014.01)
*F16M 13/02* (2006.01)

(52) U.S. Cl.
CPC ............ *F24S 25/636* (2018.05); *H02S 30/10* (2014.12); *Y02B 10/10* (2013.01); *Y02B 10/20* (2013.01); *Y02E 10/47* (2013.01)

(56) References Cited

U.S. PATENT DOCUMENTS

| | | | | |
|---|---|---|---|---|
| 4,744,187 A * | 5/1988 | Tripp | E04D 5/143 | 52/410 |
| 4,796,403 A * | 1/1989 | Fulton | E04D 3/362 | 52/478 |
| 5,094,056 A * | 3/1992 | Peters | E04D 5/143 | 24/459 |
| 5,274,978 A * | 1/1994 | Perkonigg | F24S 25/60 | 52/547 |
| 5,333,423 A * | 8/1994 | Propst | E04F 15/02476 | 248/188 |
| 5,479,745 A * | 1/1996 | Kawai | E04F 15/02464 | 52/126.1 |
| 5,501,754 A * | 3/1996 | Hiraguri | E04F 15/02452 | 156/71 |
| 5,595,366 A * | 1/1997 | Cusimano | E02D 27/34 | 248/354.3 |
| 5,791,096 A * | 8/1998 | Chen | E04F 15/02458 | 52/126.6 |
| 5,862,635 A * | 1/1999 | Linse | E04H 9/14 | 52/126.6 |
| 6,024,330 A * | 2/2000 | Mroz | F16M 7/00 | 248/188.4 |
| 6,360,491 B1 * | 3/2002 | Ullman | F24S 25/33 | 52/22 |
| 6,442,906 B1 * | 9/2002 | Hwang | E04F 15/0247 | 248/188.4 |
| 6,453,623 B1 * | 9/2002 | Nelson | E04D 13/10 | 411/432 |
| 6,536,729 B1 * | 3/2003 | Haddock | E04B 1/66 | 248/200 |
| 6,672,018 B2 | 1/2004 | Shingleton | | |
| 6,772,564 B2 * | 8/2004 | Leon | E04F 15/024 | 52/126.5 |
| 7,001,098 B2 * | 2/2006 | Lin | F16B 9/052 | 403/408.1 |
| 7,174,677 B1 * | 2/2007 | Dressler | E04D 13/10 | 52/24 |
| 7,592,537 B1 * | 9/2009 | West | H02S 20/23 | 136/251 |
| 7,600,349 B2 | 10/2009 | Liebendorfer | | |
| 7,857,269 B2 | 12/2010 | Plaisted et al. | | |
| 8,109,048 B2 * | 2/2012 | West | F24S 25/20 | 52/173.3 |
| 8,122,648 B1 * | 2/2012 | Liu | F24S 25/613 | 52/58 |
| 8,146,299 B2 | 4/2012 | Stearns et al. | | |
| 8,151,522 B2 | 4/2012 | Stearns et al. | | |
| 8,153,700 B2 | 4/2012 | Stearns et al. | | |
| 8,166,713 B2 | 5/2012 | Stearns et al. | | |
| 8,166,720 B2 * | 5/2012 | Garrigus | E04D 5/145 | 52/410 |
| 8,177,180 B2 | 5/2012 | Plaisted et al. | | |
| 8,181,398 B2 | 5/2012 | Stearns et al. | | |
| 8,209,914 B2 | 7/2012 | Stearns et al. | | |
| 8,225,557 B2 | 7/2012 | Stearns et al. | | |
| 8,245,454 B2 | 8/2012 | Stearns et al. | | |
| 8,272,174 B2 | 9/2012 | Stearns et al. | | |
| 8,328,149 B2 * | 12/2012 | McLaughlin | A47B 91/024 | 248/188.4 |
| 8,375,654 B1 | 2/2013 | West et al. | | |
| 8,397,443 B2 | 3/2013 | Blom et al. | | |
| 8,413,388 B2 | 4/2013 | Stearns et al. | | |
| 8,505,864 B1 * | 8/2013 | Taylor | F24S 25/636 | 248/237 |
| 8,584,406 B2 * | 11/2013 | Wexler | H02S 20/00 | 52/173.3 |
| 8,627,617 B2 * | 1/2014 | Haddock | H02S 20/23 | 52/173.3 |
| 8,683,761 B2 * | 4/2014 | Danning | F24S 25/636 | 52/173.3 |
| 8,733,037 B2 | 5/2014 | Bindschedler et al. | | |
| 8,756,881 B2 * | 6/2014 | West | F24S 25/33 | 52/173.3 |
| 8,806,813 B2 * | 8/2014 | Plaisted | F24S 25/35 | 52/173.3 |
| 8,833,714 B2 * | 9/2014 | Haddock | H02S 20/22 | 248/237 |
| 8,857,113 B2 * | 10/2014 | Zhang | F24S 25/33 | 52/173.3 |
| 8,875,455 B1 * | 11/2014 | Yang | F24S 25/70 | 52/173.3 |
| 8,925,263 B2 * | 1/2015 | Haddock | F16B 2/065 | 52/173.3 |
| 8,938,932 B1 * | 1/2015 | Wentworth | H02S 20/23 | 52/747.1 |
| 8,943,765 B2 | 2/2015 | Danning et al. | | |
| 8,946,540 B1 * | 2/2015 | West | H01L 31/042 | 136/244 |
| 8,955,267 B2 | 2/2015 | Wexler et al. | | |
| 8,984,819 B1 | 3/2015 | Yang et al. | | |
| 8,991,114 B2 | 3/2015 | West | | |
| 9,003,729 B2 | 4/2015 | West et al. | | |
| 9,010,040 B2 * | 4/2015 | Damo | F24S 80/45 | 52/173.3 |
| 9,010,041 B2 * | 4/2015 | Danning | F16B 5/004 | 52/173.3 |
| 9,062,897 B2 | 6/2015 | West et al. | | |
| 9,080,792 B2 * | 7/2015 | Patton | F24S 25/61 | |
| 9,097,441 B2 | 8/2015 | West et al. | | |
| 9,109,371 B2 | 8/2015 | Hudson et al. | | |
| 9,121,545 B2 * | 9/2015 | Stanley | F24S 25/70 | |
| 9,154,074 B2 | 10/2015 | West et al. | | |
| 9,166,524 B2 | 10/2015 | West et al. | | |
| 9,231,517 B2 | 1/2016 | West et al. | | |
| 2002/0046506 A1 | 4/2002 | Ullman | | |
| 2003/0070368 A1 * | 4/2003 | Shingleton | H02S 20/23 | 52/173.3 |

(56) References Cited

U.S. PATENT DOCUMENTS

| | | | |
|---|---|---|---|
| 2004/0163338 A1* | 8/2004 | Liebendorfer | F24S 25/20 52/173.1 |
| 2006/0010786 A1* | 1/2006 | Rogers | E04D 13/10 52/26 |
| 2006/0053706 A1* | 3/2006 | Russell | H02S 20/23 52/173.3 |
| 2006/0086382 A1* | 4/2006 | Plaisted | H02S 20/23 136/244 |
| 2006/0260670 A1* | 11/2006 | Terunuma | F24S 25/30 136/244 |
| 2007/0245636 A1* | 10/2007 | Ayer | E04D 13/10 52/24 |
| 2008/0053008 A1* | 3/2008 | Ohkoshi | F24S 25/33 52/173.1 |
| 2008/0121273 A1* | 5/2008 | Plaisted | F16L 3/127 136/251 |
| 2008/0250614 A1* | 10/2008 | Zante | F16B 5/0657 24/542 |
| 2009/0194098 A1* | 8/2009 | Placer | F24S 80/40 126/704 |
| 2009/0282755 A1* | 11/2009 | Abbott | F24S 25/65 52/173.3 |
| 2009/0309388 A1* | 12/2009 | Ellison | B60R 13/04 296/191 |
| 2010/0236155 A1* | 9/2010 | Lanza | F24S 25/613 52/58 |
| 2010/0307074 A1* | 12/2010 | Stearns | H02S 20/23 52/173.1 |
| 2011/0000519 A1 | 1/2011 | West | |
| 2011/0000520 A1 | 1/2011 | West | |
| 2011/0000526 A1 | 1/2011 | West | |
| 2011/0000544 A1* | 1/2011 | West | F24S 25/16 136/259 |
| 2011/0001030 A1* | 1/2011 | Hochreiter | F24S 25/636 248/316.1 |
| 2011/0154750 A1* | 6/2011 | Welter | F24S 20/67 52/173.3 |
| 2011/0214365 A1* | 9/2011 | Aftanas | F24S 25/636 52/173.3 |
| 2011/0239546 A1* | 10/2011 | Tsuzuki | F24S 40/44 52/11 |
| 2011/0260027 A1* | 10/2011 | Farnham, Jr. | F24S 25/636 248/309.1 |
| 2011/0277402 A1* | 11/2011 | Schnitzer | F24S 25/636 52/173.3 |
| 2011/0302857 A1* | 12/2011 | McClellan | F24S 25/35 52/173.3 |
| 2011/0302859 A1* | 12/2011 | Crasnianski | F24S 40/44 52/173.3 |
| 2012/0017526 A1* | 1/2012 | Eide | H02S 20/00 52/173.3 |
| 2012/0023843 A1* | 2/2012 | Stearns | F24S 25/61 52/173.3 |
| 2012/0073219 A1* | 3/2012 | Zuritis | F24S 25/61 52/173.3 |
| 2012/0073220 A1* | 3/2012 | Kobayashi | H02S 20/23 52/173.3 |
| 2012/0079781 A1* | 4/2012 | Koller | F24S 25/35 52/173.3 |
| 2012/0102853 A1* | 5/2012 | Rizzo | F24S 25/636 52/173.3 |
| 2012/0125410 A1* | 5/2012 | West | F24S 25/632 136/251 |
| 2012/0138764 A1* | 6/2012 | Kemple | F24S 80/70 248/316.1 |
| 2012/0144760 A1* | 6/2012 | Schaefer | E04D 13/0404 52/58 |
| 2012/0152326 A1* | 6/2012 | West | F24S 25/632 136/251 |
| 2012/0192926 A1* | 8/2012 | Kambara | H02S 20/23 136/251 |
| 2012/0233958 A1* | 9/2012 | Stearns | E04G 21/328 52/708 |
| 2012/0234378 A1* | 9/2012 | West | F24S 25/636 136/251 |
| 2012/0240484 A1* | 9/2012 | Blom | E04F 15/02044 52/126.7 |
| 2012/0255598 A1 | 10/2012 | West | |
| 2012/0260972 A1 | 10/2012 | West et al. | |
| 2012/0266946 A1 | 10/2012 | West et al. | |
| 2012/0279558 A1 | 11/2012 | West et al. | |
| 2012/0298186 A1 | 11/2012 | West | |
| 2012/0298188 A1* | 11/2012 | West | F24S 25/632 136/251 |
| 2012/0298817 A1* | 11/2012 | West | F24S 25/70 248/220.22 |
| 2012/0301661 A1* | 11/2012 | West | F24S 25/632 428/99 |
| 2013/0008102 A1* | 1/2013 | Bindschedler | E04D 11/007 52/173.3 |
| 2013/0009025 A1* | 1/2013 | Stearns | G09F 7/18 248/237 |
| 2013/0074441 A1* | 3/2013 | Stearns | E04D 13/10 52/705 |
| 2013/0091786 A1* | 4/2013 | DuPont | F24S 25/615 52/173.3 |
| 2013/0104471 A1* | 5/2013 | Kobayashi | F24S 25/632 52/173.3 |
| 2013/0125492 A1* | 5/2013 | Molek | F24S 25/634 52/489.1 |
| 2013/0140416 A1* | 6/2013 | West | F16B 1/00 248/222.11 |
| 2013/0180572 A1 | 7/2013 | West | |
| 2013/0180573 A1 | 7/2013 | West | |
| 2013/0180574 A1 | 7/2013 | West et al. | |
| 2013/0183084 A1 | 7/2013 | West et al. | |
| 2013/0192150 A1* | 8/2013 | DuPont | F24S 25/634 52/173.3 |
| 2013/0284239 A1* | 10/2013 | Mun | H01L 31/042 136/251 |
| 2013/0291479 A1* | 11/2013 | Schaefer | H02S 20/23 52/745.21 |
| 2013/0333305 A1* | 12/2013 | Stearns | E04D 13/10 52/24 |
| 2013/0333310 A1* | 12/2013 | Damo | F24S 20/67 52/173.3 |
| 2013/0340811 A1* | 12/2013 | Danning | F24S 25/20 136/251 |
| 2014/0026946 A1* | 1/2014 | West | H02S 20/00 136/251 |
| 2014/0041321 A1* | 2/2014 | Poivet | F24S 40/44 52/173.3 |
| 2014/0042286 A1* | 2/2014 | Jaffari | F16B 2/065 248/316.4 |
| 2014/0053891 A1* | 2/2014 | West | F24S 25/70 136/251 |
| 2014/0102997 A1* | 4/2014 | West | H02S 30/10 211/41.1 |
| 2014/0109496 A1* | 4/2014 | Stapleton | E04D 3/365 52/173.3 |
| 2014/0130847 A1* | 5/2014 | West | F24S 25/67 136/251 |
| 2014/0137489 A1* | 5/2014 | Habdank | F24S 25/615 52/173.3 |
| 2014/0158184 A1* | 6/2014 | West | H01L 31/048 136/251 |
| 2014/0174511 A1* | 6/2014 | West | H02S 20/10 136/251 |
| 2014/0175244 A1* | 6/2014 | West | F24S 25/70 52/555 |
| 2014/0182662 A1* | 7/2014 | West | F24S 25/61 136/251 |
| 2014/0223838 A1 | 8/2014 | West et al. | |
| 2014/0246549 A1* | 9/2014 | West | H02S 20/32 248/220.22 |
| 2014/0251431 A1 | 9/2014 | West et al. | |

(56) References Cited

U.S. PATENT DOCUMENTS

| | | | | |
|---|---|---|---|---|
| 2014/0252288 | A1* | 9/2014 | Stearns | H02S 40/12 256/12.5 |
| 2014/0299179 | A1* | 10/2014 | West | H02S 20/23 136/251 |
| 2014/0305046 | A1* | 10/2014 | Stearns | E04D 3/36 52/58 |
| 2014/0326838 | A1* | 11/2014 | West | F24S 25/632 248/74.2 |
| 2014/0331572 | A1* | 11/2014 | Singelyn, Jr. | E04B 7/028 52/173.3 |
| 2014/0339179 | A1* | 11/2014 | West | H02S 30/10 211/41.1 |
| 2014/0353435 | A1* | 12/2014 | Liu | F16L 3/06 248/74.1 |
| 2014/0360558 | A1* | 12/2014 | West | F24S 80/40 136/251 |
| 2015/0013756 | A1 | 1/2015 | West et al. | |
| 2015/0033658 | A1 | 2/2015 | West et al. | |
| 2015/0040965 | A1* | 2/2015 | West | F24S 25/63 136/246 |
| 2015/0040967 | A1* | 2/2015 | West | H02S 20/24 136/251 |
| 2015/0041251 | A1* | 2/2015 | Hudson | E04G 3/26 182/45 |
| 2015/0068590 | A1 | 3/2015 | West et al. | |
| 2015/0069198 | A1 | 3/2015 | West et al. | |
| 2015/0075100 | A1* | 3/2015 | West | E04B 1/665 52/506.05 |
| 2015/0075589 | A1* | 3/2015 | West | H02S 20/30 136/251 |
| 2015/0075590 | A1 | 3/2015 | West et al. | |
| 2015/0107168 | A1* | 4/2015 | Kobayashi | F24S 25/70 52/173.3 |
| 2015/0129517 | A1* | 5/2015 | Wildes | F24S 25/61 211/41.1 |
| 2015/0155820 | A1 | 6/2015 | West | |
| 2015/0155821 | A1 | 6/2015 | West | |
| 2015/0155823 | A1 | 6/2015 | West et al. | |
| 2015/0168021 | A1 | 6/2015 | Wentworth et al. | |
| 2015/0180405 | A1 | 6/2015 | West et al. | |
| 2015/0200618 | A9 | 7/2015 | West et al. | |
| 2015/0204372 | A1* | 7/2015 | West | F24S 25/61 411/85 |
| 2015/0218822 | A1* | 8/2015 | Blazley | E04D 3/18 52/173.3 |
| 2015/0222221 | A1 | 8/2015 | West | |
| 2015/0222222 | A1 | 8/2015 | West | |
| 2015/0222225 | A1 | 8/2015 | Danning | |
| 2015/0249423 | A1* | 9/2015 | Braunstein | F16B 2/065 52/173.3 |
| 2015/0280639 | A1* | 10/2015 | Atchley | H02S 20/23 248/237 |
| 2015/0288320 | A1* | 10/2015 | Stearns | H02S 20/23 52/173.3 |
| 2015/0303865 | A1 | 10/2015 | West et al. | |
| 2015/0316292 | A1 | 11/2015 | West | |

FOREIGN PATENT DOCUMENTS

| | | |
|---|---|---|
| DE | 102005039495 | 3/2007 |
| DE | 102005059487 | 7/2007 |
| DE | 102006022870 | 9/2007 |
| DE | 102007026819 | 12/2007 |
| DE | 102008000293 | 8/2009 |
| DE | 102008012717 | 9/2009 |
| JP | H08296311 | 11/1996 |
| JP | 2642606 | 8/1997 |
| JP | 2931240 | 8/1999 |
| JP | 2972761 | 11/1999 |
| JP | 3041279 | 5/2000 |
| JP | 2000345664 | 12/2000 |
| JP | 2004060358 | 2/2004 |
| JP | 4041805 | 2/2008 |
| JP | 2008127866 | 6/2008 |
| JP | 4382143 | 12/2009 |
| JP | 2010209515 | 12/2009 |
| JP | 2010242367 | 10/2010 |
| JP | 2011006864 | 1/2011 |
| JP | 2011106188 | 6/2011 |
| WO | 2007093421 | 8/2007 |
| WO | 2012125327 | 9/2012 |
| WO | 2013009375 | 1/2013 |
| WO | 2013043816 | 3/2013 |
| WO | 2015020817 | 2/2015 |
| WO | 2015023526 | 2/2015 |
| WO | 2015039007 | 3/2015 |
| WO | 2015042260 | 3/2015 |
| WO | 2015112461 | 7/2015 |
| WO | 2015160644 | 10/2015 |
| WO | 2015183971 | 12/2015 |

OTHER PUBLICATIONS

Notice of Allowance from the United States Patent and Trademark Office for U.S. Appl. No. 14/928,235 dated May 5, 2016 (8 pages).
Non-Final Office Action from the United States Patent and Trademark Office for U.S. Appl. No. 14/680,226 dated Jan. 15, 2016 (9 pages).
Non-Final Office Action from the United States Patent and Trademark Office for U.S. Appl. No. 14/680,226 dated Jun. 14, 2016 (10 pages).
Final Office Action from the United States Patent and Trademark Office for U.S. Appl. No. 14/680,226 dated Dec. 15, 2016 (12 pages).
Non-Final Office Action from the United States Patent and Trademark Office for U.S. Appl. No. 15/286,000 dated Aug. 18, 2017 (11 pages).
Final Office Action for from the United States Patent and Trademark Office for U.S. Appl. No. 15/286,000 dated Oct. 30, 2017 (10 pages).
Non-Final Office Action from the United States Patent and Trademark Office for U.S. Appl. No. 15/236,175 dated Aug. 15, 2017.
Final Office Action from the United States Patent and Trademark Office for U.S. Appl. No. 15/236,175 dated Dec. 12, 2017 (9 pages).
Notice of Allowance from the United States Patent and Trademark Office for U.S. Appl. No. 15/236,175 dated Mar. 2, 2018 (8 pages).
Notice of Allowance from the United States Patent and Trademark Office for U.S. Appl. No. 14/680,226 dated Jan. 24, 2018 (6 pages).
Office Action from the United States Patent and Trademark Office for U.S. Appl. No. 15/286,000 dated Mar. 2, 2018 (9 pages).
Notice of Allowance from the United States Patent and Trademark Office for U.S. Appl. No. 14/680,226 dated Mar. 19, 2018 (4 pages).
U.S. Appl. No. 61/195,780, filed Oct. 11, 2008.
U.S. Appl. No. 61/208,323, filed Feb. 23, 2009.
U.S. Appl. No. 61/214,857, filed Apr. 28, 2009.
Notice of Allowance from the United States Patent and Trademark Office for U.S. Appl. No. 15/286,000 dated Jul. 25, 2018 (5 pages).
Notice of Allowance from the United States Patent and Trademark Office for U.S. Appl. No. 15/990,752 dated Jul. 11, 2019 (10 pages).
Notice of Allowance from the United States Patent and Trademark Office for U.S. Appl. No. 16/022,691 dated Jan. 7, 2020 (7 pages).
Final Office Action from the United States Patent and Trademark Office for U.S. Appl. No. 15/990,752 dated Oct. 11, 2018 (9 pages).
Final Office Action from the United States Patent and Trademark Office for U.S. Appl. No. 16/022,691 dated Sep. 20, 2019 (7 pages).
Non Final Office Action from the United States Patent and Trademark Office for U.S. Appl. No. 16/022,691 dated Apr. 16, 2019 (7 pages).
Notice of Allowance from the United States Patent and Trademark Office for U.S. Appl. No. 16/836,636 dated Dec. 11, 2020 (7 pages).
Non Final Office Action from the United States Patent and Trademark Office for U.S. Appl. No. 17/403,490 dated Nov. 23, 2021 (5 pages).
Notice of Allowance from the United States Patent and Trademark Office for U.S. Appl. No. 17/122,817 dated Mar. 10, 2022 (7 pages).

(56) References Cited

OTHER PUBLICATIONS

Non Final Office Action from the United States Patent and Trademark Office for U.S. Appl. No. 17/122,817 dated Oct. 18, 2021 (6 pages).
Notice of Allowance from the United States Patent and Trademark Office for U.S. Appl. No. 17/403,490 dated Aug. 3, 2022 (5 pages).
Final Office Action from the United States Patent and Trademark Office for U.S. Appl. No. 17/403,490 dated Mar. 11, 2022 (6 pages).

* cited by examiner

HEIGHT ADJUSTMENT BRACKET FOR ROOF APPLICATIONS

CROSS-REFERENCES TO RELATED APPLICATIONS

The present application is a continuation of U.S. patent application Ser. No. 17/122,817 filed on Dec. 15, 2020 and issued as U.S. Pat. No. 11,374,531, which is a continuation of U.S. patent application Ser. No. 16/836,636 filed on Mar. 31, 2020 and issued as U.S. Pat. No. 10,897,223, which is a continuation of U.S. patent application Ser. No. 16/022,691 filed on Jun. 29, 2018 and issued as U.S. Pat. No. 10,644,643, which is a continuation of U.S. patent application Ser. No. 15/236,175, filed on Aug. 12, 2016 issued as U.S. Pat. No. 10,014,818, which is a continuation of U.S. patent application Ser. No. 14/928,235, filed on Oct. 30, 2015 issued as U.S. Pat. No. 9,431,953, which claims the benefit of and priority to U.S. Provisional Patent Application No. 62/238,517, filed Oct. 7, 2015, and to U.S. Provisional Patent Application No. 62/134,205, filed Mar. 17, 2015, and to U.S. Provisional Patent Application No. 62/131,480, filed Mar. 11, 2015, and to U.S. Provisional Patent Application No. 62/106,410, filed Jan. 22, 2015, and to U.S. Provisional Patent Application No. 62/106,406, filed Jan. 22, 2015, and to U.S. Provisional Patent Application No. 62/106,282, filed Jan. 22, 2015, and to U.S. Provisional Patent Application No. 62/073,867, filed Oct. 31, 2014, the entire contents of each are hereby incorporated by reference herein in their entirety for any purpose.

The present application is a continuation of U.S. patent application Ser. No. 17/122,817 filed on Dec. 15, 2020 and issued as U.S. Pat. No. 11,374,531, which is a continuation of U.S. patent application Ser. No. 16/836,636 filed on Mar. 31, 2020 and issued as U.S. Pat. No. 10,897,223 which is a continuation of U.S. patent application Ser. No. 16/022,691 filed on Jun. 29, 2018 and issued as U.S. Pat. No. 10,644,643, which is a continuation in part of U.S. patent application Ser. No. 15/990,752, filed on May 28, 2018 and issued as U.S. Pat. No. 10,476,425, which is a continuation of U.S. patent application Ser. No. 14/680,226, filed on Apr. 7, 2015 issued as U.S. Pat. No. 9,985,575, which claims the benefit of and priority to U.S. Provisional Patent Application No. 62/134,205, filed Mar. 17, 2015, and to U.S. Provisional Patent Application No. 62/131,480, filed Mar. 11, 2015, and to U.S. Provisional Patent Application No. 62/106,410, filed Jan. 22, 2015, and to U.S. Provisional Patent Application No. 62/106,406, filed Jan. 22, 2015, and to U.S. Provisional Patent Application No. 62/106,282, filed Jan. 22, 2015, and to U.S. Provisional Patent Application No. 62/073,867, filed Oct. 31, 2014, and to U.S. Provisional Patent Application No. 61/976,448, filed Apr. 7, 2014 the entire contents of each are hereby incorporated by reference herein in their entirety for any purpose.

BACKGROUND

The present invention relates to a roof mount system for mounting at least one object above a roof surface.

SUMMARY

In some embodiments, the invention provides a roof mount system that supports a solar panel above a roof. The roof mount system includes a base positioned on the roof and a first fastener connected to the base and extending away from the roof. The first fastener moves along the base in a direction generally parallel to the roof. A first clamp portion is connected to the first fastener and moves with respect to the base in a direction perpendicular to the roof. The first clamp includes a first surface that supports a bottom surface of a solar panel frame so that the height of the solar panel above the roof is adjusted by moving the first clamp portion along the first fastener in a direction perpendicular to the roof. A second fastener is connected to the first clamp portion and extends in the perpendicular direction away from the roof. The second clamp portion is connected to the second fastener and moves with respect to the first clamp portion in the perpendicular direction. The second clamp includes a second surface to contact a top surface of the solar panel frame. The solar panel is secured against the first clamp portion by moving the second clamp portion toward the first clamp portion along the second fastener toward the roof.

In some embodiments, the invention provides a roof mount system that supports a solar panel above a roof. The roof mount system includes a base positioned on the roof and a first fastener connected to the base and extending away from the roof. The first fastener moves along the base in a direction generally parallel to the roof. A first clamp portion is connected to the first fastener and moves with respect to the base in a direction perpendicular to the roof. The first clamp includes a first surface that supports a bottom surface of a solar panel frame so that the height of the solar panel above the roof is adjusted by moving the first clamp portion along the first fastener in a direction perpendicular to the roof. A second fastener is connected to the first clamp portion and extends in the perpendicular direction away from the roof. The second clamp portion is connected to the second fastener and moves with respect to the first clamp portion in the perpendicular direction. The second clamp includes a second surface to contact a top surface of the solar panel frame. The solar panel is secured against the first clamp portion by moving the second clamp portion toward the first clamp portion along the second fastener toward the roof. A protrusion extends from one of the first and second clamp portions. The protrusion forms an electrical bond between the solar panel frame and the respective one of the first and second clamp portions.

In some embodiments, the invention provides a method of supporting a solar panel above a roof surface. The method includes positioning a base on the roof surface, extending a first fastener upward from the base away from the roof surface, moving the first fastener along the base in a direction substantially parallel to the roof surface and positioning a first clamp portion on the first fastener at a first distance from the roof surface. The method further includes extending a second fastener upward from the base away from the roof surface, positioning a second clamp portion on the second fastener at a second distance from the roof surface and positioning a solar panel on the first clamp portion of the roof mounted bracket. The method further includes adjusting the first distance to adjust the height of the solar panel off of the roof surface, clamping the solar panel between the first clamp portion and the second clamp portion by decreasing the second distance and electrically bonding the solar panel and at least one of the first clamp portion and the second clamp portion.

Other aspects of the invention will become apparent by consideration of the detailed description and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof areused broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," etc.) are only used to simplify description of embodiments of the present invention and do not alone indicate or imply that the device or element referred to must have a particular orientation. In addition, terms such as "first" and "second" are used herein for purposes of description and are not intended to indicate or imply relative importance or significance.

Figure 1:
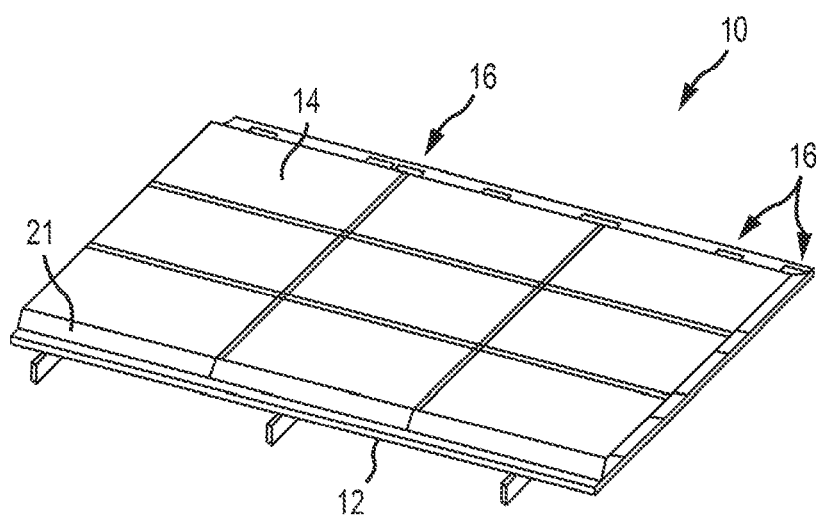
FIG. 1 illustrates a plurality of solar panels coupled to a roof by a plurality of mounting brackets according to some embodiments of the invention.
Figure 2:
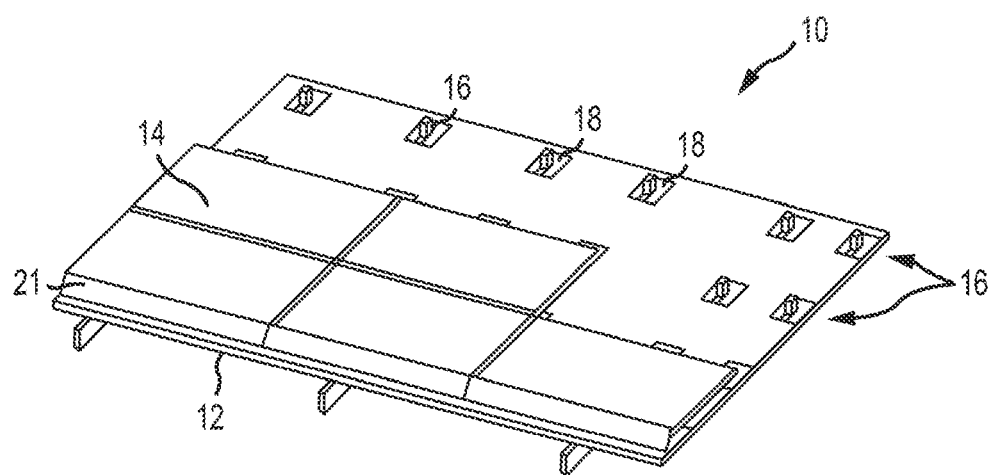
FIG. 2 is a perspective view similar to FIG. 1 with some of the solar panels removed.

FIGS. 1 and 2 illustrate a roof mount system 10 including a roof 12, a plurality of solar panels 14, a plurality of mounting brackets 16, flashing 18 and a skirt 21. The solar panels 14 are mounted to the roof 12 via the plurality of mounting brackets 16. In the illustrated embodiment, the solar panels 14 are orientated in a grid array. The solar panels 14 are coupled to the mounting brackets 16 located in a corresponding grid array on the roof 12. In particular, the mounting brackets 16 are coupled to the solar panels 14 on the periphery of the major (e.g., horizontal) length of the solar panels 14. Furthermore, the mounting brackets 16 are secured to the roof 12 by a roof fastener 20 (shown in FIGS. 9 and 10). In other embodiments, the roof mount system 10 may secure other components to the roof 12 in addition to or in lieu of the solar panels 14.

The illustrated mounting brackets 16 are constructed to connect to a single solar panel 14 to the roof 12 or to connect to a plurality of solar panels 14 to the roof 12. The illustrated mounting brackets 16 can also couple a plurality of solar panels 14 together. In addition, the mounting brackets 16 can support the skirt 21 on the roof 12. The illustrated skirt 21 may extend along the entire length of the solar panels 14 at the bottom of the array of solar panels 14. For example, the skirt 21 is located near a gutter system (not shown) or outer perimeter of the roof 12. The skirt 21 provides a barrier between the ambient environment surrounding the solar panels 14 and the area located between the roof 12 and the solar panels 14. For example, the skirt 21 is utilized to inhibit a substantial pressure differential between the ambient environment and an area under the solar panels 14.

The flashing 18 is positioned between the mounting brackets 16 and the roof 12 to inhibit leakage of fluids (e.g., rain water, snow, etc.) through the roof 12 while providing a structure to which the mounting brackets 16 are securely mounted. The flashing 18 is described in detail in U.S. Pat. No. 8,209,914, issued Jul. 3, 2012, the contents of which are herein incorporated by reference.

With reference to FIGS. 3-10, the mounting brackets 16 include a standoff 30, a first clamp portion 44, a second clamp portion 46 and an adjustment assembly 48. The standoff 30 is coupled to the flashing 18 whereas the first clamp portion 44, the second clamp portion 46 and the adjustment assembly 48 are coupled to the standoff 30.

Figure 3:
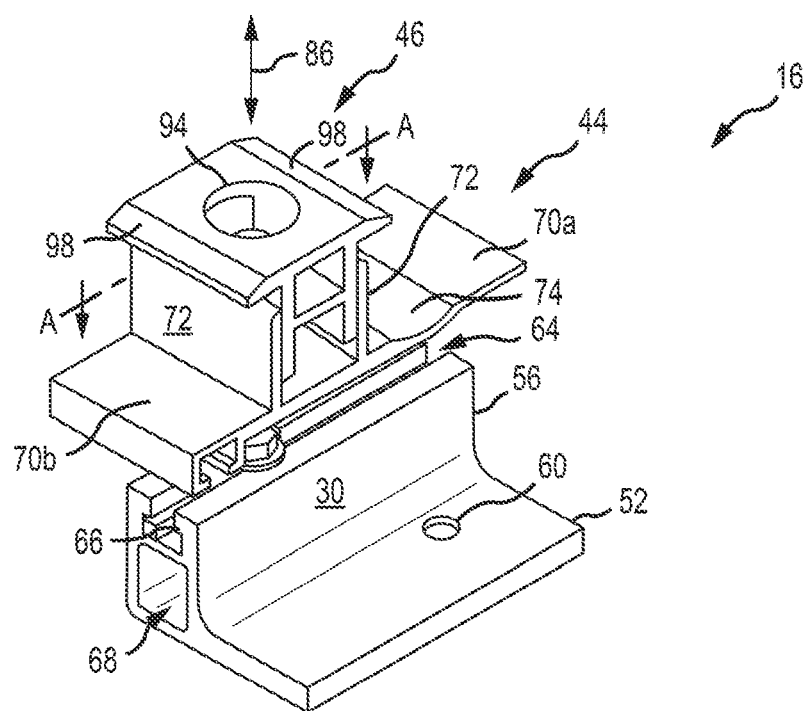
FIG. 3 illustrates a mounting bracket according to some embodiments of the invention.
Figure 4:
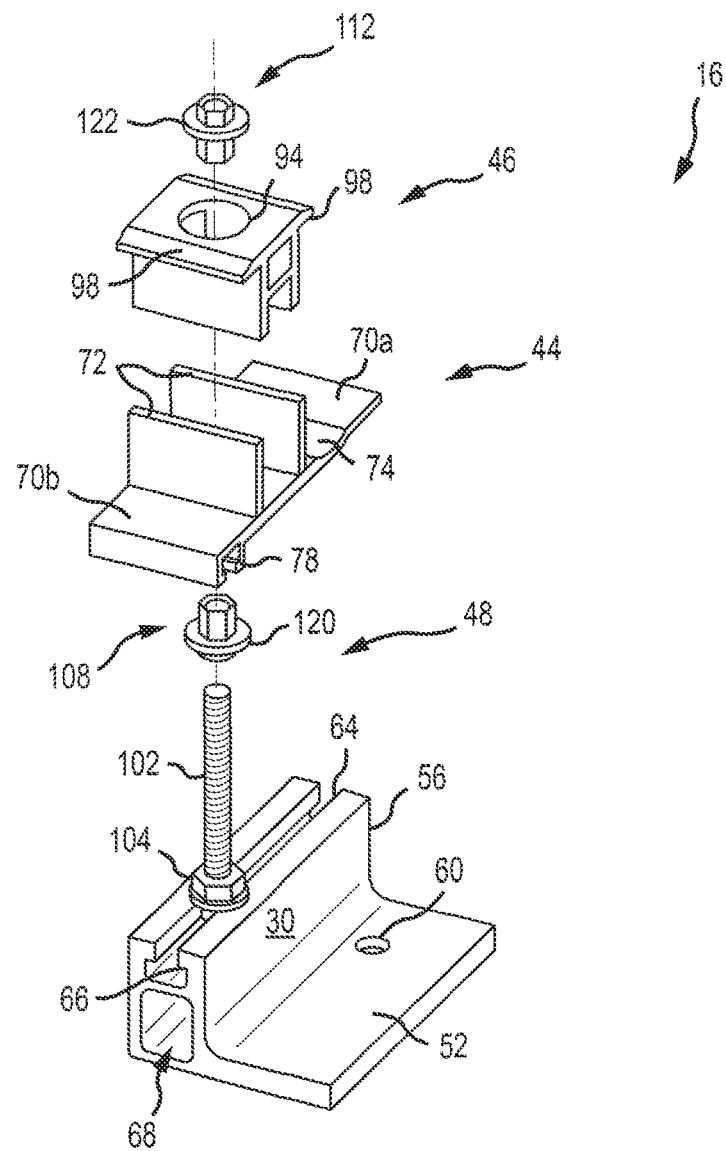
FIG. 4 is an exploded perspective view of the mounting bracket of FIG. 3.
Figure 8:
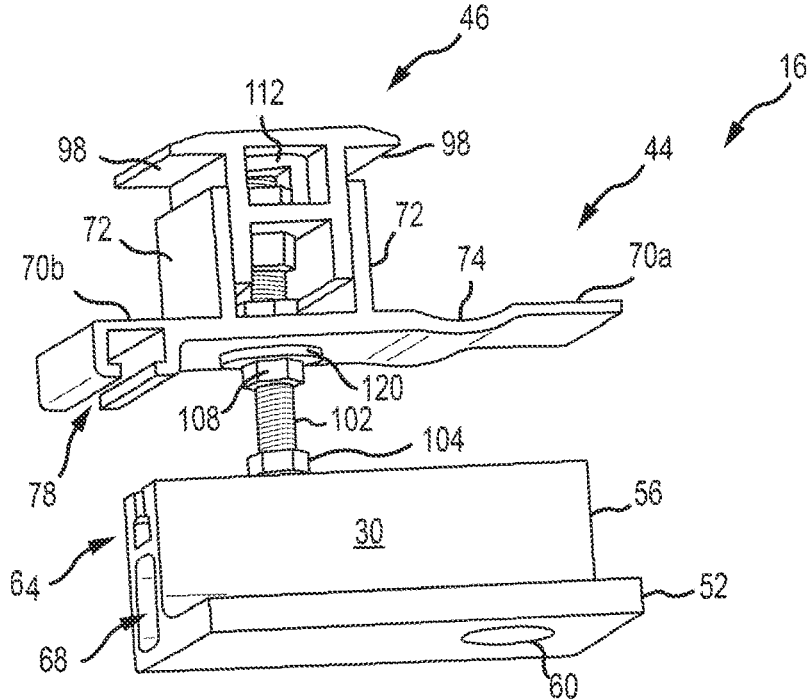
FIG. 8 is another perspective view of the mounting bracket of FIG. 3.

The illustrated standoff 30 generally defines a 90 degree cross sectional construction including a first portion 52 that is substantially parallel with the roof 12, and a second portion 56 that is substantially perpendicular with the roof 12. The illustrated first portion 52 includes a mounting aperture 60 located closer to an edge of the standoff 30 rather than being centered on the standoff 30. The mounting aperture 60 is sized to receive the roof fastener 20 and a portion of the flashing 18. In the illustrated embodiment, the mounting aperture 60 is frustoconically shaped. In other words, a first opening of the mounting aperture 60 that is adjacent the flashing 18 includes a greater diameter than a second opening of the mounting aperture 60 positioned away from the flashing 18 (FIGS. 3 and 8). The second portion 56 includes a channel 64 and a void 68 that both extend the entire length of the standoff 30. The channel 64 generally defines a "T" shaped opening. Ridges 66 extend along both sides of the channel 64 and face downwardly towards the first portion 52. The void 68 is configured to reduce the weight without compromising the structural integrity of the standoff 30. The illustrated standoff 30 is manufactured from a nonferrous material (e.g., aluminum).

Figure 5:
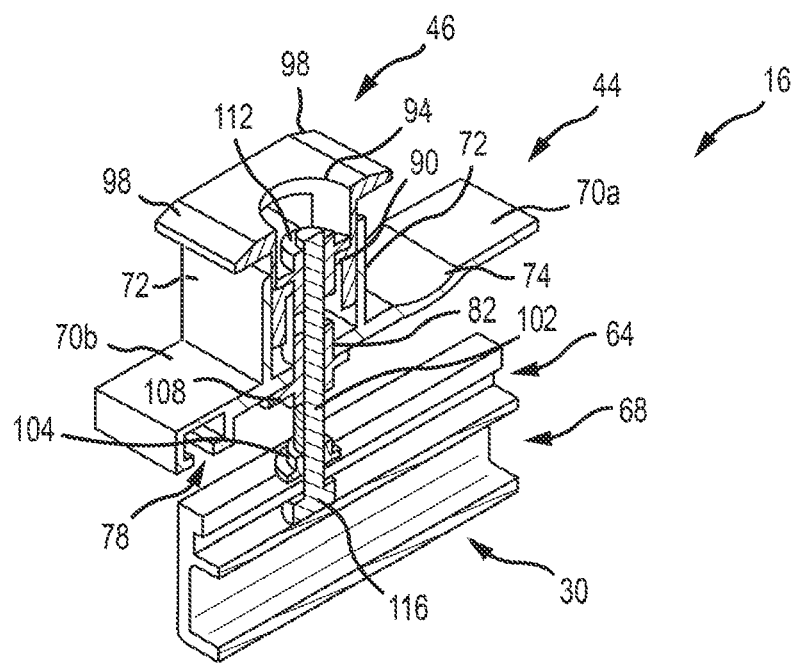
FIG. 5 is a perspective cross sectional view of the mounting bracket taken along line A-A of FIG. 3.
Figure 6:
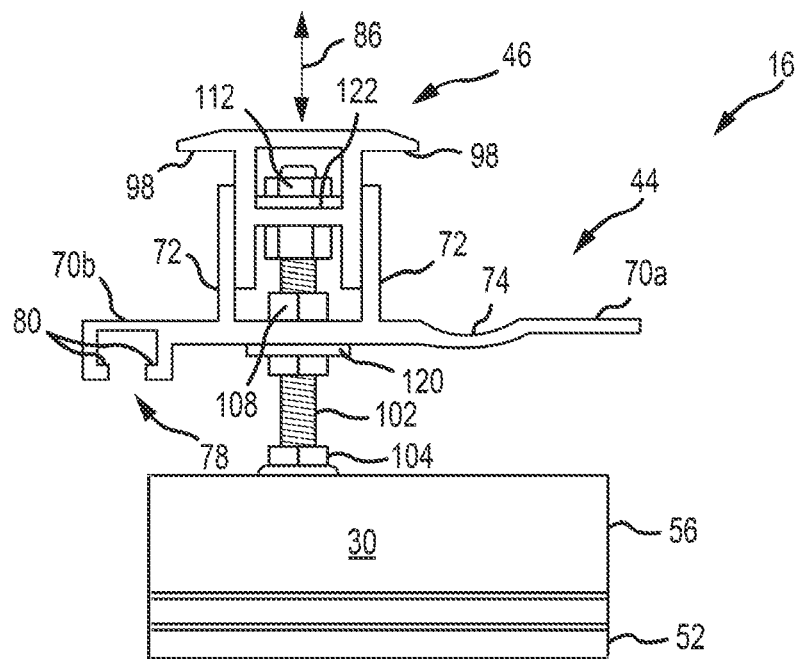
FIG. 6 is a right side view of the mounting bracket of FIG. 3.
Figure 7:
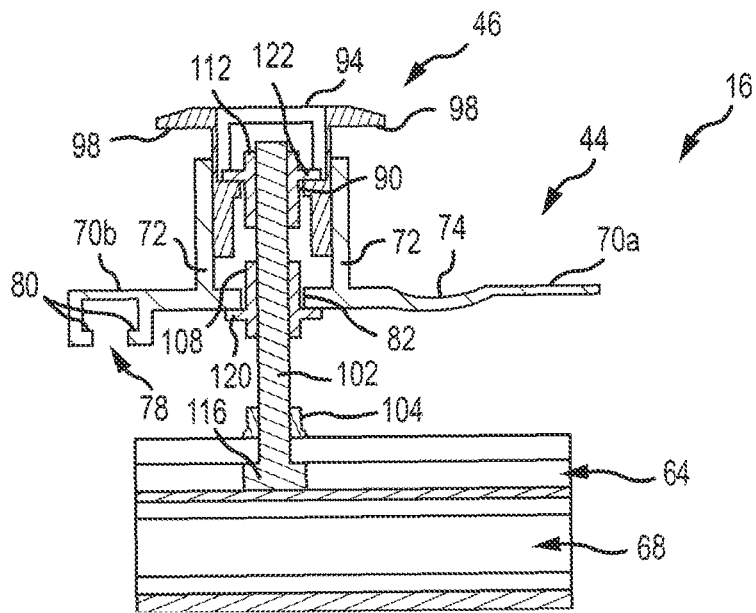
FIG. 7 is a side cross sectional view of the mounting bracket taken along line A-A of FIG. 3.

The first clamp portion 44 is positioned above the standoff 30. The first clamp portion 44 includes a first support surface 70a and a second support surface 70b separated by walls 72. The first and second support surfaces 70a, 70b are operable to support a portion of a solar panel 14. The first support surface 70a includes a recess 74 that defines as a curvilinear depression on the first support surface 70a. The second support surface 70b includes a channel 78 that protrudes below the second support surface 70b. In other words, the channel 78 faces the standoff 30. Similar to the channel 64, the channel 78 includes ridges 80. The illustrated channel 78 defines a "T" shaped opening that extends entirely through the length of the second support surface 70b. The walls 72 are substantially perpendicular to the first and second support surfaces 70a, 70b. Located between the walls 72 is an aperture 82 (FIG. 5). In addition, the first clamp portion 44 is moveable relative to the standoff 30 along a first axis 86 (FIG. 6). The first axis 86 is generally perpendicular to the plane defined by the roof 12. In the illustrated embodiment, the first clamp portion 44 is manufactured from a nonferrous material (e.g., aluminum).

The second clamp portion 46 is sized to be received between the walls 72 and includes a first aperture 90 (FIG. 5), a second aperture 94 and clamping protrusions 98. Also, the second clamp portion 46 is moveable along the first axis 86 relative to the first clamp portion 44. The first aperture 90 has a diameter that is less than the diameter of the second aperture 94. The illustrated clamping protrusions 98 extend substantially parallel to and in the same direction as the first and second support surfaces 70a, 70b. In the illustrated embodiment, the first and second support surfaces 70a, 70b extend beyond the clamping protrusions 98. In some embodiments, the second clamp portion 46 is manufactured from a nonferrous material (e.g., aluminum).

The adjustment assembly 48 includes a stud 102, a jam nut 104, an adjustment nut 108 and a securing nut 112. The stud 102 includes external threads and has a head 116 (FIG. 5) which is sized to be received within the channel 64. The jam nut 104 threadably engages the stud 102. Likewise, the adjustment nut 108 and the securing nut 112 threadably engage the stud 102, but the adjustment nut 108 includes a protrusion 120 and the securing nut 112 includes a protrusion 122. The illustrated nuts 108, 112 are substantially constructed as hexagonal cylinders with the respective protrusions 120, 122 radially extending therefrom. The illustrated protrusions 120, 122 are offset to one end of the nuts 108, 112. In other words, the illustrated protrusions 120, 122 are not centered along the length of the nuts 108, 112. The protrusions 120, 122 are offset to different locations in the configuration in FIGS. 3-8 than in the configuration illustrated in FIGS. 9-10. The jam nut 104, the adjustment nut 108 and the securing nut 112 are sized to receive a standard wrench or socket wrench. For example, the jam nut 104, the adjustment nut 108 and the securing nut 112 may each be a ½" nut able to receive a ½" wrench. Additionally, the adjustment assembly 48 is manufactured from a ferrous material (e.g., steel, stainless steel, etc.).

The skirt 21 shown in FIGS. 1 and 2 may be coupled to the first clamp portion 44 via the channel 78. Specifically, a head portion of a fastener (e.g., a bolt) is received within the channel 78 and engages the ridges 80 (similar to the head 116 engaging the ridges 66). The fastener is attached to a portion of the skirt 21 by either a threaded nut or the fastener engages a threaded aperture of the skirt. As the skirt 21 is coupled to the first clamp portion 44, the head of the fastener is forced into the ridges 80 to enable a locking mechanism to inhibit the fastener from moving along or rotating within the channel 78.

Figure 9:
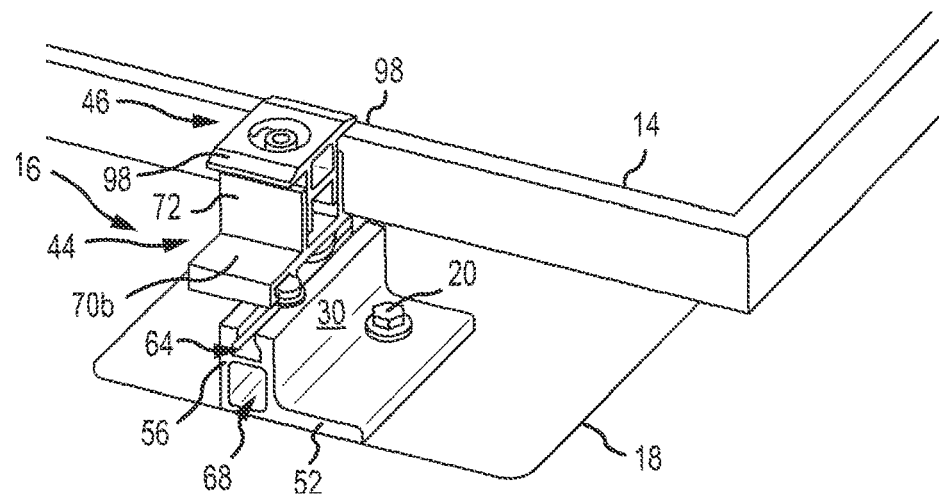
FIG. 9 is a perspective view of the mounting bracket of FIG. 3 coupled to a solar panel.
Figure 10:
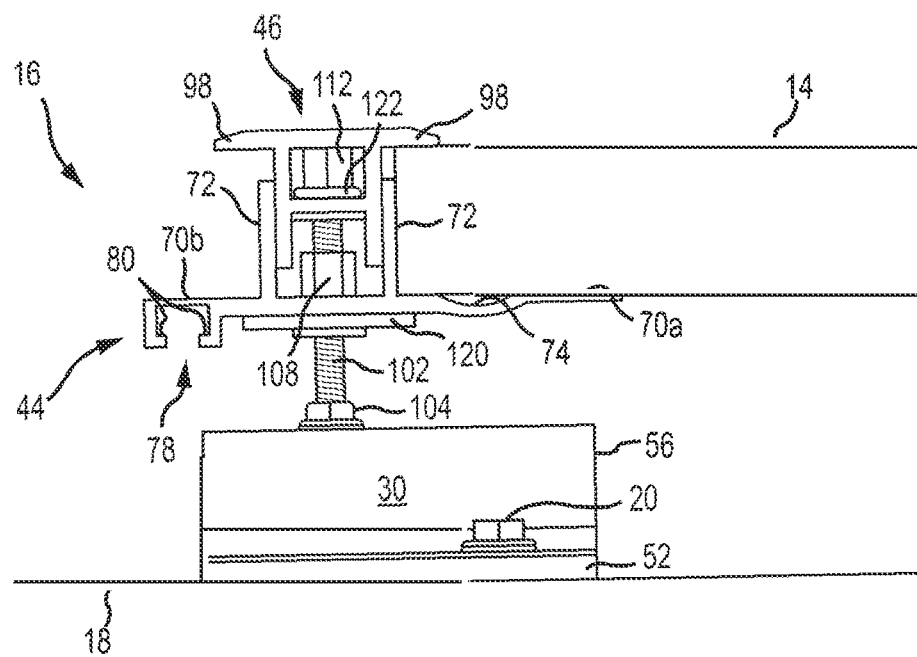
FIG. 10 is a side view of FIG. 9.
Figure 11:
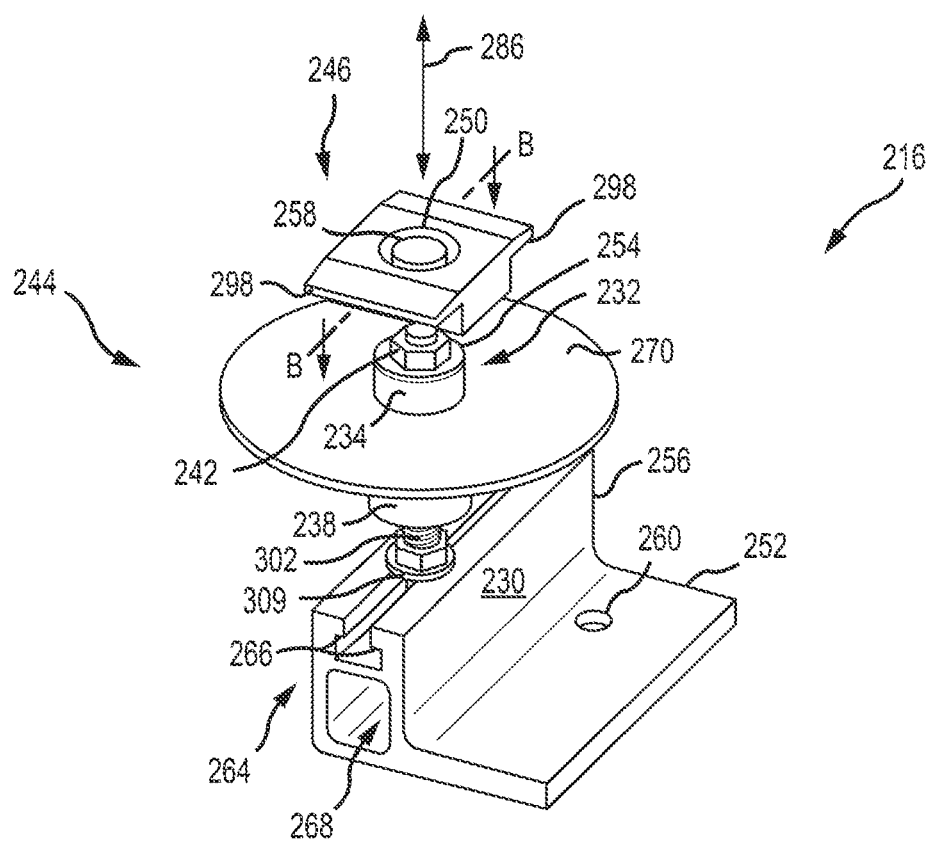
FIG. 11 illustrates a mounting bracket according to some embodiments of the invention.
Figure 12:
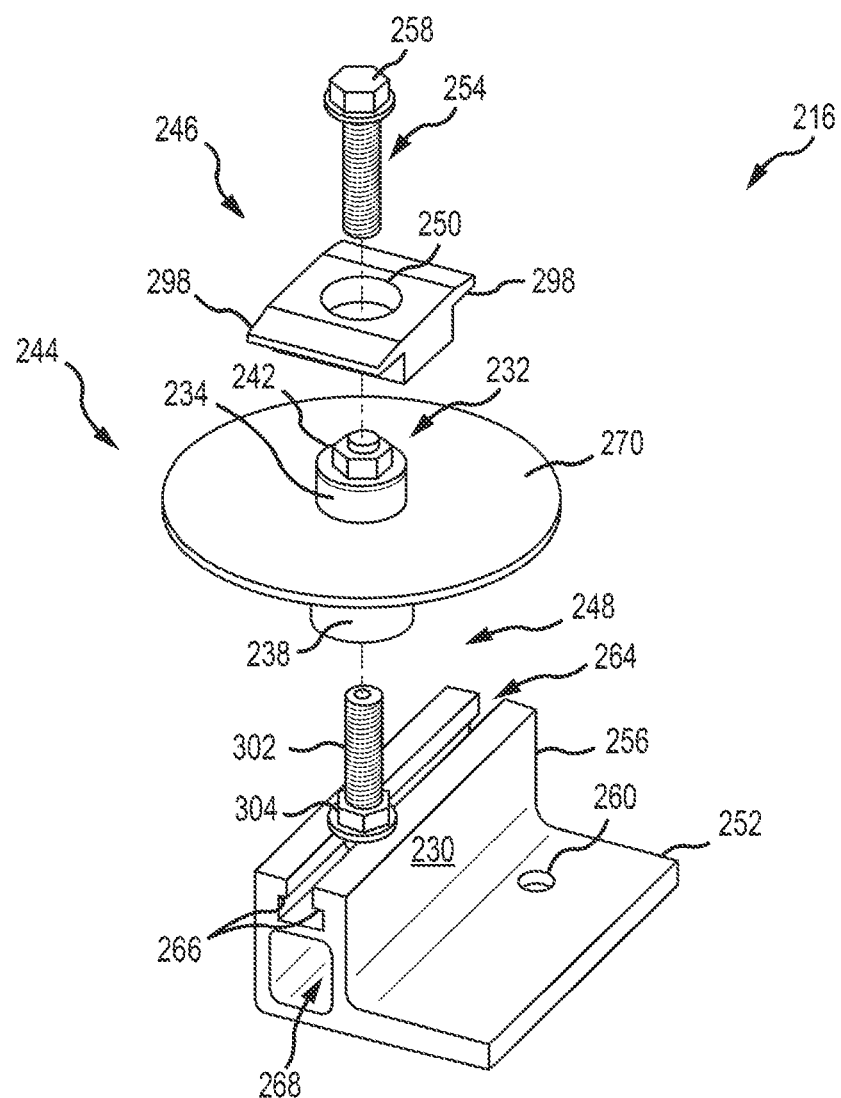
FIG. 12 is an exploded perspective view of the mounting bracket of FIG. 11.

With reference to FIGS. 9 and 10, the standoff 30 is positioned on the flashing 18 and secured to the roof 12 by the roof fastener 20. Before the roof fastener 20 is fully secured, the standoff 30 is able to rotate relative to the flashing 18. The stud 102 is secured to the standoff 30 by sliding the head 116 to a desired location along the channel 64. The jam nut 104 secures the stud 102 to the standoff 30. Consequently, the stud 102 is rotationally and laterally fixed relative to the standoff 30. Because the head 116 is manufactured from a ferrous material (e.g., stainless steel), the head 116 includes a material hardness greater than that of the nonferrous material (e.g., aluminum) of the standoff 30. As the jam nut 104 is tightened, the head 116 is forced into and deforms the ridges 66 to provide an additional mechanism to inhibit rotational or sliding movement of the stud 102 relative to the standoff 30.

The adjustment nut 108 is positioned on the stud 102 and extends through the aperture 82 to support the first clamp portion 44 on the stud 102. Consequently, the protrusion 120 of the adjustment nut 108 abuts the first clamp portion 44, and a hexagonal portion of the adjustment nut 108 extends through the aperture 82 and is located between walls 72 (FIG. 6). The second clamp portion 46 is also positioned on the stud 102. The securing nut 112 is positioned on the stud 102 and extends through the first aperture 90. In particular, the protrusion 122 of the securing nut 112 abuts a portion of the second clamp portion 46 adjacent the first aperture 90 to support the second clamp portion 46 on the stud 102. Also, a hexagonal portion of the securing nut 112 extends between the first and second apertures 90, 94.

In operation of securing the solar panels 14 to the mounting brackets 16, the first clamp portion 44 is adjusted to a desired height above the roof 12 by rotating the adjustment nut 108. By rotating the adjustment nut 108, the first clamp portion 44 translates along the first axis 86. In addition, the securing nut 112 is positioned at the top end of the stud 102 (i.e., away from the standoff 30) to allow for the maximum clearance between the first and second support surfaces 70*a*, 70*b* and the clamping protrusions 98. The solar panels 14 are then easily received on either of the first and second support surfaces 70*a*, 70*b*.

Once the height of the first clamp portion 44 is properly adjusted and a solar panel 14 is seated on either of the first and second support surface 70*a*, 70*b*, the securing nut 112 is rotated about the stud 102 such that the clamping protrusion 98 of the second clamp portion 46 engages a top surface of the solar panel 14. In particular, the protrusions 122 of the securing nut 112 contact a portion of the second clamp portion 46 adjacent the first aperture 90 to translate the second clamp portion 46 downwardly along the first axis 86. The securing nut 112 rotates about the stud 102 to move the second clamp portion 46 along the stud 102 in the direction of the first axis 86. In addition, the recess 74 provides enough clearance between the first clamp portion 44 and the second clamp portion 46 to insert, pivot and secure a solar panel 14 therebetween. For example, if a first solar panel 14 is seated on the second support surface 70*b* and the second clamp portion 46 is tightened against the first solar panel 14, a second solar panel 14 is able to be rotated via the recess 74 onto the first support surface 70*a*.

FIGS. 11-18 illustrate a roof mount system 210 according to another embodiment. The roof mount system 210 is similar to the roof mount system 10; therefore, like components have been given like reference numbers incremented by 200 and only the differences between the roof mount systems will be discussed in detail. In addition, components or features described with respect to only one or some of the embodiments described herein are equally applicable to any other embodiments described herein.

The illustrated roof mount system 210 includes a mounting bracket 216 that couples at least one solar panel 214 to a roof 212, and flashing 218 (shown in FIGS. 17 and 18) is coupled between the mounting bracket 216 and the roof 212. The illustrated mounting bracket 216 includes a standoff 230, a first clamp portion 244, a second clamp portion 246, and an adjustment assembly 248. The illustrated standoff 230 includes a first portion 252 and a second portion 256. The first portion 252 includes a mounting aperture 260 and the second portion 256 includes a channel 264 and a void 268. Ridges 266 extend along both sides of the channel 264 and face downwardly towards the first portion 252.

The first clamp portion 244 includes a support surface 270 and a hub 232. The illustrated support surface 270 is defined as a circular surface surrounding the hub 232. The hub 232 includes an internally threaded hollow core with an upper projection 234 extending above the support surface 270 and a lower projection 238 extending below the support surface 270. A hexagonal protrusion 242 extends from the upper projection 234 away from the support surface 270. The hexagonal protrusion 242 is sized to fit a standard sized wrench or socket wrench. In other embodiments, one or both of the projections 234,238 may be omitted, and the hexagonal protrusion 242 may directly abut the support surface 270. The first clamp portion 244 is moveable along a first axis 286 relative to the standoff 230.

The second clamp portion 246 includes an aperture 250 and clamping protrusions 298. Also, the second clamp portion 246 is moveable along the first axis 286 relative to the first clamp portion 244. The illustrated aperture 250 is constructed as a countersunk aperture. The illustrated clamping protrusions 298 extend away from the aperture 250.

The adjustment assembly 248 includes a stud 302, a jam nut 304 and a securing fastener 254. The stud 302 includes a head 316 which is sized to be received within the channel 264. Likewise, the securing fastener 254 also includes a head 258 that is sized to receive a standard sized wrench or socket wrench. The stud 302 and the securing fastener 254 are sized to threadably engage the hub 232.

Figure 17:
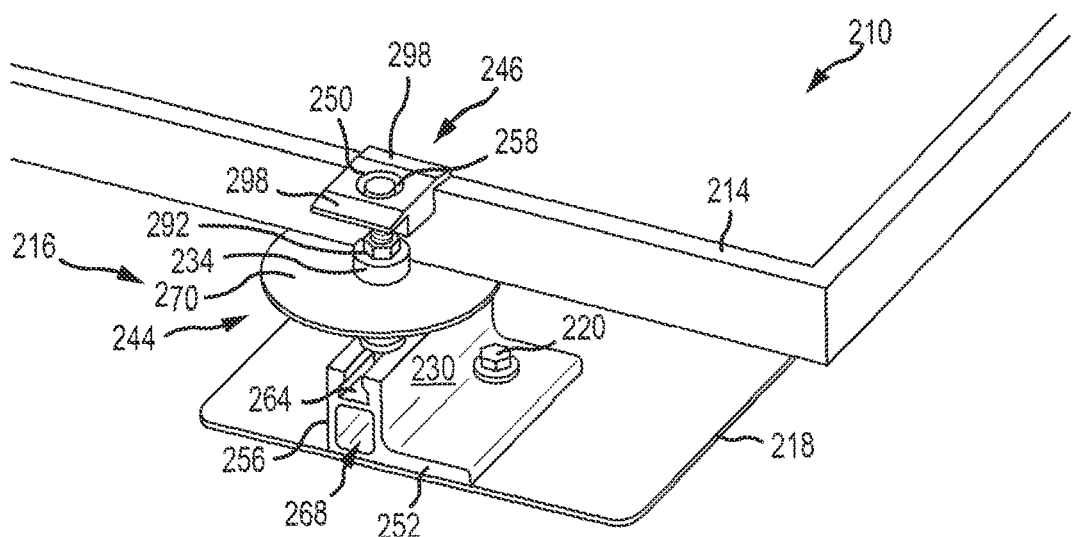
FIG. 17 is a perspective view of the mounting bracket of FIG. 11 coupled to a solar panel.
Figure 18:
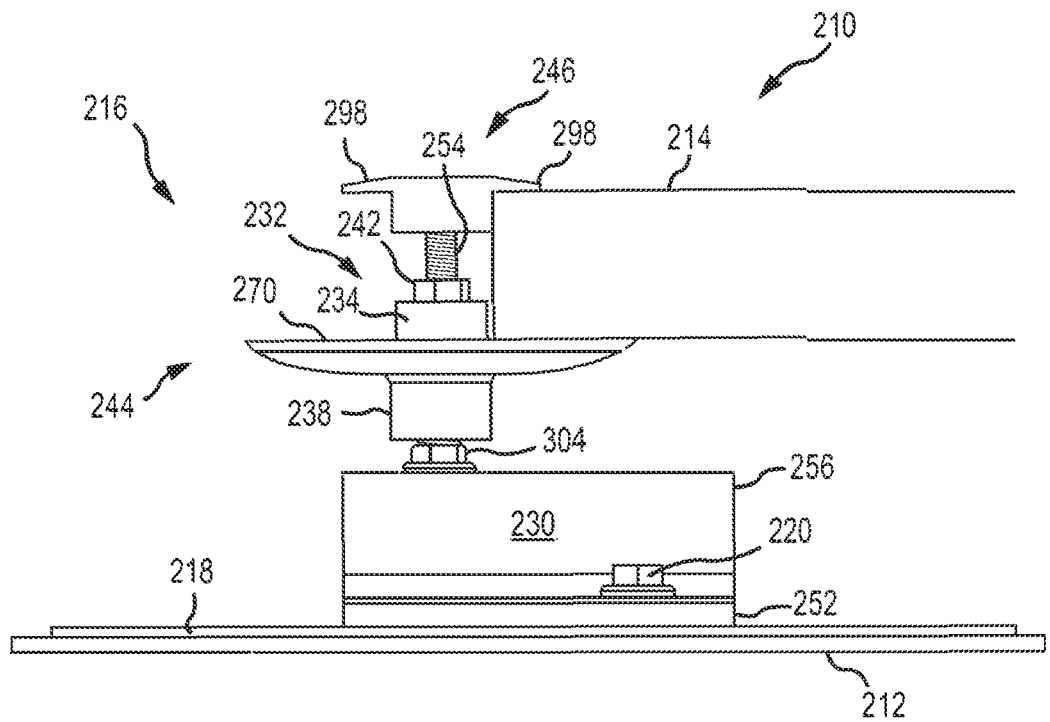
FIG. 18 is a side view of FIG. 17.
Figure 19:
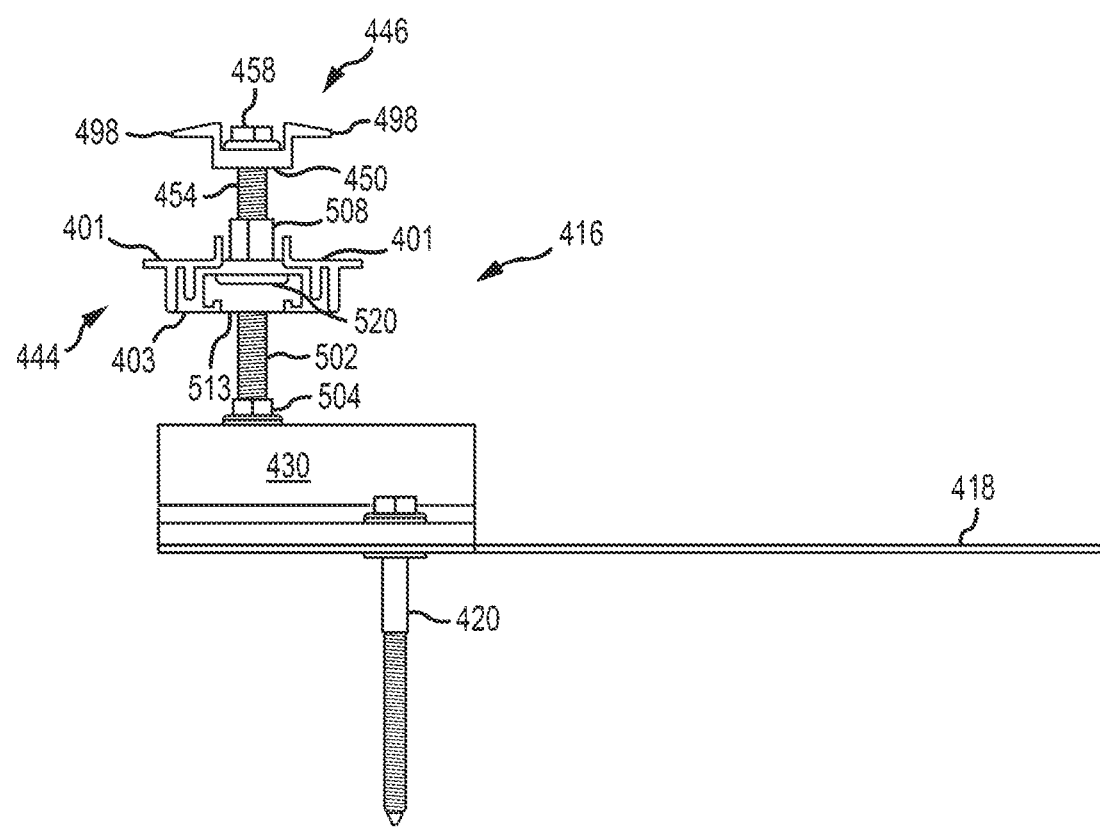
FIG. 19 illustrates a mounting bracket according to some embodiments of the invention.
Figure 20:
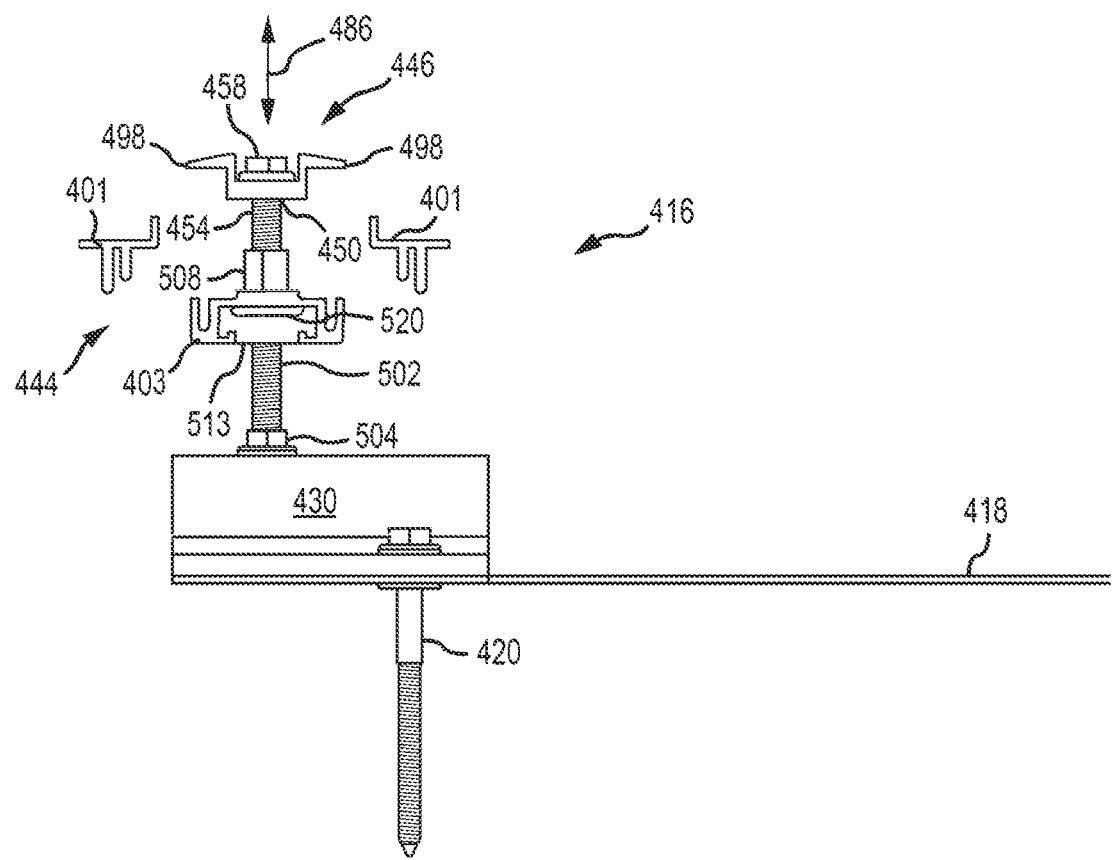
FIG. 20 is a partially exploded view of the mounting bracket of FIG. 19.

With reference to FIGS. 17 and 18, the standoff 230 is positioned on the flashing 218 and secured to the roof 212 by a roof fastener 220. The stud 302 is secured to the standoff 230 by sliding the head 316 along the channel 264 to a desired location. The jam nut 304 secures the stud 302 to the standoff 230. As the jam nut 304 is tightened, the head 316 deforms the ridges 266 to provide an additional mechanism to inhibit rotational and lateral movement of the stud 302 relative to the standoff 230.

Figure 13:
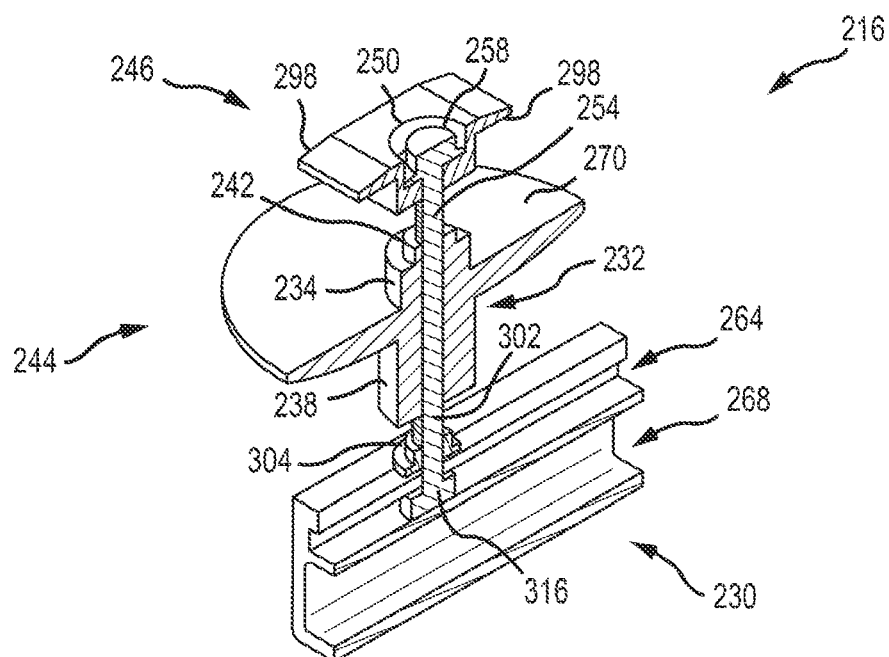
FIG. 13 is a perspective cross sectional view of the mounting bracket taken along line B-B of FIG. 11.
Figure 14:
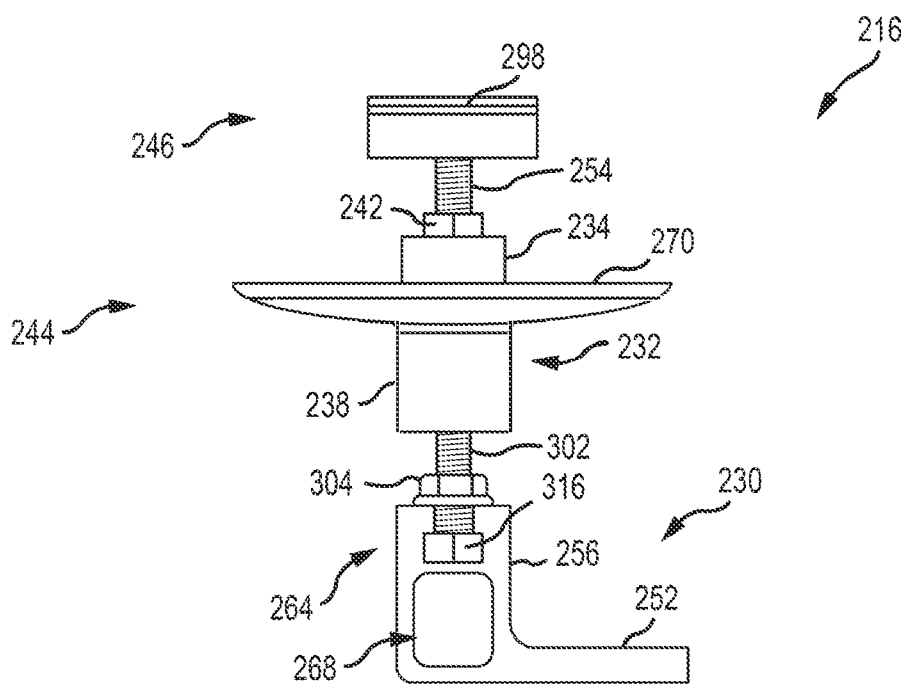
FIG. 14 is a front view of the mounting bracket of FIG. 11.
Figure 15:
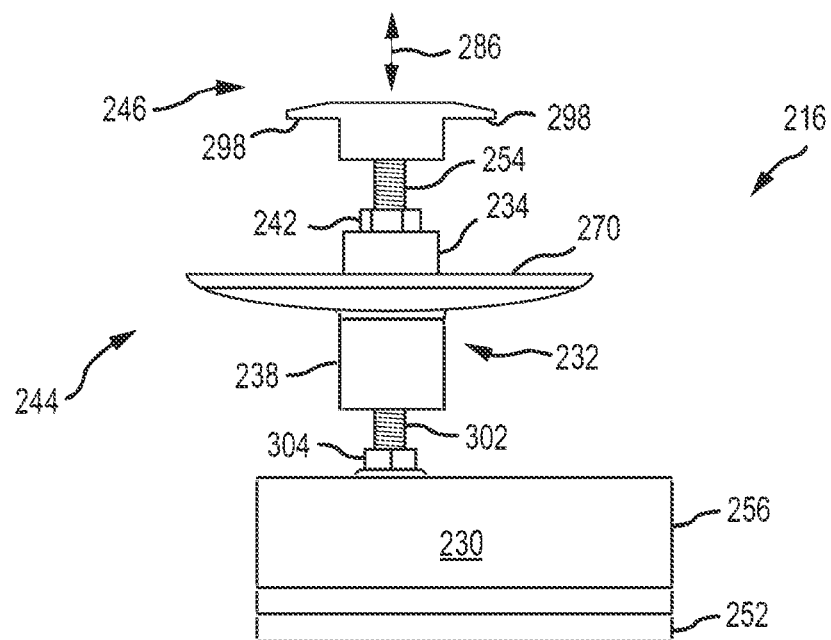
FIG. 15 is a right side view of the mounting bracket of FIG. 11.
Figure 16:
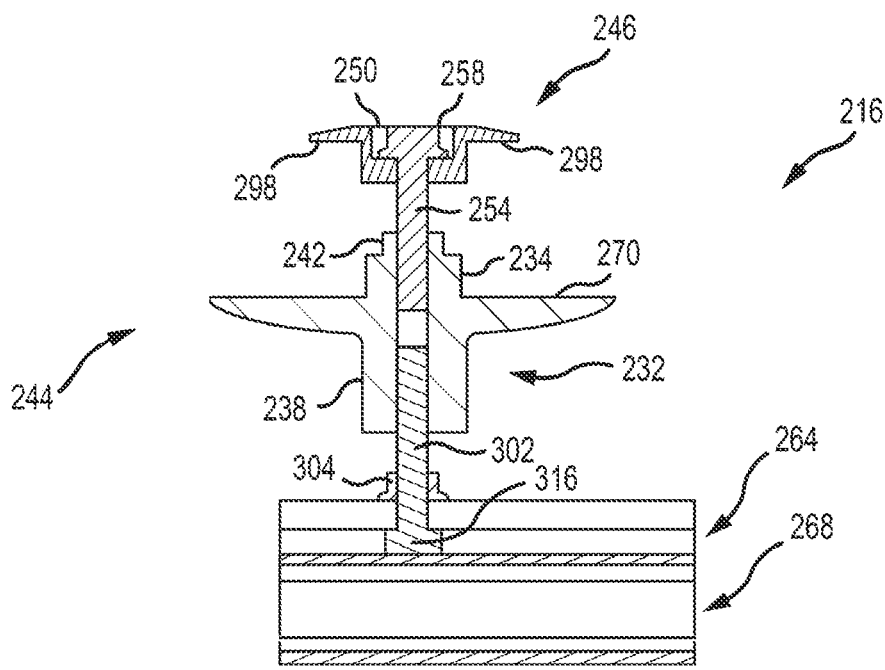
FIG. 16 is a side cross sectional view of the mounting bracket taken along line B-B of FIG. 11.

As best shown in FIGS. 13 and 16, the first clamp portion 244 is threaded onto the stud 302. In particular, the lower projection 238 receives a portion of the stud 302. The second clamp portion 246 is secured to the first clamp portion 244 when the securing fastener 254 is inserted into the aperture 250 and threadably engaged to the upper projection 234.

In operation of securing the solar panels 214 to the mounting brackets 216, the first clamp portion 244 is adjusted to a desired height above the roof 212 by rotating the first clamp portion 244 via the hexagonal protrusion 242. By rotating the hexagonal protrusion 242 with a wrench or socket wrench, the first clamp portion 244 translates along the first axis 286. Because the hexagonal protrusion 242 receives a standard sized wrench socket, additional or specialty tools are not required to adjust the height of the first clamp portion 244. The solar panels 214 are then seated on the support surface 270 such that an edge of the solar panel 214 is adjacent an outer circumference of the upper projection 234.

Once the height of the first clamp portion 244 is properly adjusted and the solar panel 214 is seated on the support surface 270, the second clamp portion 246 is installed to clamp onto the solar panel 214. Particularly, the securing fastener 254 is tightened to the hub 232 such that the clamping protrusions 298 clamp the solar panel 214 against the support surface 270.

FIGS. 19-22 illustrate a roof mount system according to another embodiment. The roof mount system is similar to the roof mount system 10; therefore, like components have been given like reference numbers incremented by 400 and the only differences between the roof mount systems will be discussed in detail. In addition, components or features described with respect to only one or some of the embodiments described herein are equally applicable to any other embodiments described herein.

Figure 21:
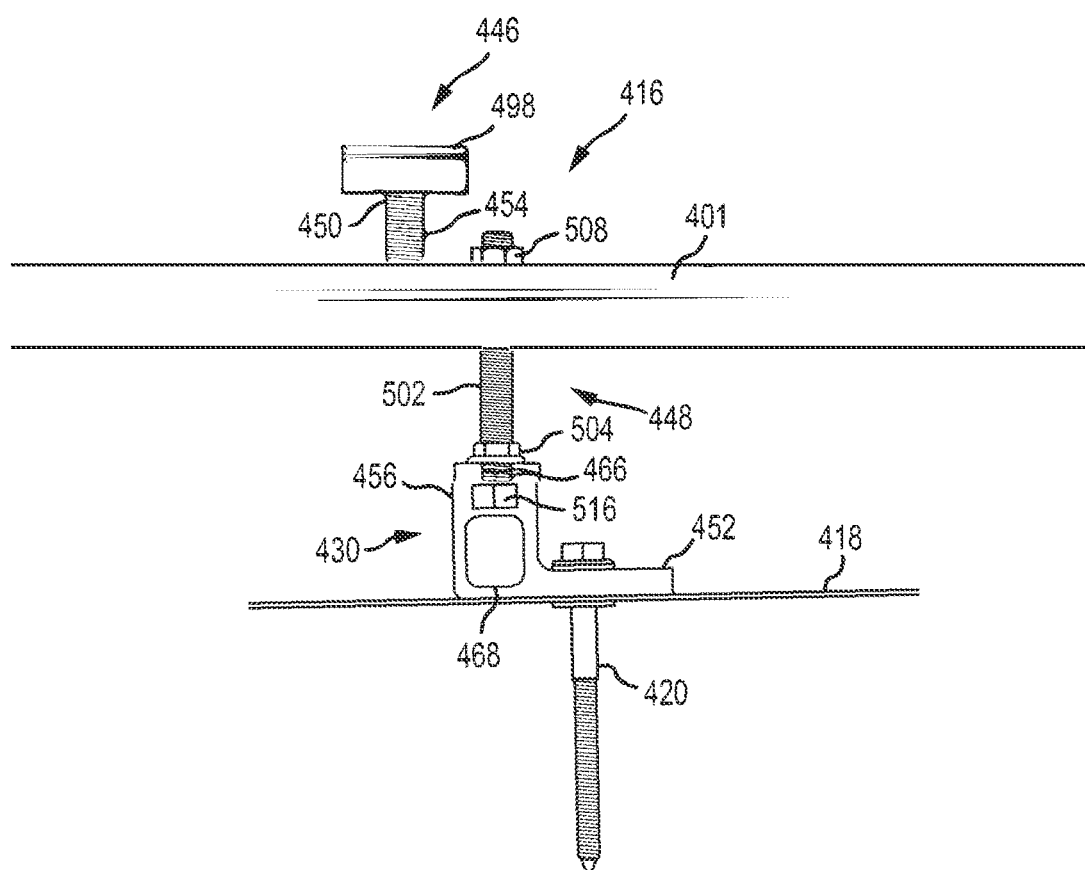
FIG. 21 is a front view of the mounting bracket of FIG. 19.

The illustrated roof mount system includes a mounting bracket 416, rails 401 and flashing 218. The illustrated rails 401 (only one is illustrated in FIG. 21) are a different method of securing solar panels, such as the solar panels 14, to the mounting bracket 416. The illustrated mounting bracket 416 includes a standoff 430, a first clamp portion 444, a second clamp portion 446, and an adjustment assembly 448. The illustrated standoff 430 includes a first portion 452 and a second portion 456. The first portion 452 includes a mounting aperture 460 and the second portion 456 includes a channel 464 and a void 468. Ridges 466 extend along both sides of the channel 464 and face downwardly towards the first portion 452.

The first clamp portion 444 includes a base 403 that includes a channel sized to receive a protrusion of the rail 401. The rails 401 are configured to support the solar panels 14. The base 403 includes apertures 482 with one of the apertures being a threaded aperture. The illustrated first clamp portion 444 is moveable along a first axis 486 relative to the standoff 430.

The second clamp portion 446 includes an aperture 450 and clamping protrusions 498. Also, the second clamp portion 446 is moveable along the first axis 486 relative to the first clamp portion 444. The illustrated clamping protrusions 498 extend away from the aperture 450.

The adjustment assembly 448 includes a stud 502, a jam nut 504, an adjustment nut 508, a locking nut 513 and a securing fastener 454. The stud 502 includes a head 516 which is sized to be received within the channel 464. Likewise, the securing fastener 454 also includes a head 458 that is sized to receive a standard sized wrench or socket wrench. The adjustment nut 508 includes a protrusion 520 that is offset to one end of the adjustment nut 508. The securing fastener 454 engages the threaded aperture 482 whereas the adjustment nut 508 is received through the other aperture 482. The locking nut 513 includes a threaded aperture and is slidably received within the first clamp portion 444 so that the threaded aperture aligns with the aperture 482. The engagement between the first clamp portion 444 and the locking nut 513 inhibits the locking nut 513 from rotating relative to the first clamp portion 444.

Figure 22:
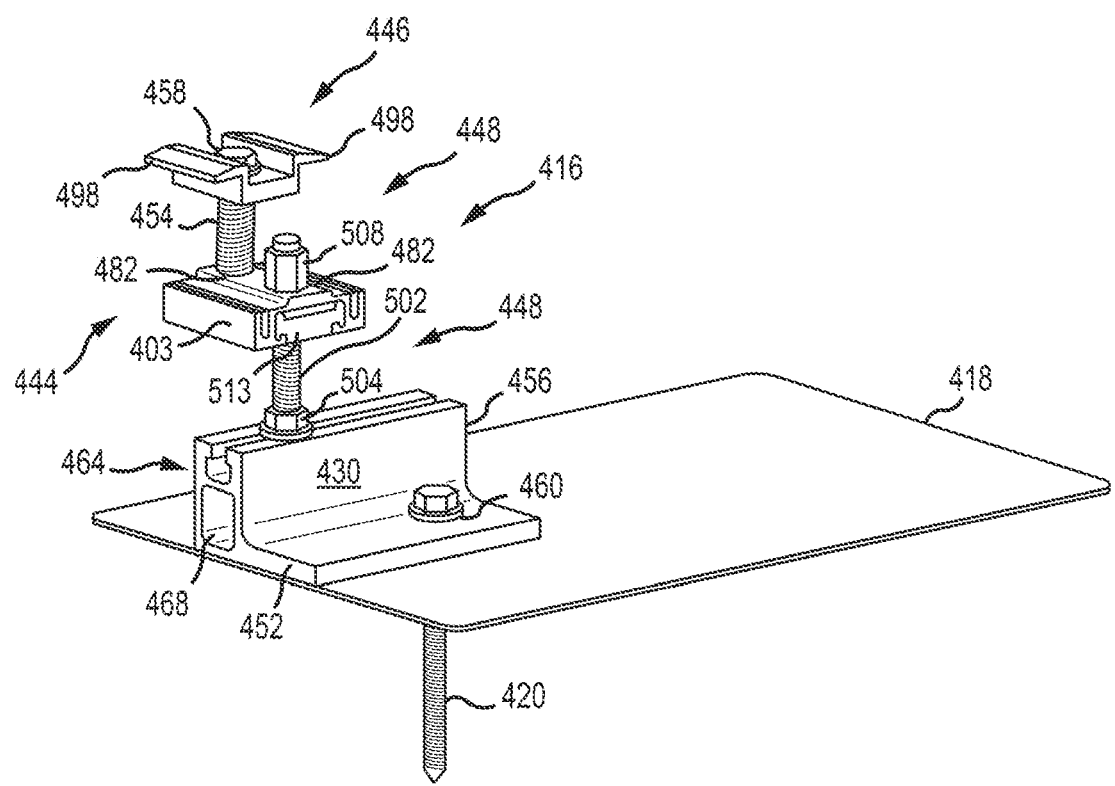
FIG. 22 is a perspective view of the mounting bracket of FIG. 19.
Figure 23:
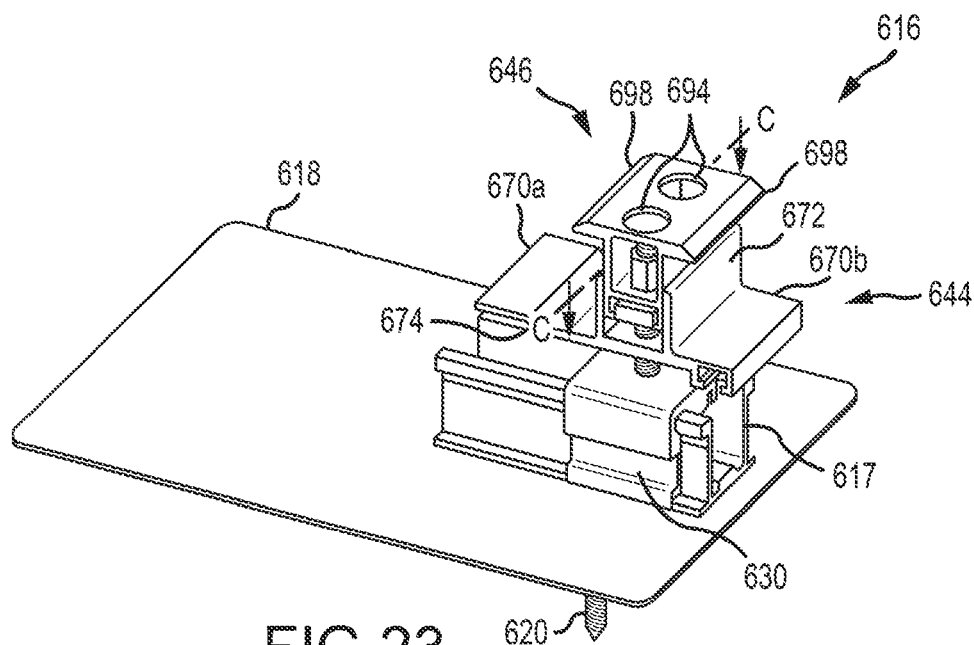
FIG. 23 illustrates a mounting bracket according to some embodiments of the invention.

With reference to FIG. 22, the standoff 430 is positioned on the flashing 418 and secured to the roof 12 by a roof fastener 420. The stud 502 is secured to the standoff 430 by sliding the head 516 along the channel 464 to a desired location. The jam nut 504 secures the stud 502 to the standoff 430. As the jam nut 504 is tightened, the head 516 deforms the ridges 466 to provide an additional mechanism to inhibit rotational and lateral movement of the stud 502 relative to the standoff 430.

With continued reference to FIG. 22, the first clamp portion 444, the locking nut 513 and the adjustment nut 508 are received on the stud 502. In particular, the protrusion 520 of the adjustment nut 508 is located between the locking nut 513 and the first clamp portion 444. As a result, the first clamp portion 444, the locking nut 513 and the adjustment nut 508 move along the first axis 486 together. In addition, the second clamp portion 446 and the securing fastener 454 are coupled to the threaded aperture 482.

In operation of securing the rail 401 directly to the mounting brackets 416 (e.g., a rail based system), the rails 401 are connected to the base 403 such that each rail 401 engages one channel of the base 403. The first clamp portion 444 is adjusted to a desired height above the roof 12 by rotating the adjustment nut 508. By rotating the adjustment nut 508 (e.g., with a wrench or socket wrench), the first clamp portion 444 translates along the first axis 286. The rails 401 and the solar panels 14 are then seated on the first clamp portion 444. Once the height of the first clamp portion 444 is properly adjusted and the solar panel 14 is seated on the rail 401, the second clamp portion 446 is installed to clamp onto the solar panel 14. Particularly, the securing fastener 454 is tightened such that the clamping protrusions 498 clamp the solar panel 14 against the rail 401.

FIGS. 23-27 illustrate a mounting bracket 616 according to another embodiment. The mounting bracket 616 is similar to the mounting bracket 16; therefore, like components have been given like reference numbers incremented by 600 and only the differences between the mounting brackets will be discussed in detail. In addition, the mounting bracket 616 includes similar components to the mounting brackets; therefore, like components have been given like reference numbers. Furthermore, components or features described with respect to only one or some of the embodiments described herein are equally applicable to any other embodiments described herein.

The illustrated mounting bracket 616 includes a slide 617, a standoff 630, a first clamp portion 644, a second clamp portion 646, and an adjustment assembly 648. The illustrated slide 617 abuts a flashing 618 and both are secured to the roof 12 by a roof fastener 620. The illustrated standoff 630 is coupled to the slide 617 and moves along a second axis 631 (FIG. 24) relative to the slide 617. The second axis 631 extends substantially parallel to the roof 12. The slide 617 includes a mounting aperture sized to receive the roof fastener 620 and upper and lower protrusions. The standoff 630 includes upper grooves and lower grooves that are sized to receive the respective upper and lower protrusions of the slide 617 (see FIGS. 25-26). The standoff 630 is selectively fixed relative to the slide 617 by a locking bolt 607. The illustrated locking bolt 607 may also function as a grounding bolt to electrically connect the slide 617 to the standoff 630 to enable electrical current to flow therebetween.

Figure 24:
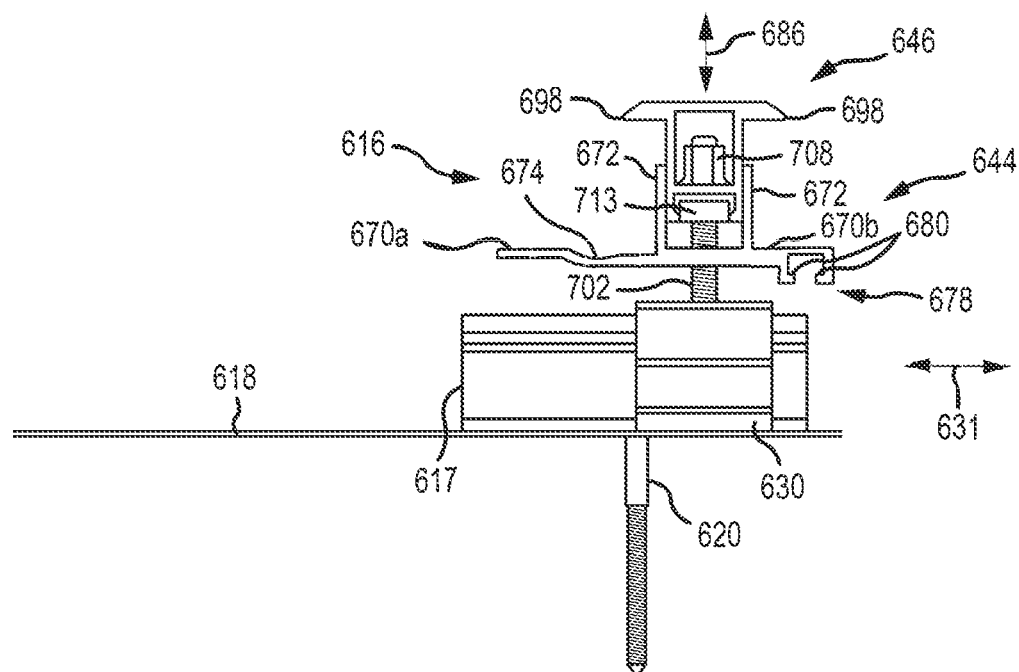
FIG. 24 is a side view of the mounting bracket of FIG. 23.
Figure 25:
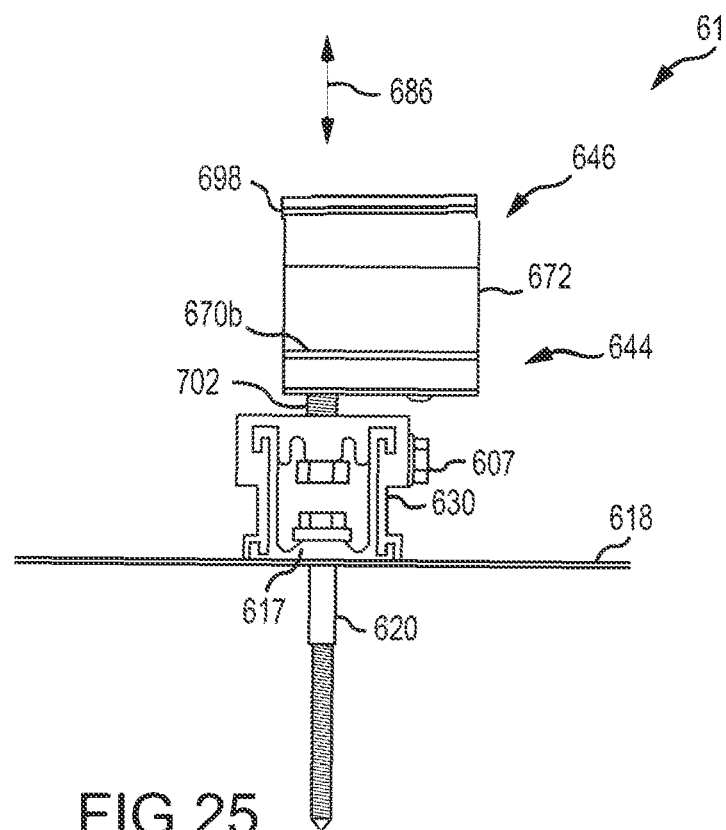
FIG. 25 is a front view of the mounting bracket of FIG. 23.

The illustrated first clamp portion 644 includes a first support surface 670a and a second support surface 670b separated by walls 672. The first support surface 670a includes a recess 674 that defines as a curvilinear depression on the first support surface 670a. The second support surface 670b includes a channel 678 having ridges 680 that protrude into the channel below the second support surface 670b. Located between the walls 672 are apertures 682 (FIG. 26) with one aperture being a threaded aperture. In addition, the first clamp portion 644 is moveable relative to the standoff 630 along a first axis 686 (FIG. 24). The first axis 686 is generally perpendicular to the plane defined by the roof 12.

Figure 26:
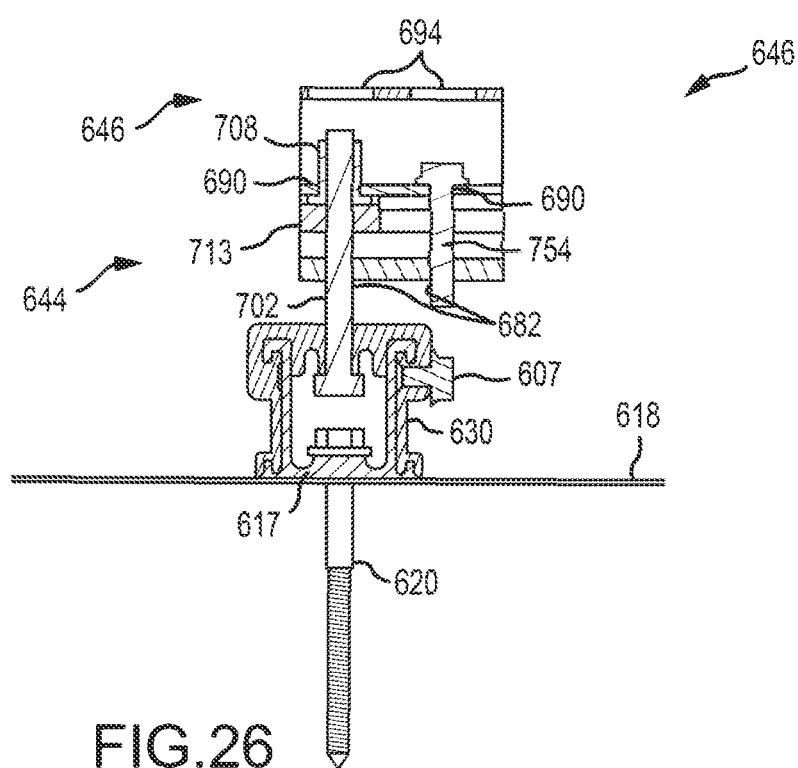
FIG. 26 is a cross sectional view of the mounting bracket taken along line C-C of FIG. 23.

The second clamp portion 646 includes a plurality of first apertures 690, a plurality of second apertures 694 and clamping protrusions 698. The illustrated first apertures 690 are constructed with different diameters, and the first apertures 690 substantially align with a respective second aperture 694 (FIG. 26). Also, the second clamp portion 646 is moveable along the first axis 686 relative to the first clamp portion 644.

Figure 27:
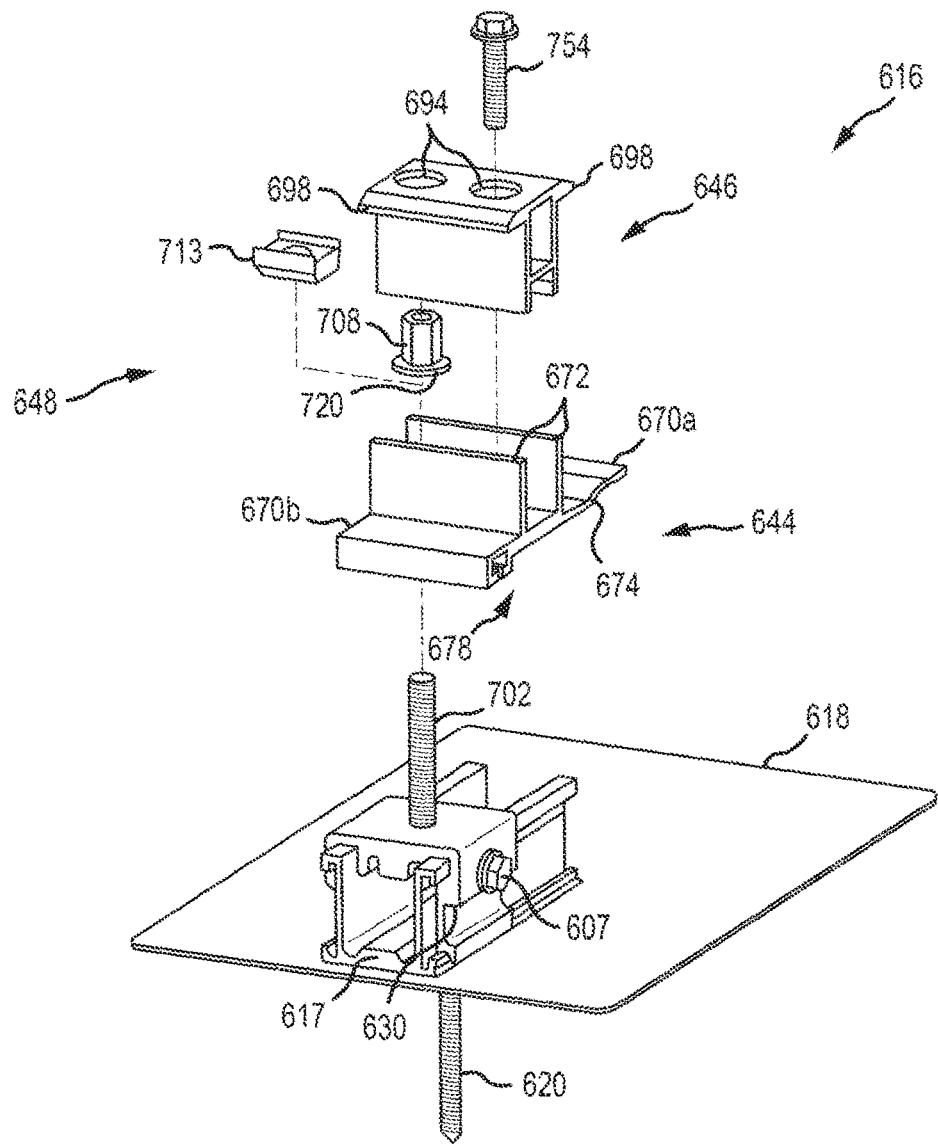
FIG. 27 is an exploded perspective view of the mounting bracket of FIG. 23.
Figure 28:
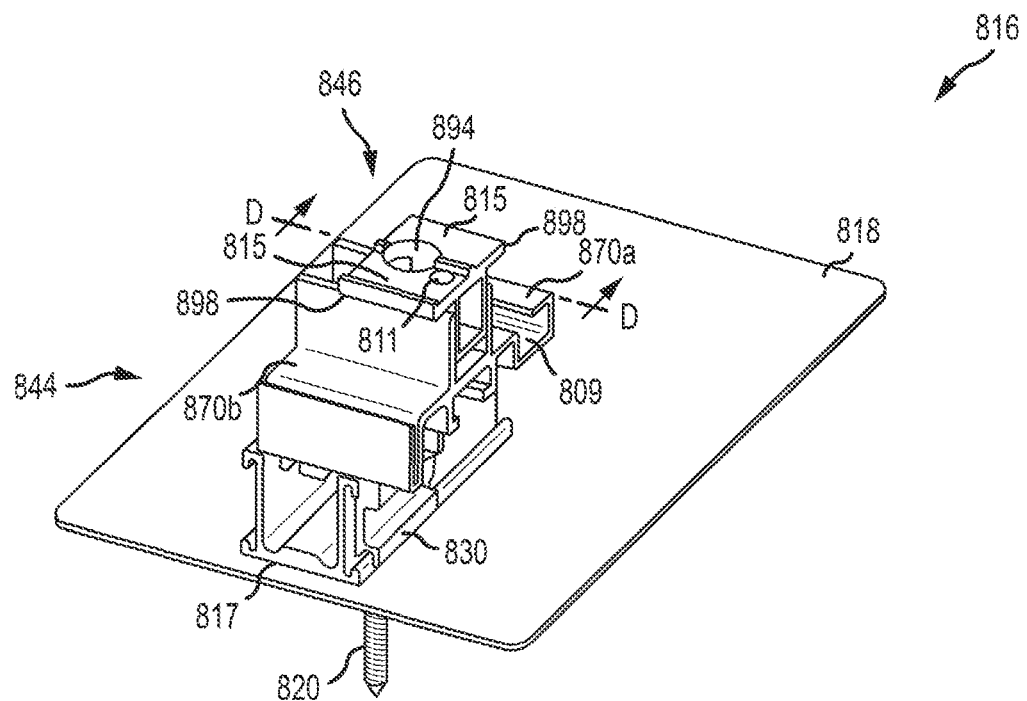
FIG. 28 illustrates a mounting bracket according to some embodiments of the invention.
Figure 29:
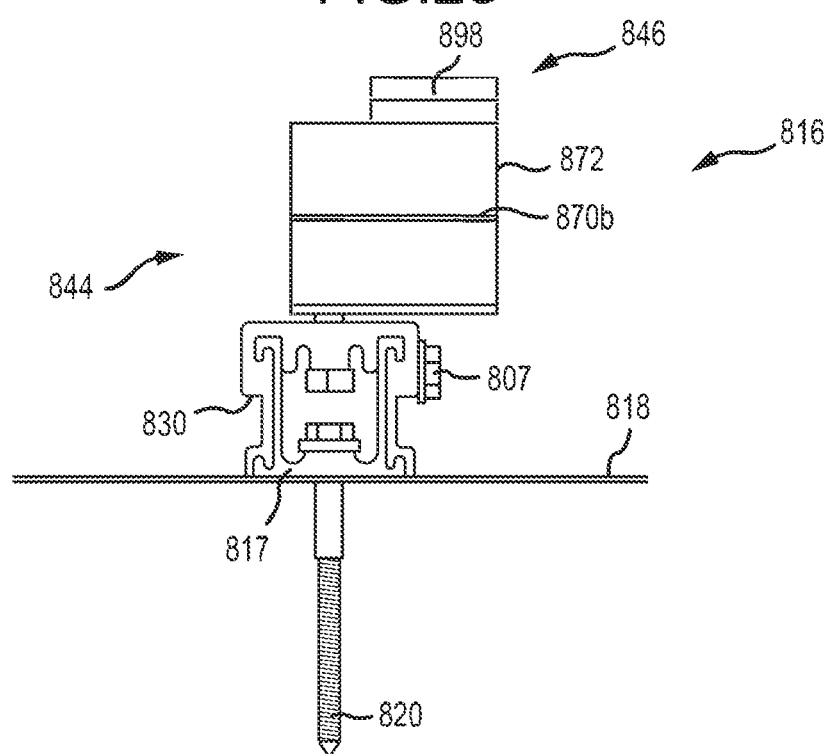
FIG. 29 is a front view of the mounting bracket of FIG. 28.

With reference to FIG. 27, the illustrated adjustment assembly 648 includes a stud 702, an adjustment nut 708 having a protrusion 720, a securing fastener 754, and a locking nut 713. The stud 702 is threadably coupled to and extends from the standoff 630. The first clamp portion 644 and the second clamp portion 646 are received on the stud 702. The adjustment nut 708 is received in one of the first apertures 690, for example, the first aperture 690 including the larger diameter. The locking nut 713 is slidably coupled to the second clamp portion 646 below the adjustment nut 708. In other words, the locking nut 713 engages side walls of the second clamp portion 646 and is slid in place to align with the adjustment nut 708 with the protrusion 720 of the adjustment nut 708 located between the locking nut 713 and the aperture 690. The illustrated locking nut 713 holds the adjustment nut 708 in place within the first aperture 690. The adjustment nut 708 and the locking nut 713 are both received on the stud 702. The securing fastener 754 is received through the other first aperture 690 and threadably engages the first clamp portion 644.

In operation of securing solar panels 14 to the roof 12 with the mounting bracket 616, the securing fastener 754 clamps the first and the second clamp portions 644, 646 onto the solar panels 14. The securing fastener 754 is tightened by a socket wrench that is received through the corresponding second aperture 694. The first and the second clamp portions 644, 646, and ultimately the solar panels 14, are adjusted to a desired height above the roof 12. In particular, the socket wrench that was utilized to tighten the securing fastener 754 can now be used to engage the adjustment nut 708. By rotating the adjustment nut 708, the adjustment nut 708 moves relative to the stud 702 along the first axis 686. Because the locking nut 713 wedges the adjustment nut 708 against the second clamp portion 646, the second clamp portion 646 moves with the adjustment nut 708. In addition, because the securing fastener 754 couples the first and the second clamp portions 644, 646 together, the first clamp portion 644 also moves with the adjustment nut 708 relative to the stud 702. If desired, the height of the first clamp portion 644 can be adjusted before clamping the solar panel 14 between the first and second clamp portions 644,646.

FIGS. 28-39 illustrate a mounting bracket 816 according to another embodiment. The mounting bracket 816 is similar to the mounting brackets 16 and 616; therefore, like components have been given like reference numbers and only the differences between the mounting brackets will be discussed in detail. Furthermore, components or features described with respect to only one or some of the embodiments described herein are equally applicable to any other embodiments described herein.

The illustrated mounting bracket 816 includes a slide 817, a standoff 830, a first clamp portion 844, a second clamp portion 846, and an adjustment assembly 848. The illustrated slide 817 abuts a flashing 818 and both are secured to the roof 12 by a roof fastener 820. The illustrated standoff 830 is coupled to the slide 817 and moves along a second axis 831 (FIG. 30) relative to the slide 817. The standoff 830 is selectively fixed relative to the slide 817 by a locking bolt 807. The illustrated locking bolt 807 may also function as a grounding bolt to directly connect the slide 817 to the standoff 830 to enable electrical current to flow therebetween.

Figure 30:
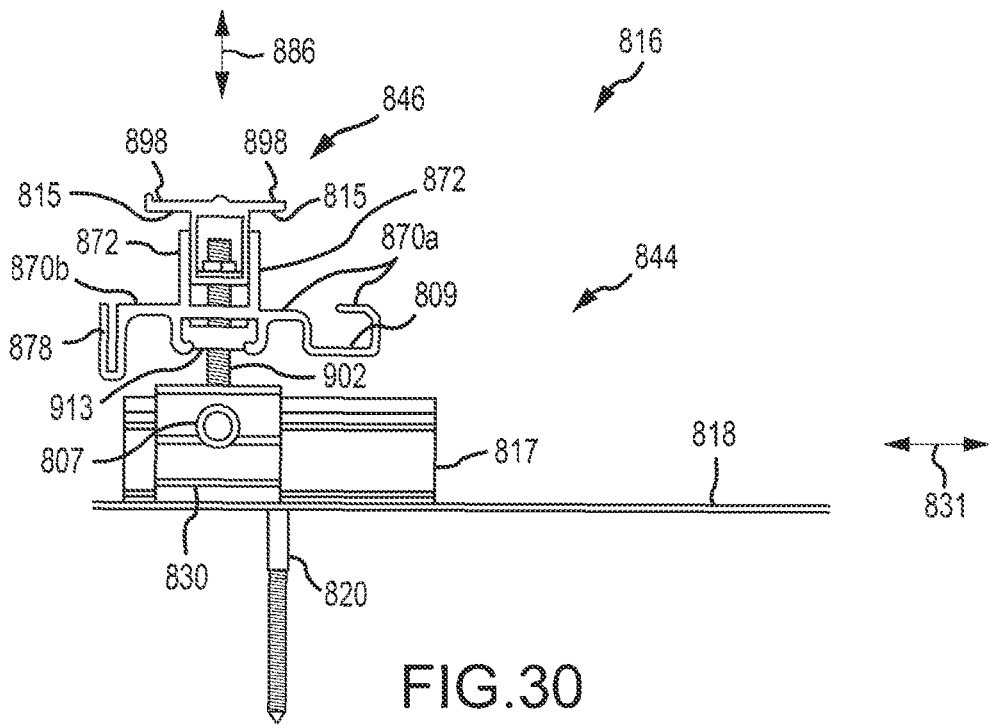
FIG. 30 is a right side view of the mounting bracket of FIG. 28.
Figure 31:
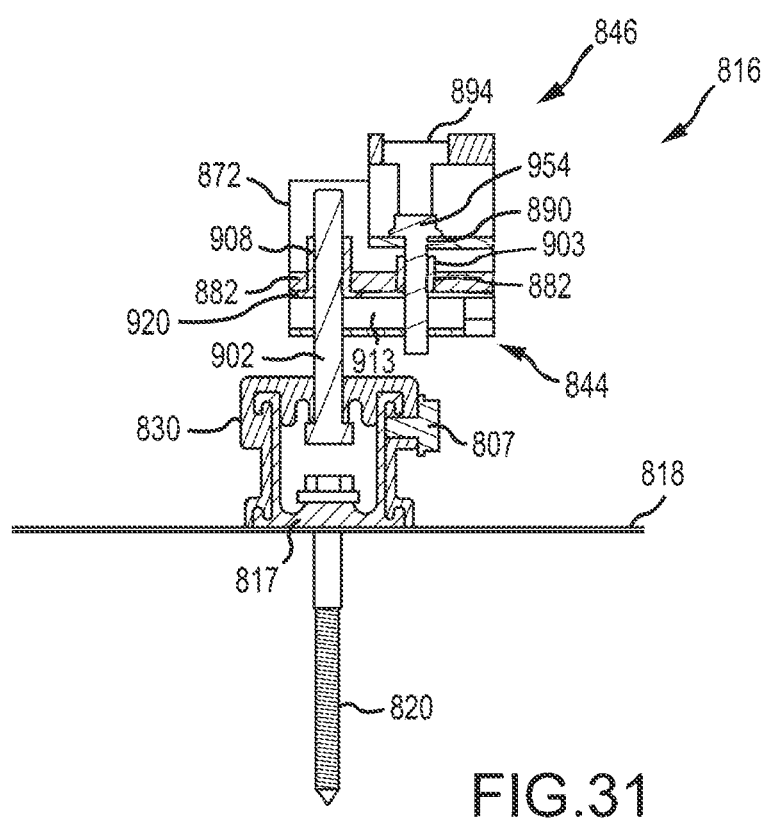
FIG. 31 is a cross sectional view of the mounting bracket taken along line D-D of FIG. 28.

The illustrated first clamp portion 844 includes a first support surface 870a and a second support surface 870b separated by walls 872. The first support surface 870a is constructed as a hook that defines a channel 809. Stated another way, the first support surface 870a is discontinuous due to a gap created by the channel 809. The illustrated gap functions similar to the recesses 74, 674 to provide sufficient clearance between the first clamp portion 844 and the second clamp portion 846 to allow a solar panel 814 to rotate into position. A portion of the first support surface 870a is also flexible to bend or deform generally along a first axis 886. The illustrated channel 809 is configured and sized to receive one or more wires or cords. The second support surface 870b includes a channel 878 that extends below the second support surface 670b. In contrast to the channels 78, 678, the channel 878 openings away from the standoff 830. Located between the walls 872 are apertures 882. In other embodiments, one of the apertures 882 may be a threaded aperture. In addition, the first clamp portion 844 is moveable relative to the standoff 830 along the first axis 886 (FIG. 30).

In the illustrated embodiment, the second clamp portion 846 includes a first aperture 890, a second aperture 894, a third aperture 811 and pins 815. The illustrated pins 815 extend towards the first clamp portion 844. Each pin 815 is located adjacent a respective clamping protrusion 898.

Figure 32:
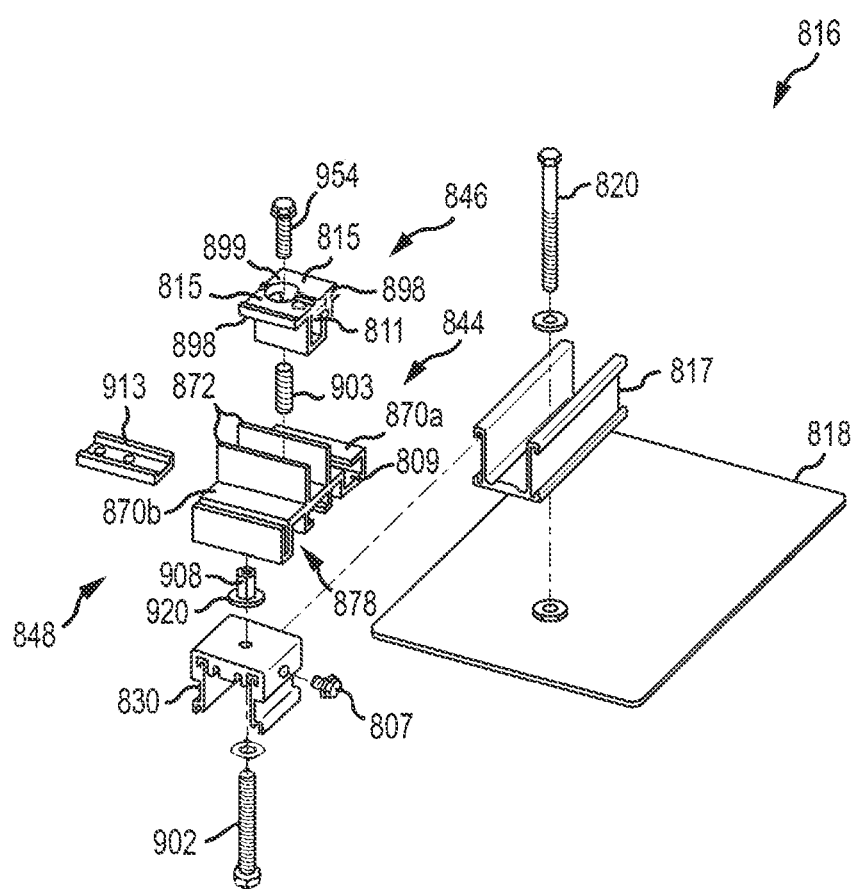
FIG. 32 is an exploded view of the mounting bracket of FIG. 28.
Figure 33:
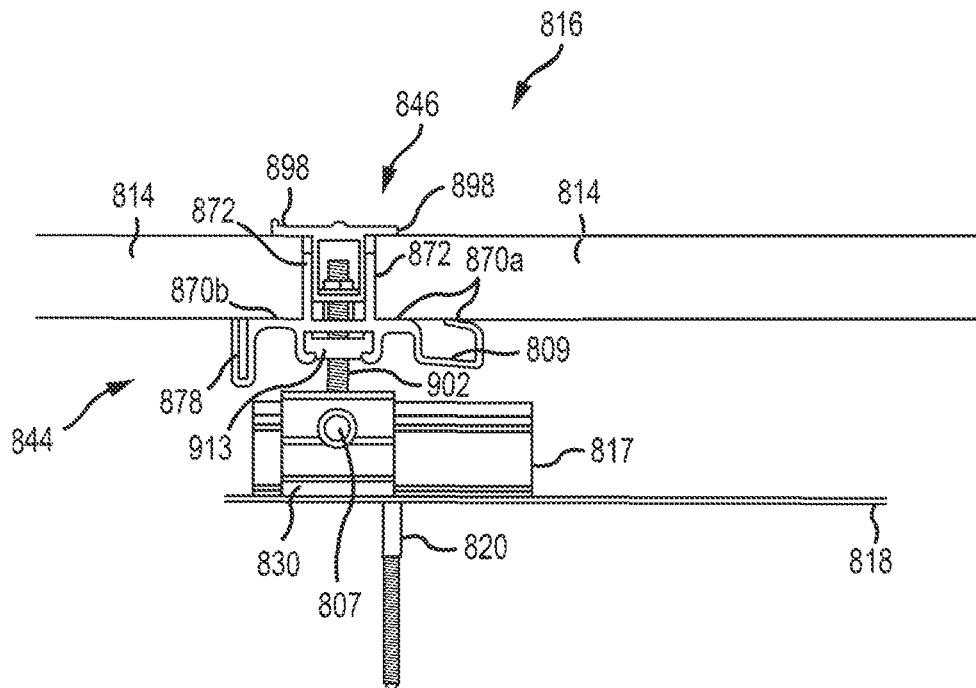
FIG. 33 is a side view of the mounting bracket of FIG. 28 with first and second solar panels mounted thereto.
Figure 34:
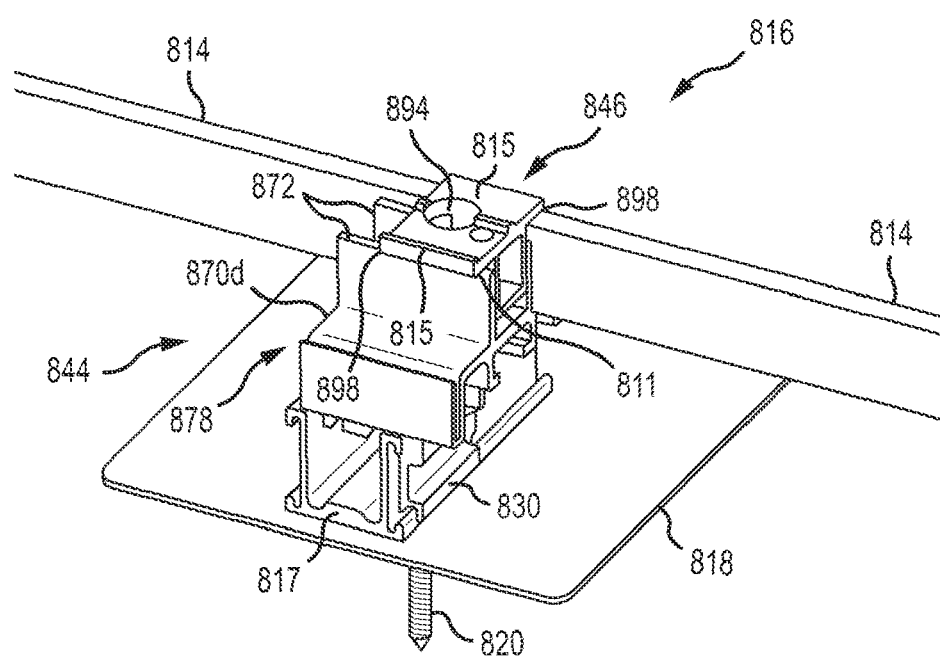
FIG. 34 is a perspective view of the mounting bracket of FIG. 28 with a solar panel mounted thereto.

With reference to FIG. 32, the illustrated adjustment assembly 848 includes a stud 902, an adjustment nut 908 having a protrusion 920, a securing fastener 954, a biasing member 903 and a locking nut 913. The stud 902 is threadably coupled to and extends from the standoff 830. The first clamp portion 844 and the second clamp portion 846 are received on the stud 902. The adjustment nut 908 is received in one of the first apertures 890, for example, the first aperture 890 including the larger diameter. The locking nut 913 is slidably coupled to the first clamp portion 844 below the adjustment nut 908. The locking nut 913 includes two apertures that respectively align with the apertures 882 of the first clamp portion 844. The illustrated locking nut 913 holds the adjustment nut 908 in place within the first aperture 890. The adjustment nut 908 and the locking nut 913 are both received on the stud 902. The securing fastener 954 is received through the other first aperture 890 and threadably engages the first clamp portion 844. The biasing member 903 is concentric with the securing fastener 954 and is located between the first and the second clamp portions 844, 846 to bias the second clamp portion 846 away from the first clamp portion 844.

Operation of securing the solar panels 814 to the mounting bracket 816 is a similar process to the mounting bracket 616, as described above. However, the support surface 870a acts as a spring to bias the solar panel 814 against the second clamp portion 846. Once the second clamp portion 846 is clamped onto the solar panel 814, the pins 815 engage a top surface of the solar panel 814 to provide an electrical bond therebetween.

Figure 35:
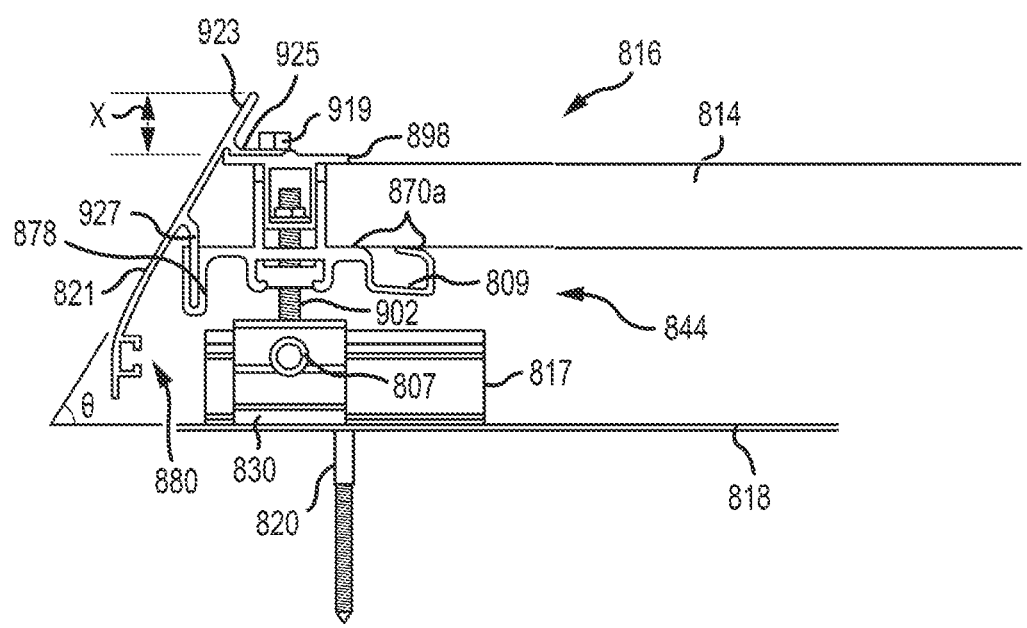
FIG. 35 is a right side view of the mounting bracket of FIG. 28 with a solar panel and a skirt mounted thereto.
Figure 36:
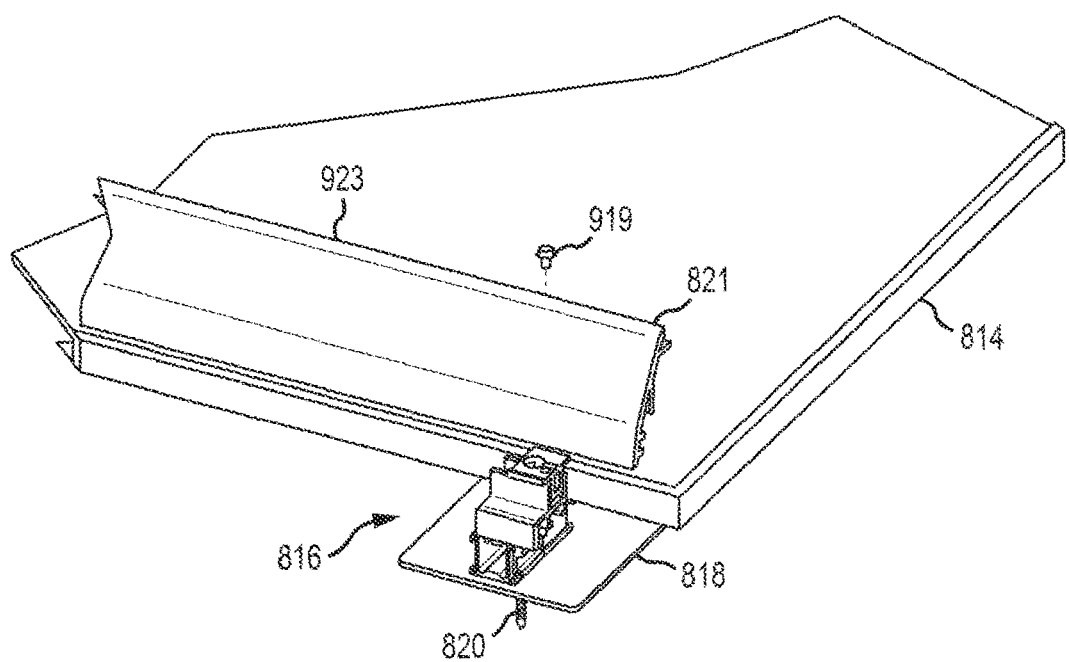
FIG. 36 is a partially exploded perspective view of FIG. 35.

With reference to FIGS. 35 and 36, a skirt 821 may be coupled to the mounting bracket 816 by a bonding screw 919. The bonding screw 919 is threaded into the third aperture 811 of the second clamp portion 846. In the illustrated embodiment, the skirt 821 is orientated at an angle 8 relative to the flashing 816 (e.g., the surface of the roof 12). The illustrated angle 8 is about 60 degrees, but in other embodiments the angle 8 can range from about 20 degrees to about 80 degrees. The illustrated skirt 821 includes a snow fence protrusion 923, a top protrusion 925 and a bottom protrusion 927. The illustrated snow fence protrusion 923 extends above the second clamp portion 846 at a distance X. The illustrated distance X is about one inch, but in other embodiments, the distance X may be greater than an inch. The bottom protrusion 927 slides along the channel 878 of the first clamp portion 844. The bottom protrusion 927 can be vertically moved into and out of the channel 878 upon height adjustment of the second clamp portion 846 with respect to the first clamp portion 844. The illustrated top protrusion 925 engages a lip on the top of the second clamp portion 846. The bonding screw 919 abuts the top protrusion 925 and upon tightening of the bonding screw 919 presses the top protrusion 925 against the top surface of the second clamp portion 846. In addition, the skirt 821 includes a channel 880 having ridges, which function similar to the channel 78 and the ridges 88 of the mounting bracket 16, to further secure the skirt 821 to the mounting bracket 816 by a bolt (not shown).

In addition, the pins 815 are sized to engage the skirt 821 to mechanically and electrically connect the mounting bracket 816 to the skirt 821. Upon rotation of the bonding screw 919, the skirt 821 is pressed against the pins 815 and deformed to create a mechanical and electrical bond between the skirt 821 and the mounting bracket 816. In some embodiments, the bonding screws 919 and the pins 815 cut into the skirt 821 to form an electrical bond. In embodiments that include two solar panels 814, the bonding screws 919 cut into one or more of the solar panel frames 814 to form an electrical bond.

Figure 37:
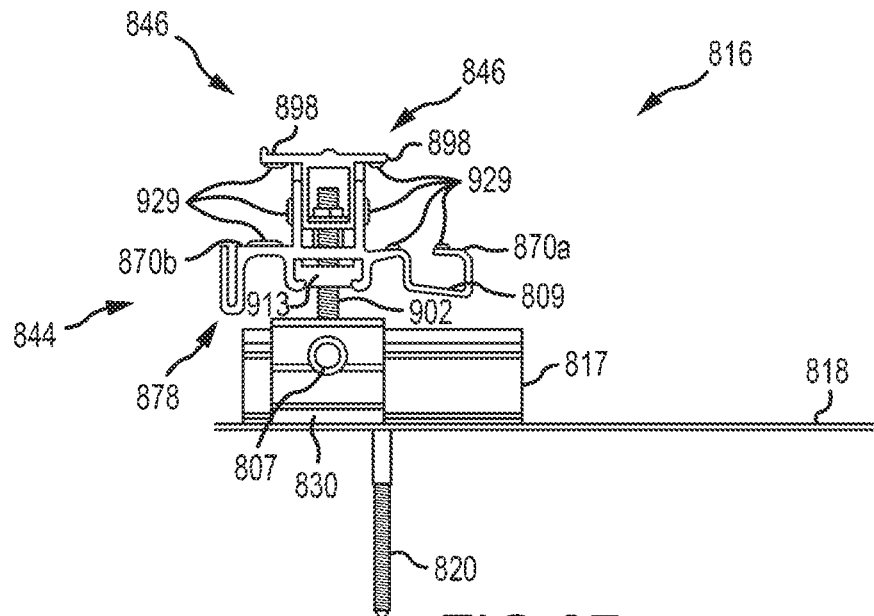
FIG. 37 is a side view of the mounting bracket of FIG. 28 including cushions that are positioned to contact solar panels.
Figure 38:
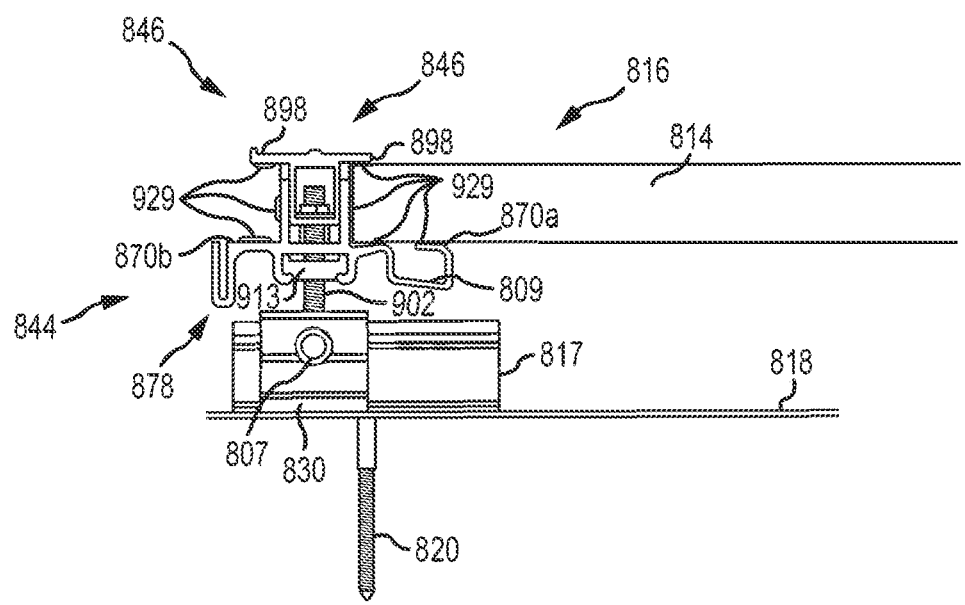
FIG. 38 is a side view of FIG. 37 with a solar panel supported on some of the cushions.
Figure 39:
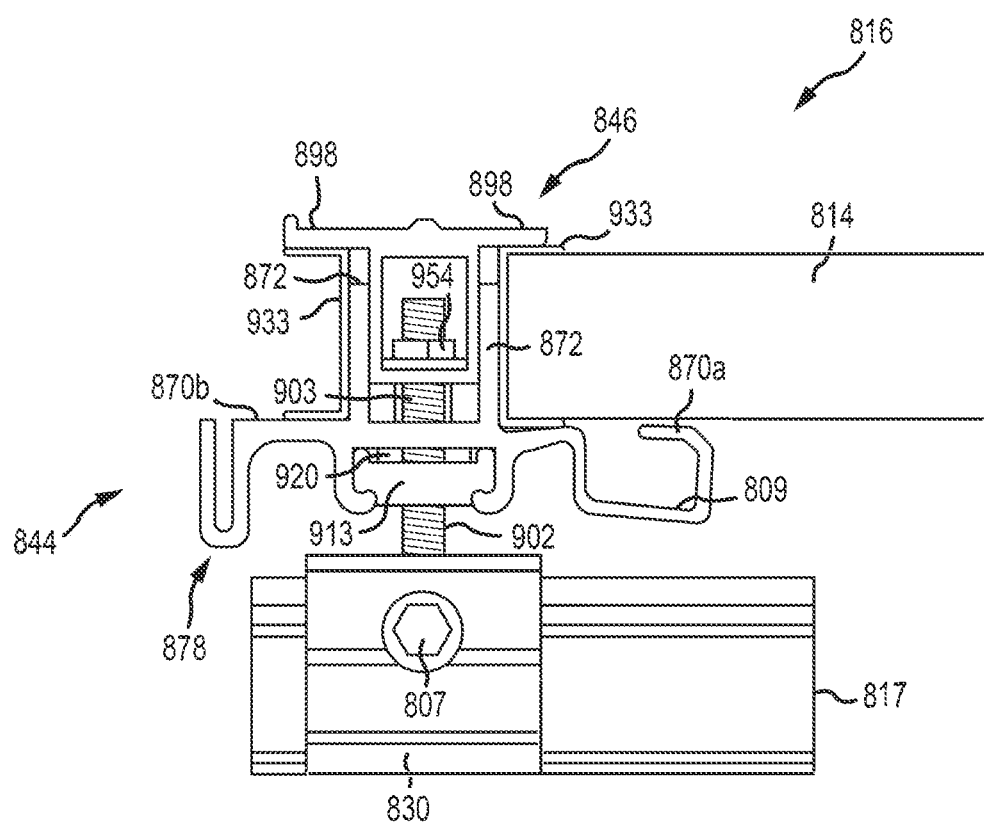
FIG. 39 is a side view of the mounting bracket of FIG. 28 with a cushion positioned between the mounting bracket and the solar panel.

As shown in FIGS. 37-39, the first and second clamp portions 844, 846 can include a plurality of first cushions 929 that contact the solar panel 814. As shown in FIG. 39, a second cushion 933 is positioned between the solar panel 814 and the first and second clamp portions 844, 846. In some embodiments, the cushions 929, 933 inhibit scratching of the solar panels 814 by the first and second clamp portions 844, 846. In some embodiments, the cushions 929, 933 can inhibit the solar panels 814 from rattling when installed in a windy climate. The cushions 929, 933 can be included on one or more of the clamps described and illustrated herein.

Figure 40:
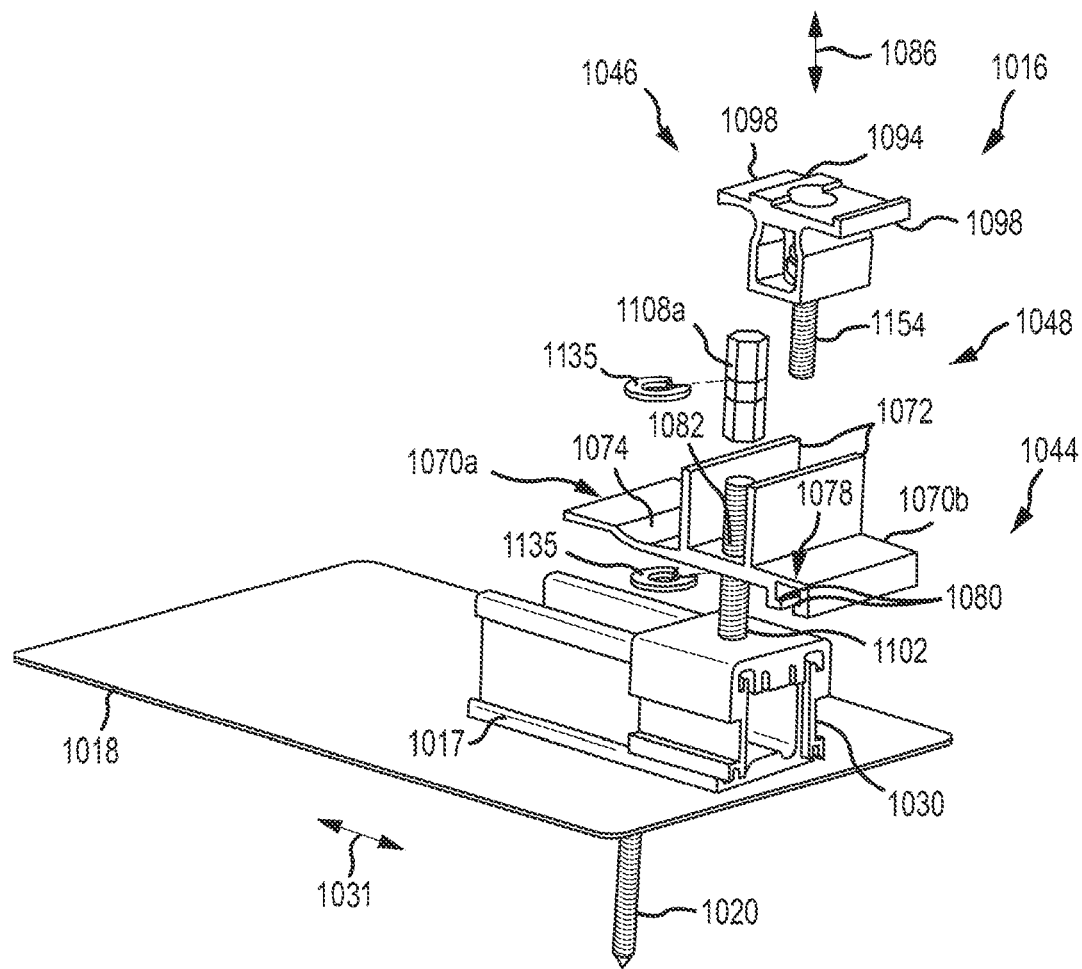
FIG. 40 is an exploded view of a mounting bracket according to some embodiments of the present invention.
Figure 41:
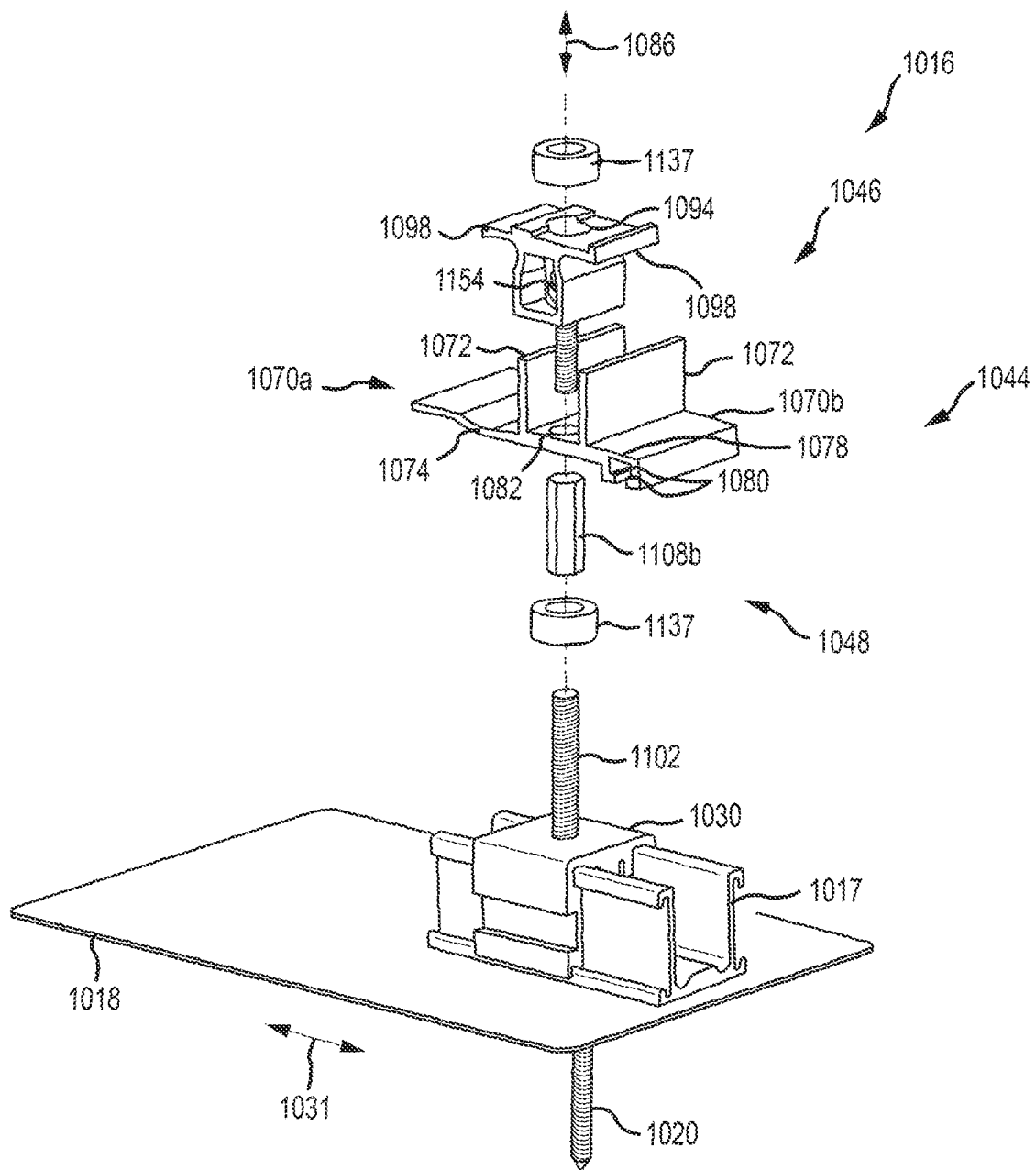
FIG. 41 is an exploded view of a mounting bracket according to some embodiments of the present invention.
Figure 42:
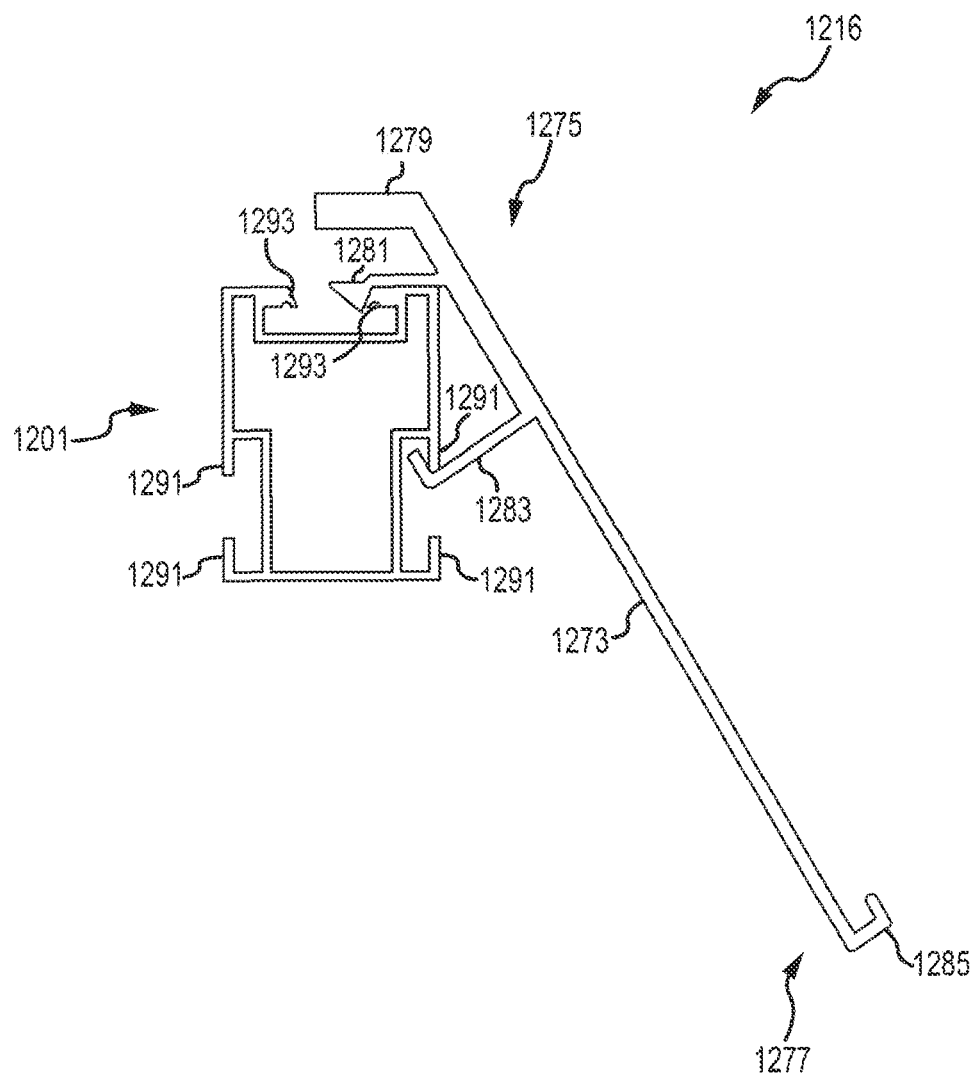
FIG. 42 illustrates a skirt and bracket arrangement according to some embodiments of the present invention.
Figure 43:
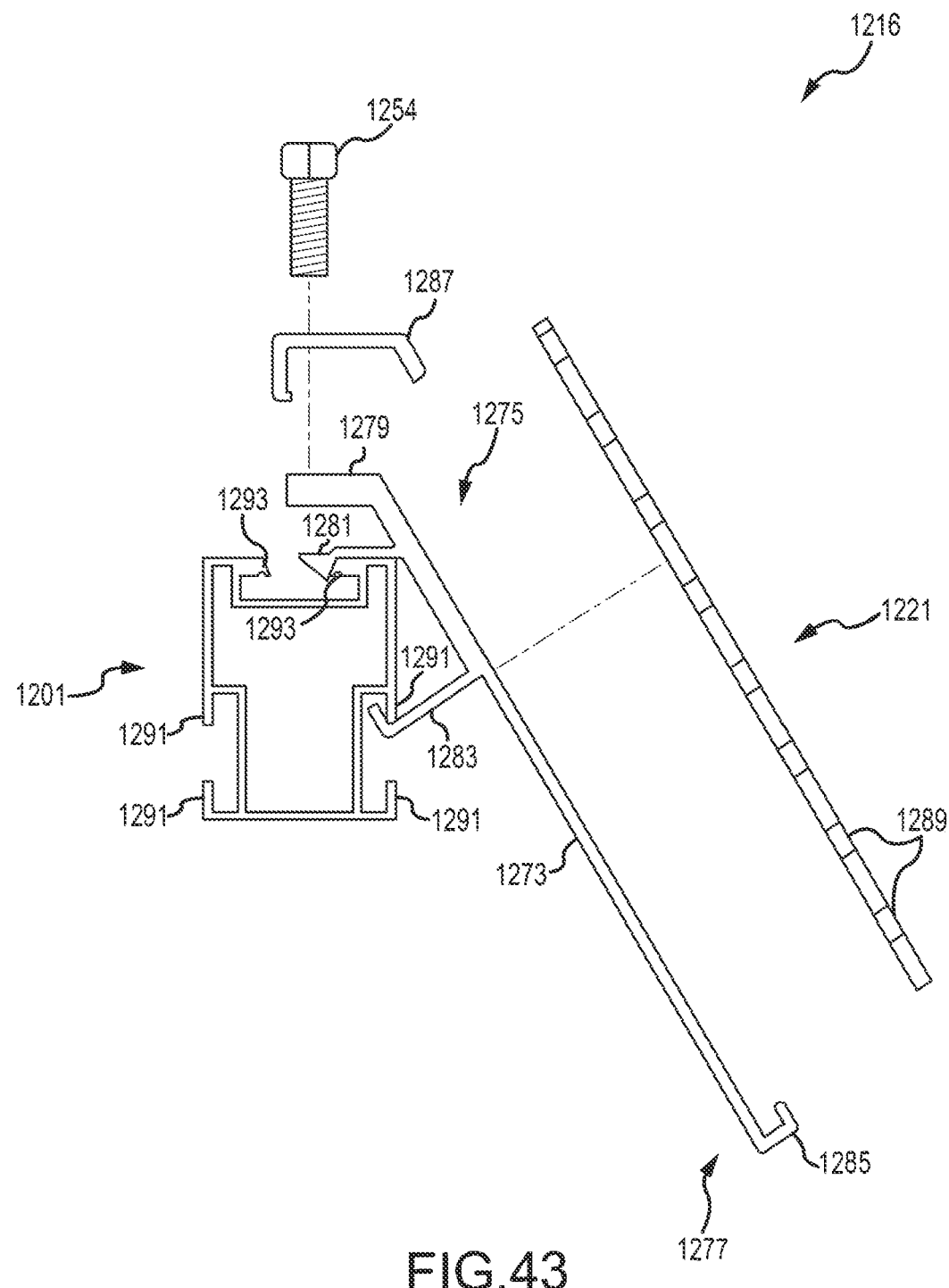
FIG. 43 is an exploded side view of the bracket arrangement including the skirt of FIG. 42.
Figure 44:
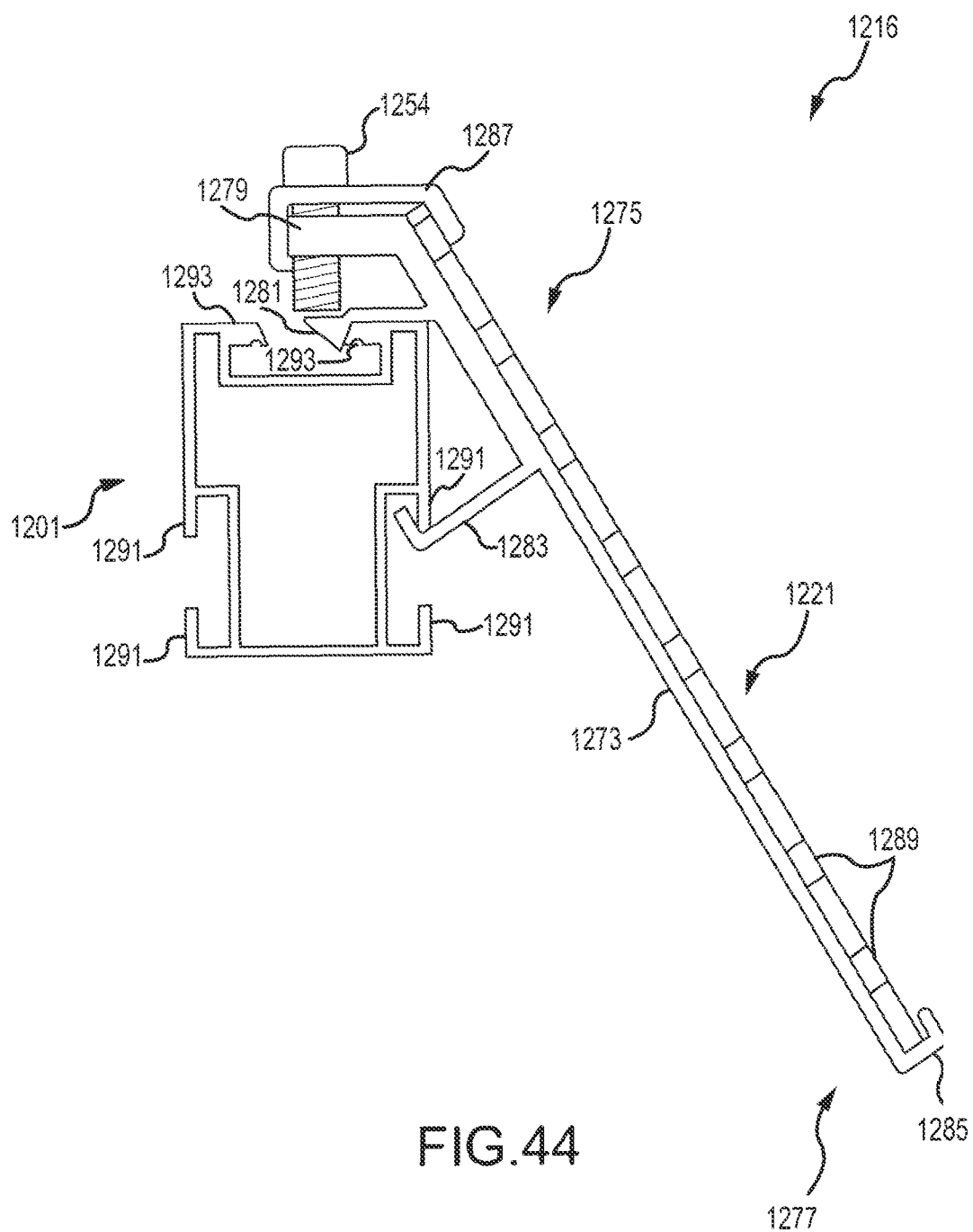
FIG. 44 is an assembled side view of the skirt and bracket arrangement of FIG. 42.

FIGS. 40 and 41 illustrate a mounting bracket 1016 according to another embodiment. The mounting bracket 1016 is similar to the mounting brackets 16, 616 and 816; therefore, like components have been given like reference numbers and only the differences between the mounting brackets will be discussed in detail. Furthermore, components or features described with respect to only one or some of the embodiments described herein are equally applicable to any other embodiments described herein.

The illustrated mounting bracket 1016 includes a slide 1017, a standoff 1030, a first clamp portion 1044, a second clamp portion 1046, and an adjustment assembly 1048. The illustrated slide 1017 abuts a flashing 1018 and both are secured to the roof 12 by a roof fastener 1020. The illustrated standoff 1030 is coupled to the slide 1017 and moves parallel to a second axis 1031 relative to the slide 1017. The standoff 1030 is selectively fixed relative to the slide 1017 by a locking bolt (similar to the locking bolt 807).

The illustrated first clamp portion 1044 includes a first support surface 1070a and a second support surface 1070b separated by walls 1072. The first support surface 1070a includes a recess 1074 that defines as a curvilinear depression on the first support surface 1070a. The second support surface 1070b includes a channel 1078 having ridges 1080 that protrudes below the second support surface 1070b. Located between the walls 1072 are apertures 1082 (only one is illustrated in FIGS. 40 and 41) with one aperture being a threaded aperture (e.g., the aperture not shown in FIGS. 40 and 41). In addition, the first clamp portion 1044 is moveable relative to the standoff 1030 along a first axis 1086.

The second clamp portion 1046 includes a first aperture, a second aperture 1094 and clamping protrusions 1098. The illustrated first aperture is constructed with a smaller diameter than the second aperture 1094, and the first aperture substantially aligns with the second aperture 1094. Also, the second clamp portion 1046 is moveable along the first axis 1086 relative to the first clamp portion 1044.

With reference to FIG. 40, the illustrated adjustment assembly 1048 includes a stud 1102, an adjustment nut 1108a having snap rings 1135, and a securing fastener 1154. The adjustment nut 1108a threadably engages the stud 1102 and is received through one of the apertures 1082. As such, the snap rings 1135 are coupled to grooves defined on the adjustment nut 1108a such that one snap ring 1135 is located above the first clamp portion 1044, and the other snap ring 1135 is located below the first clamp portion 1044. In other embodiments, the adjustment assembly 1048 may include a biasing member (e.g., a spring) to bias the second clamp portion 1046 away from the first clamp portion 1044.

FIG. 41 illustrated an alternative embodiment of an adjustment nut that can be utilized in place of the adjustment nut 1108a shown in FIG. 40. An adjustment nut 1108b, as illustrated in FIG. 41, threadably engages the stud 1102 and is received through one of the apertures 1082. Collars 1137 are fixed to the adjustment nut 1108b such that one collar 1137 is located above the first clamp portion 1044 and one collar 1137 is located below the first clamp portion 1044. In other embodiments, the adjustment assembly 1048 may include a biasing member (e.g., a spring) to bias the second clamp portion 1046 away from the first clamp portion 1044.

Operation of securing the solar panels 14 to the mounting bracket 1016 is similar to the mounting bracket 816. In particular, the adjustment nuts 1108a, 1108b are rotatable about the stud 1102 but are inhibited from axial movement with respect to the first clamp portion 1044 via the snap rings 1135 and the collars 1137 to adjust the first clamp portion 1044 to a desired height above the roof 12. The securing fastener 1154 threadably engages the first clamp portion 1044 to clamp the solar panels 14 between the clamp portions 1044, 1046.

FIGS. 42-46 illustrate a mounting bracket 1216 according to another embodiment. Components or features described with respect to only one or some of the embodiments described herein are equally applicable to any other embodiments described herein.

The illustrated mounting bracket 1216 includes a skirt bracket 1273 coupled to a rail 1201. The illustrated rail 1201 is similar to the rail 401. In other embodiments, the mounting bracket 1216 may couple the skirt bracket 1273 to other embodiments of the mounting bracket 16,216,416, 616, 816. For example, the skirt bracket 1273 may directly connect to the first clamp portion 44,244,444, 644, 844.

The illustrated rail 1201 includes side fingers 1291 and top fingers 1293. The side fingers 1291 define an opening to channels located on a side of the rail 1201, and the top fingers 1293 define an opening to a channel located on a top of the rail 1201. The rail 1201 is configured to be utilized in a rail-based system to couple the solar panels 14 to the roof 12.

Figure 45:
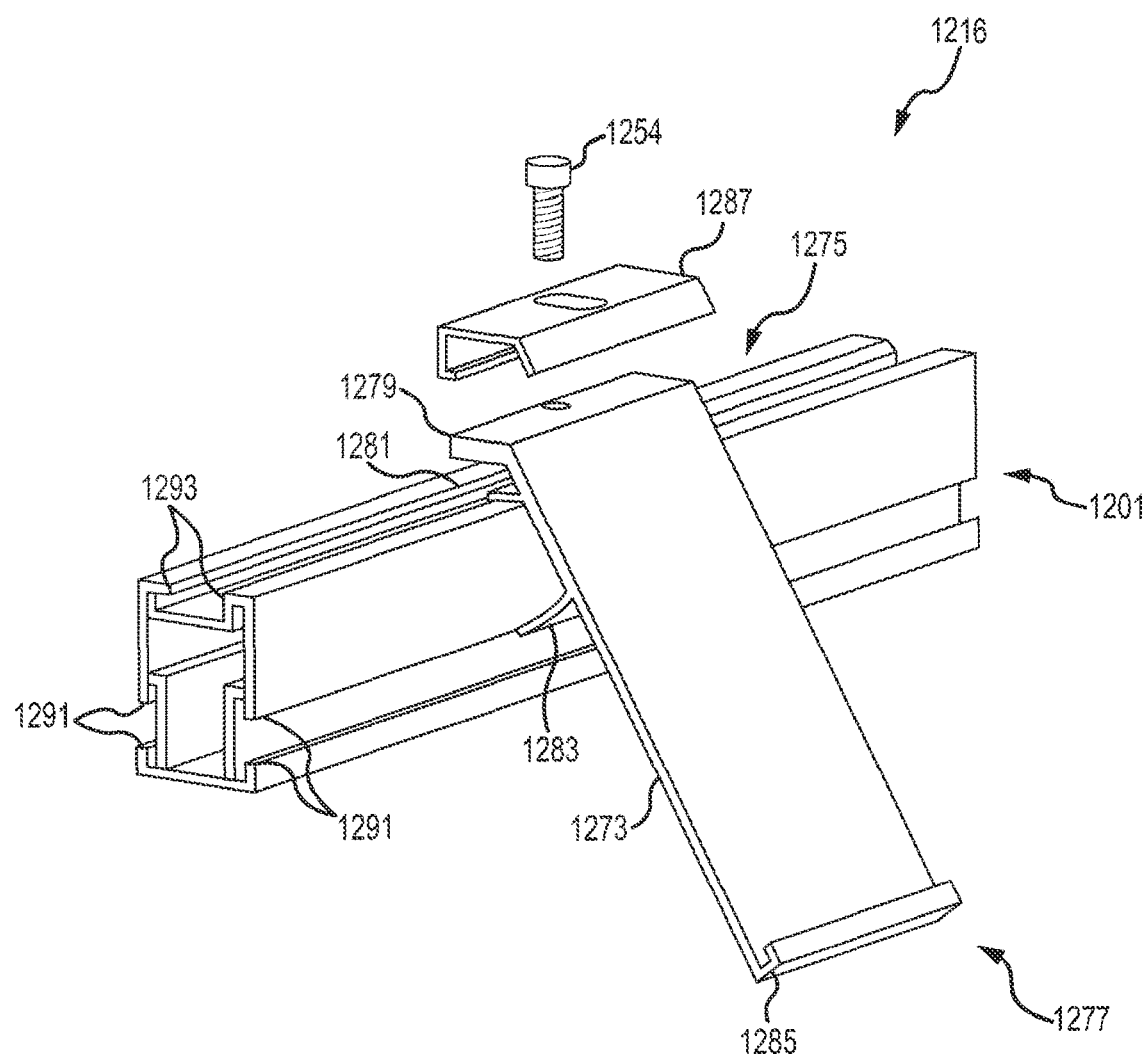
FIG. 45 is a partially exploded perspective view of the skirt and bracket arrangement of FIG. 42.
Figure 46:
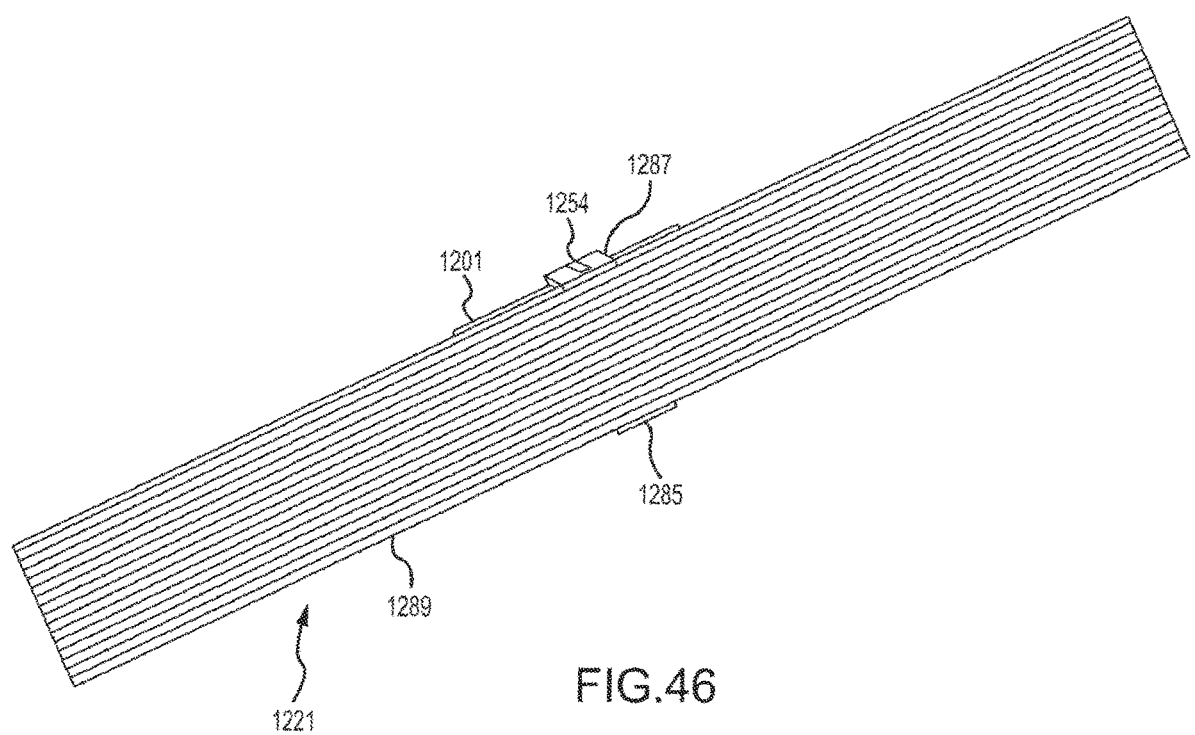
FIG. 46 is a perspective view of the skirt and bracket arrangement of FIG. 42.
Figure 47:
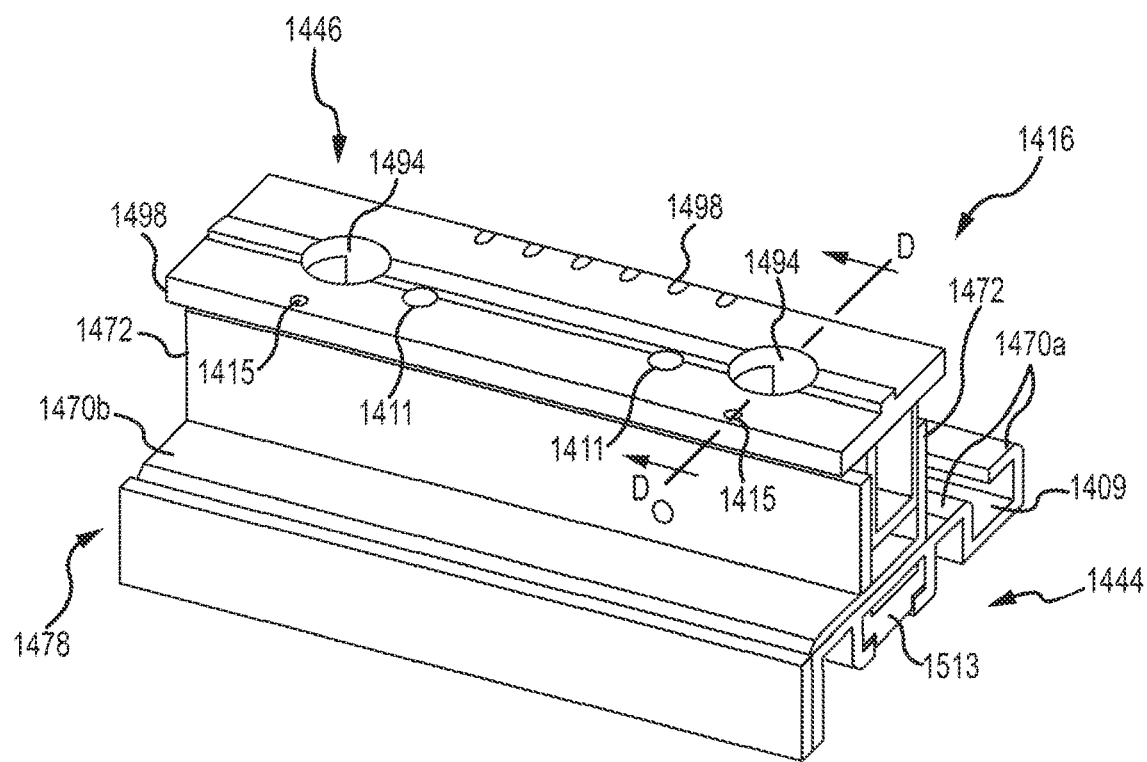
FIG. 47 is a perspective view of a mounting bracket according to some aspects of the present invention.
Figure 48:
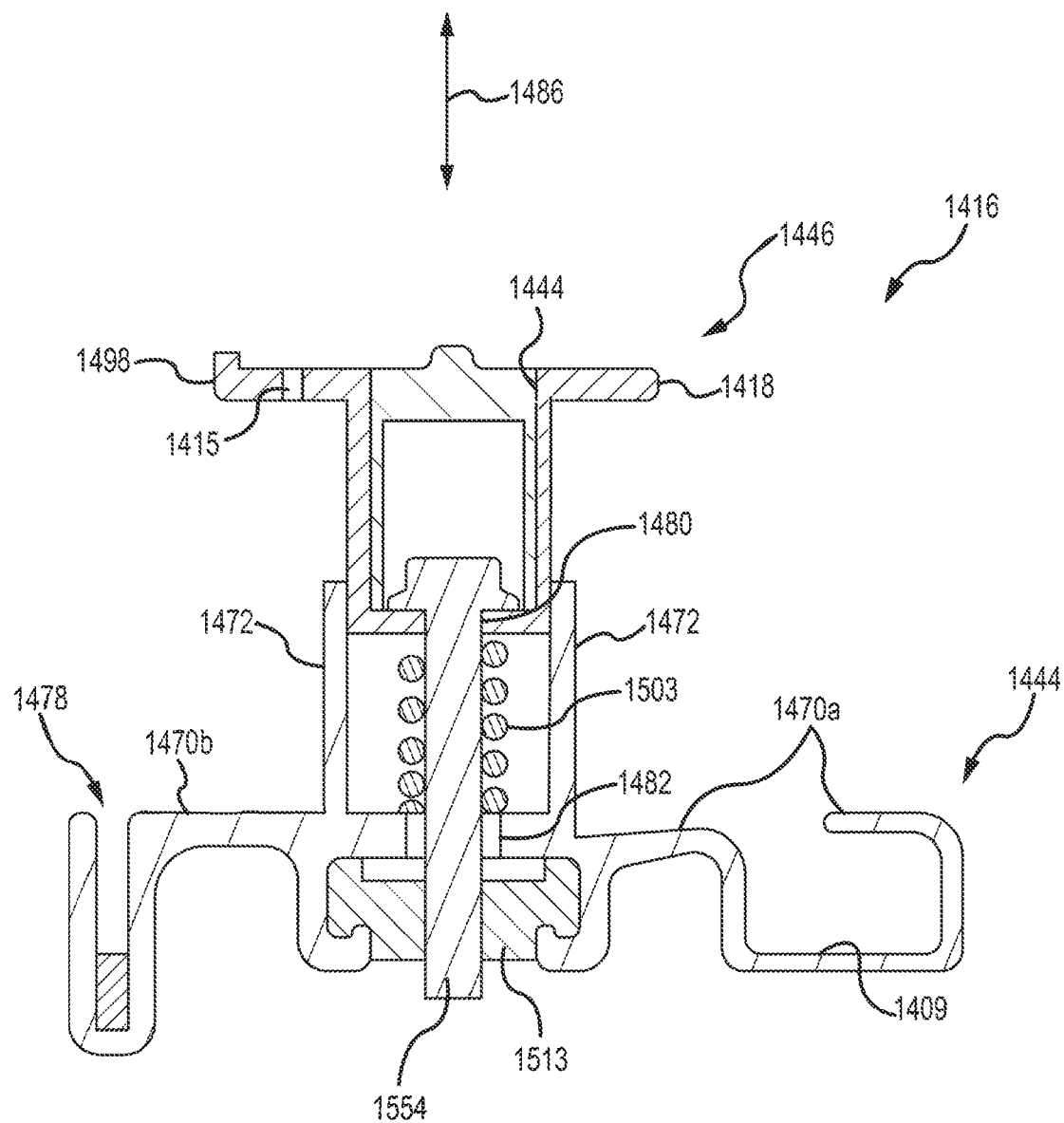
FIG. 48 is a cross sectional view of the mounting bracket taken along line D-D of FIG. 47.
Figure 49:
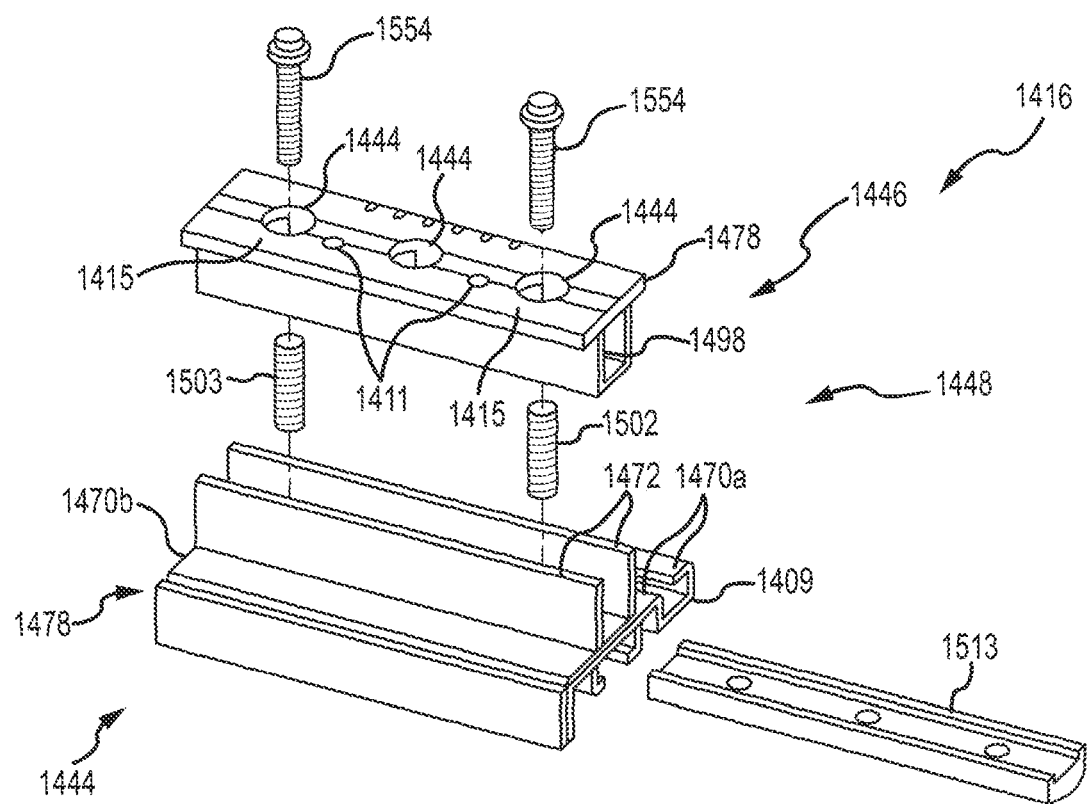
FIG. 49 is an exploded view of the mounting bracket of FIG. 47.

The illustrated skirt bracket 1273 includes a first end 1275 and a second end 1277 spaced from the first end 1275. The first end 1275 includes a first, a second and a third flange 1279, 1281, 1283. The illustrated first flange 1279 includes a threaded aperture (FIG. 45). A hook portion 1285 is located near the second end 1277. In addition, the skirt bracket 1273 includes a top plate 1287 and a securing fastener 1254.

The skirt 1221 is similar to the skirt 21 includes a top edge, a bottom edge, a first side edge, a second side edge and a plurality of perforations 1289. In some embodiments, the perforations 1289 are spaced across substantially the entire skirt 1221, whereas in other embodiments the perforations 1289 are positioned only on portions of the skirt 1221. In the illustrated embodiment, the perforations 1289 are ¼ inch holes. In some embodiments, the skirt 1221 is constructed from aluminum, such as extruded aluminum. In other embodiments, the skirt 1221 may be a solid member.

To assemble the skirt bracket 1273 onto the rail 1201, the skirt bracket 1273 is pivotally coupled to the rail 1201. In particular, the third flange 1283 engages one side finger 1291. Then, the second flange 1281 is able to rotate towards one of the top fingers 1293 to engage with the top finger 1293. As such, the skirt bracket 1273 snaps onto the rail 1201 by engagement between the top finger 1293 and the second flange 1281. In the illustrated embodiment, the skirt brackets 1273 are positioned periodically along a base of the roof 12.

To assembly the skirt 1221 to the skirt bracket 1273, the skirt 1221 is received into the hook portions 1285 of adjacent skirt brackets 1273 extending along the roof 12. As a result, the skirt 1221 is seated flush with the skirt bracket 1273. The top plate 1287 is fixedly coupled to the first flange 1279 by the securing fastener 1254 such that the skirt 1221 is secured between the top plate 1287 and the skirt bracket 1273. In addition, the first flange 1279 is positioned above the rail 1201, which functions as a snow fence protrusion, to inhibit snow and ice from sliding off the solar panels 14 and the roof 12.

The skirt 1221 is oriented at a non-parallel, non-perpendicular angle with respect to the rail 1201 and ultimately the roof 12. The shape of the skirt bracket 1273 and the angle of the solar panel 14 and the roof 12 that the skirt bracket 1273 is attached to affect the angle between the skirt 1221 and the roof 12. The angle is selected to inhibit a viewer on the ground surface from viewing the area between the solar panels 14 and the roof 12 through the perforations 1289 in the skirt 1221. However, air is permitted to flow through the area between the solar panels 14 and the roof 12 because of the perforations 1289. This air flow allows cooling of the solar panels 14 but inhibits small animals and birds from entering the area between the solar panel 14 and the roof 12. The skirt 1221 also inhibits debris from gathering between the solar panels 14 and the roof 12.

FIGS. 47-51 illustrate a mounting bracket 1416 according to another embodiment. The mounting bracket 1416 is similar to the mounting brackets 16 and 816; therefore, like components have been given like reference numbers and only the differences between the mounting brackets will be discussed in detail. Furthermore, components or features described with respect to only one or some of the embodiments described herein are equally applicable to any other embodiments described herein.

The illustrated mounting bracket 1416 includes a first clamp portion 1444, a second clamp portion 1446 and an adjustment assembly 1448. The illustrated first clamp portion 1444 includes a first support surface 1470a defining a channel 1409 and a second support surface 1470b having a channel 1478. Walls 1472 separate the support surfaces 1470a, 1470b with first apertures 1482 located between the walls 1472. In other embodiments, the first apertures 1482 may be threaded apertures.

In the illustrated embodiment, the second clamp portion 1446 includes first apertures 1490, second apertures 1494, third apertures 1411, pins 1415 and clamping protrusions 1498. The pins 1415 are located on one of the clamping protrusions 1498. The second clamp portion 1446 is moveable relative to the first clamp portion 1444 along a first axis 1486.

The illustrated adjustment assembly 1448 includes securing fasteners 1554, a locking nut 1513 and biasing members 1503. The locking nut 1513 engages with the first clamp portion 1444 and includes threaded apertures that align with respective first apertures 1482. The securing fasteners 1554 are concentric with the biasing members 1503 to bias the second clamp portion 1446 away from the first clamp portion 1444. The securing fasteners 1554 threadably engage the locking nut 1513.

Figure 50:
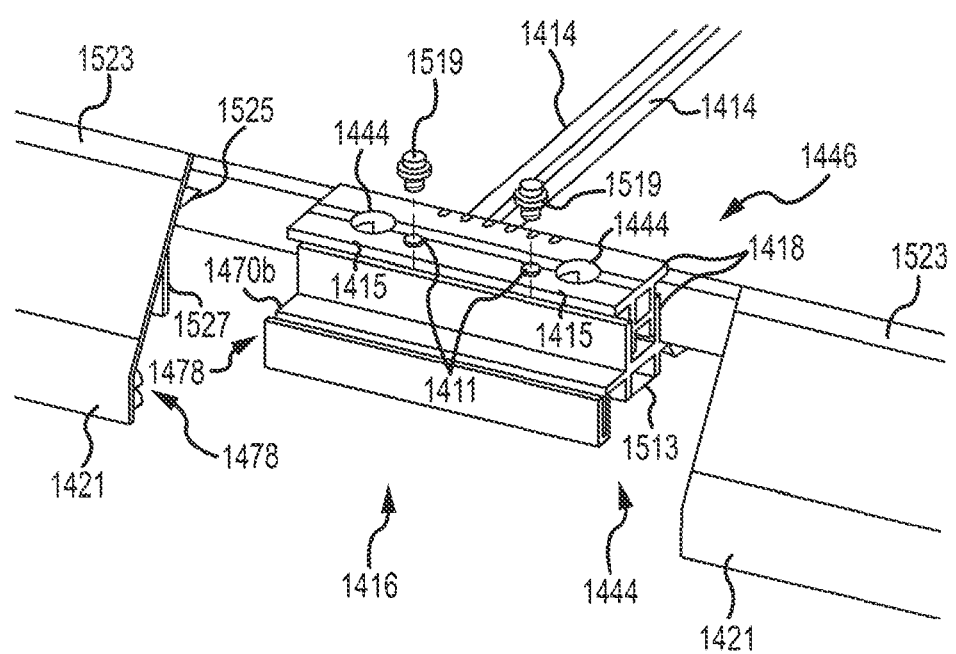
FIG. 50 is a perspective view of the mounting bracket of FIG. 47 installed on two solar panels and with two grounding screws and two sections of skirt exploded away from the mounting bracket.
Figure 51:
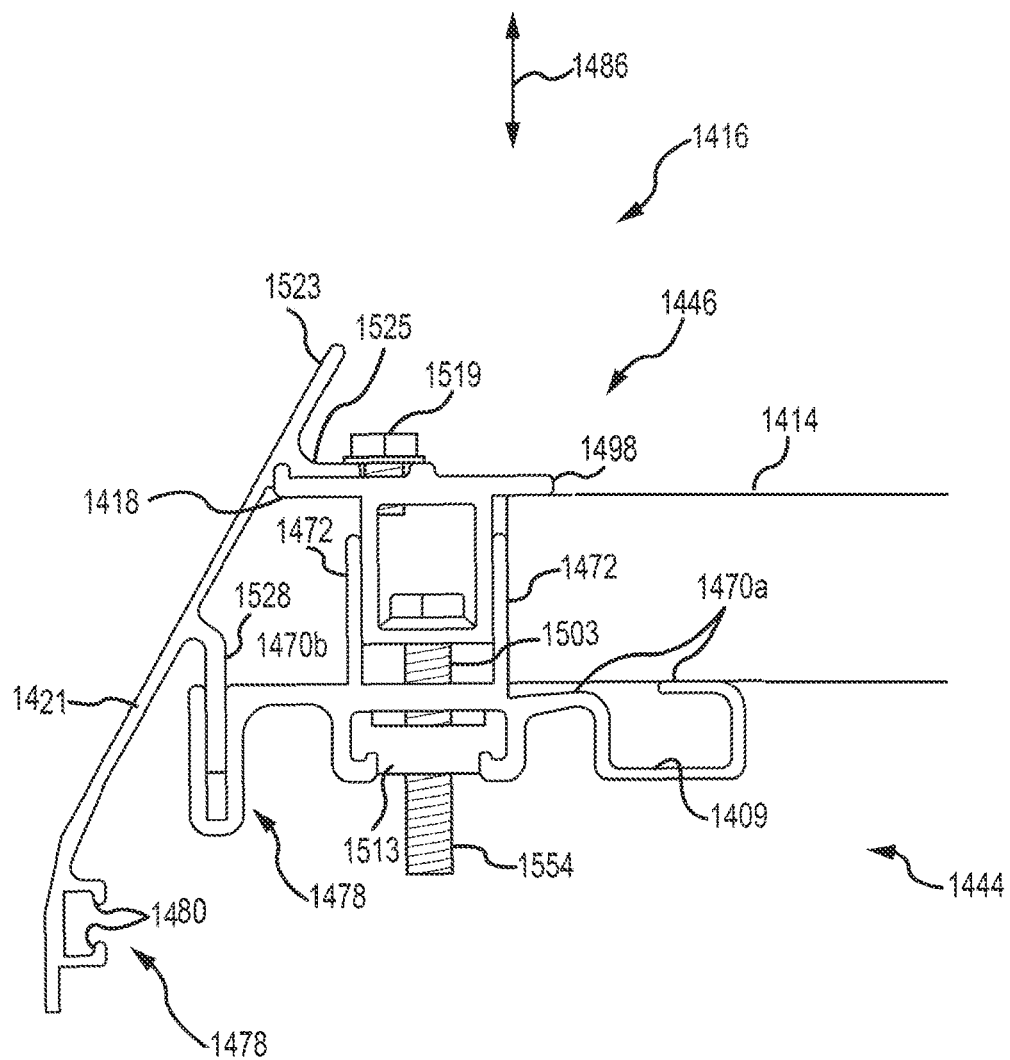
FIG. 51 is a side view of the mounting bracket connected to the solar panels and the skirt of FIG. 50.

In operation, the mounting bracket 1416 can couple two solar panels 1414 together, four solar panels 1414 together, or two solar panels 1414 in combination with two skirts 1421 together (FIGS. 50 and 51). The mounting bracket 1416 provides support to adjacent solar panels 1414 and/or adjacent skirts 1421 without coupling the mounting bracket 1416 directly to the roof 12. When clamping the mounting bracket 1416 onto solar panels 1414, the process is similar to the mounting bracket 816 as described above.

The illustrated skirt 1421 includes a snow fence protrusion 1523, a top protrusion 1525, a bottom protrusion 1527 and a channel 1478 having ridges 1480. As discussed above in reference to the skirt 821, the bottom protrusion 1527 slides along the channel 1478. The bottom protrusion 1527 can be vertically moved into and out of the channel 1478 upon height adjustment of the second clamp portion 1446 with respect to the first clamp portion 1444. The top protrusion 1525 engages a lip on the top of the second clamp portion 1446. Bonding screws 1519 abut the top protrusion 1525 and upon tightening of the bonding screws 1519, the top protrusion 1525 is pressed against the top surface of the second clamp portion 1446 and the pins 1415.

FIGS. 52-59 illustrate a mounting bracket 1616 according to another embodiment. The mounting bracket 1616 is similar to the mounting bracket 16; therefore, like components have been given like reference numbers incremented by 1600 and only the differences between the mounting brackets will be discussed in detail. In addition, components or features described with respect to only one or some of the embodiments described herein are equally applicable to any other embodiments described herein.

Figure 52:
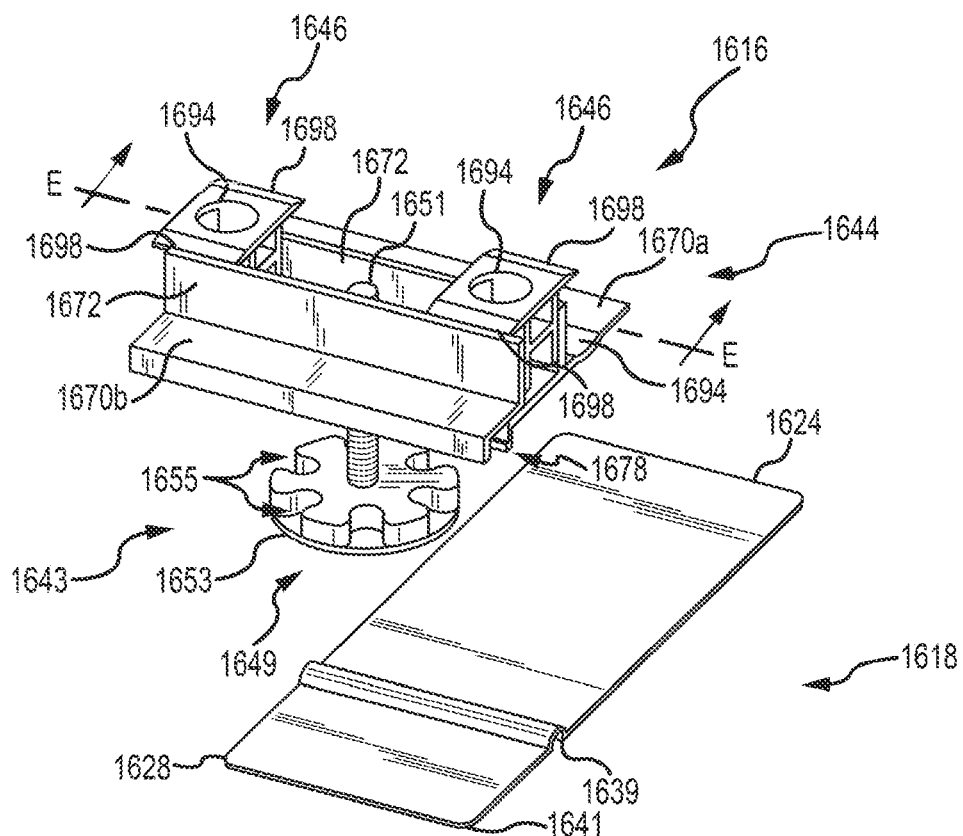
FIG. 52 is a partially exploded view of a mounting bracket coupled to a flashing according to some embodiments.
Figure 53:
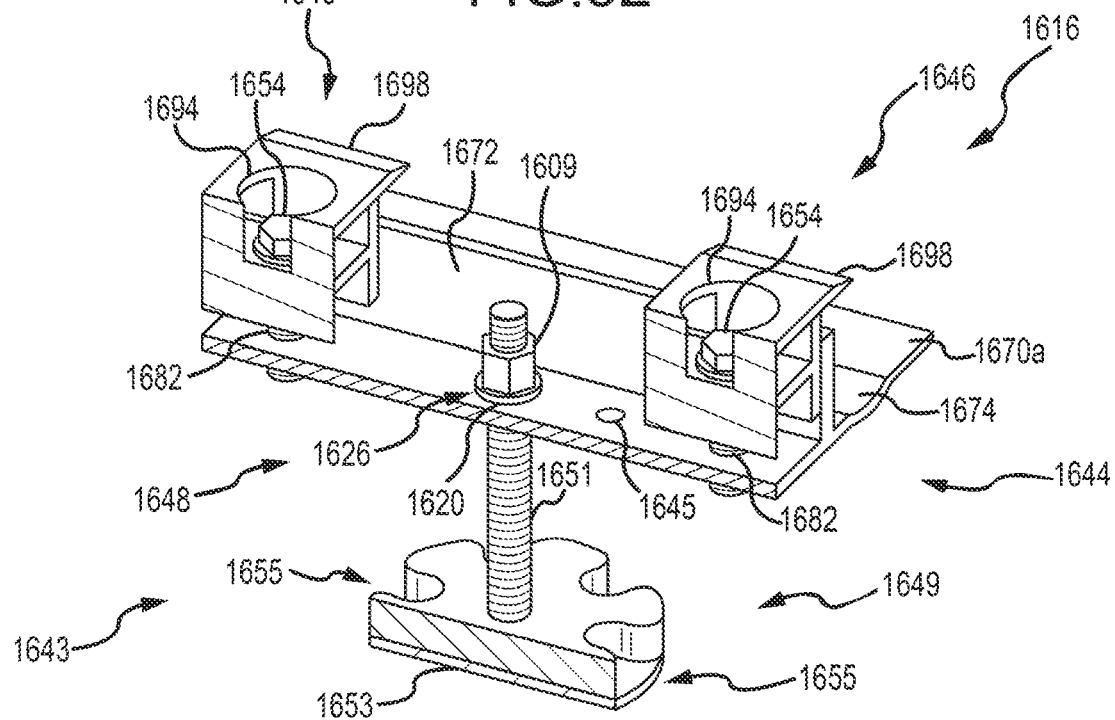
FIG. 53 is a cross sectional view of the mounting bracket taken along line E-E of FIG. 52.
Figure 54:
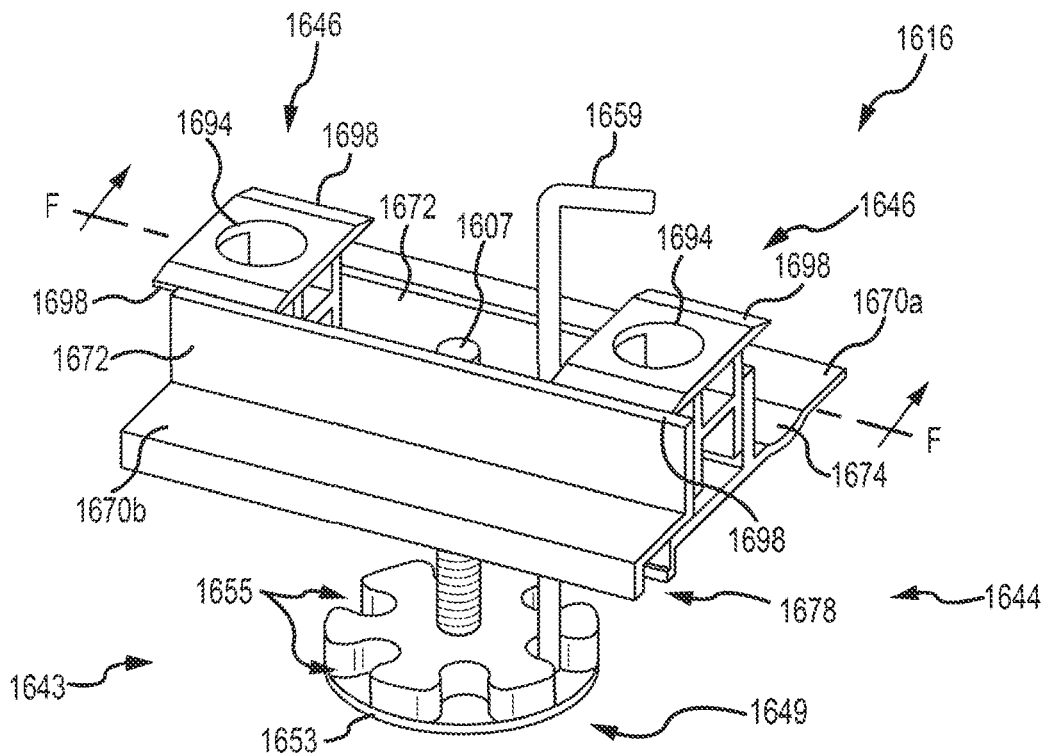
FIG. 54 is a perspective view of a tool used with the mounting bracket of FIG. 52.
Figure 55:
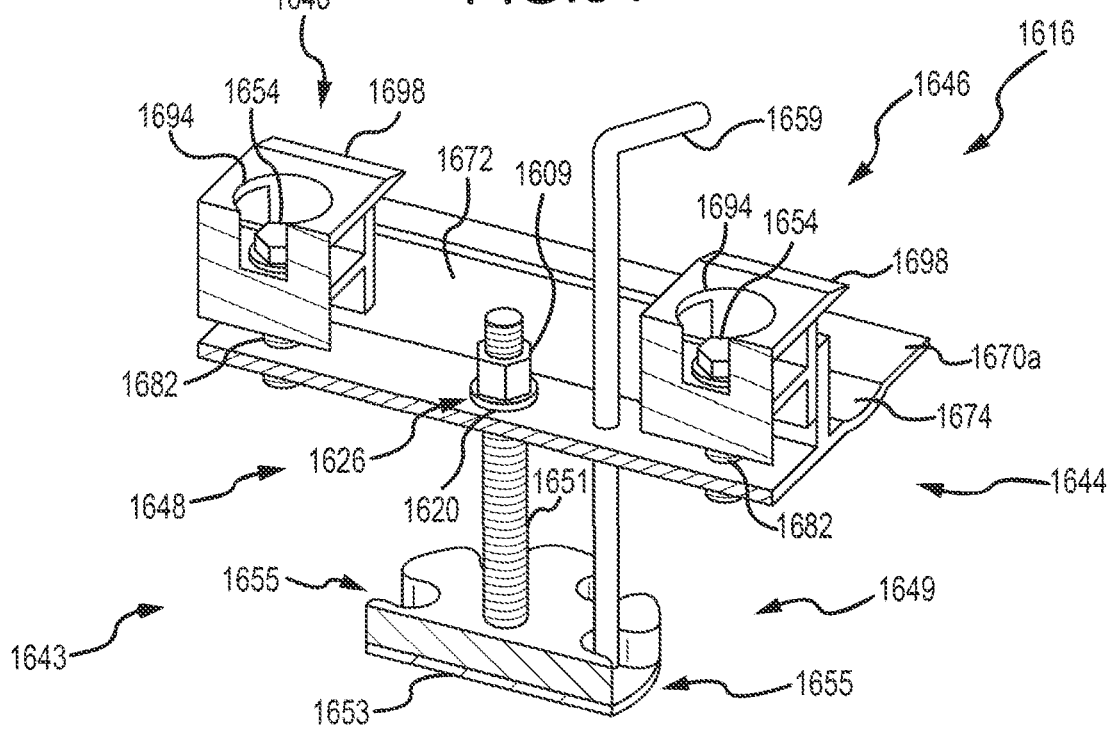
FIG. 55 is a cross sectional view of the mounting bracket taken along line F-F of FIG. 54.
Figure 56:
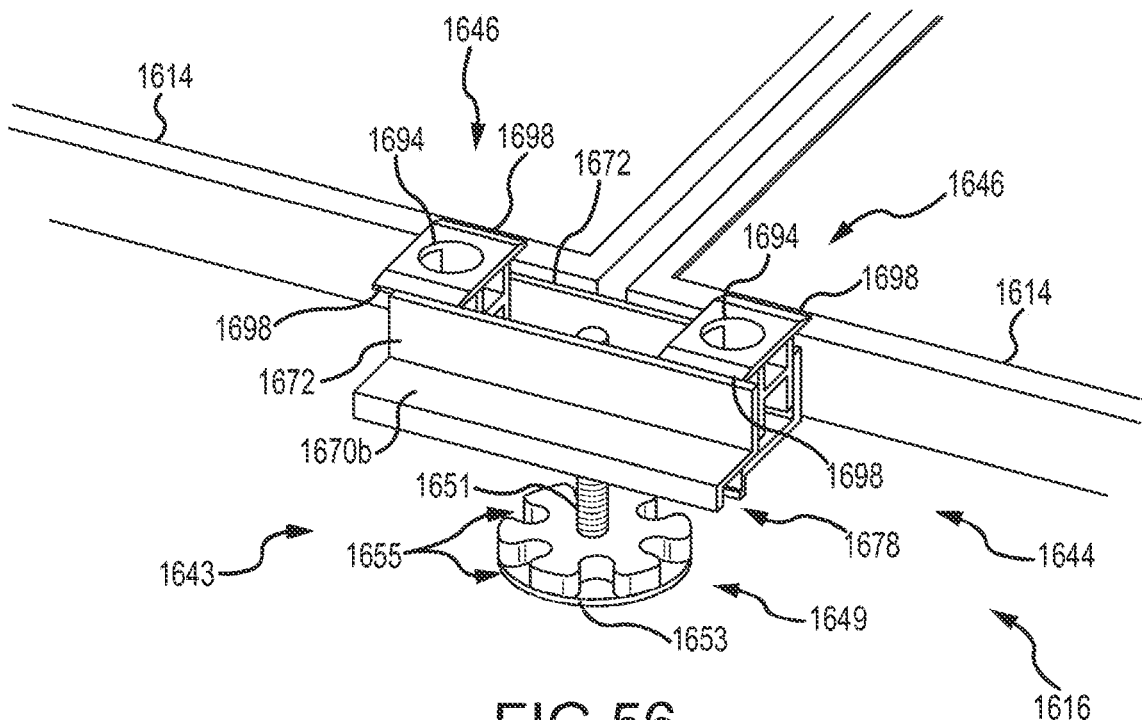
FIG. 56 is a perspective view of the mounting bracket of FIG. 52 coupled to two solar panels on a first support surface.
Figure 57:
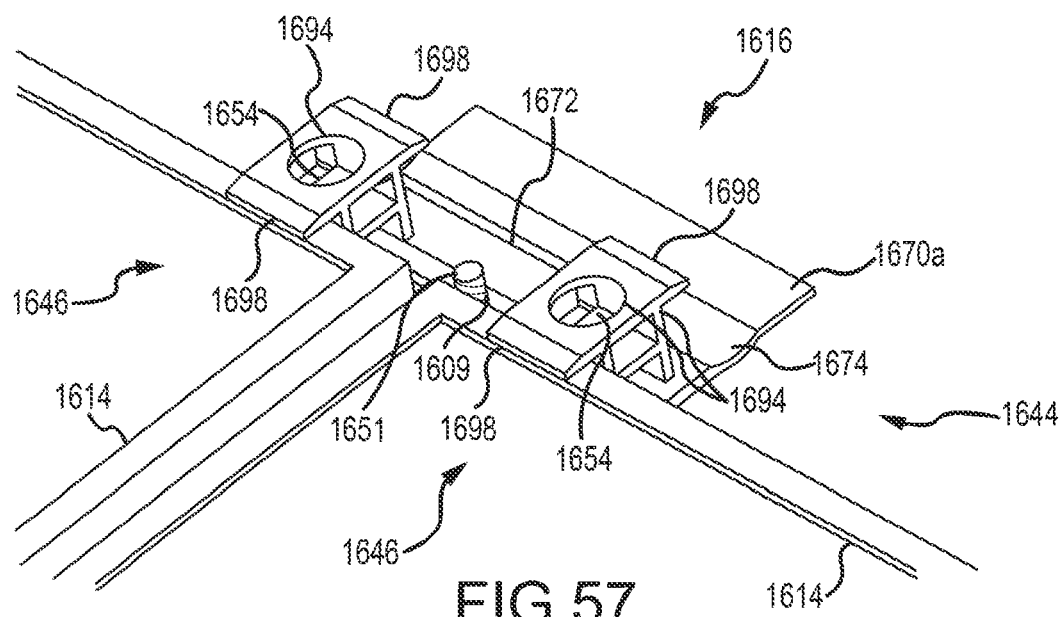
FIG. 57 is a perspective view of the mounting bracket of FIG. 52 coupled to two solar panels on a second support surface.
Figure 58:
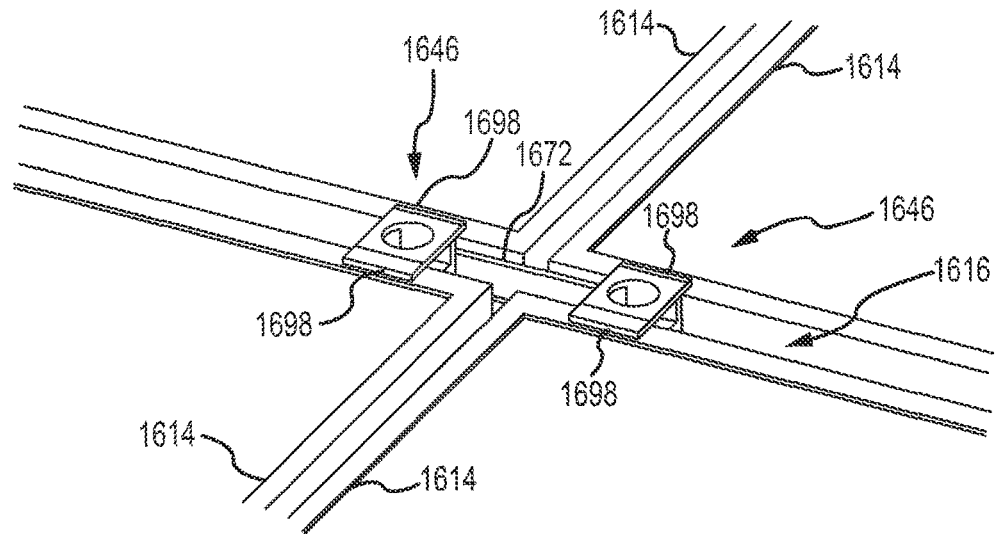
FIG. 58 is a perspective view of the mounting bracket of FIG. 52 coupled to four solar panels.
Figure 59:
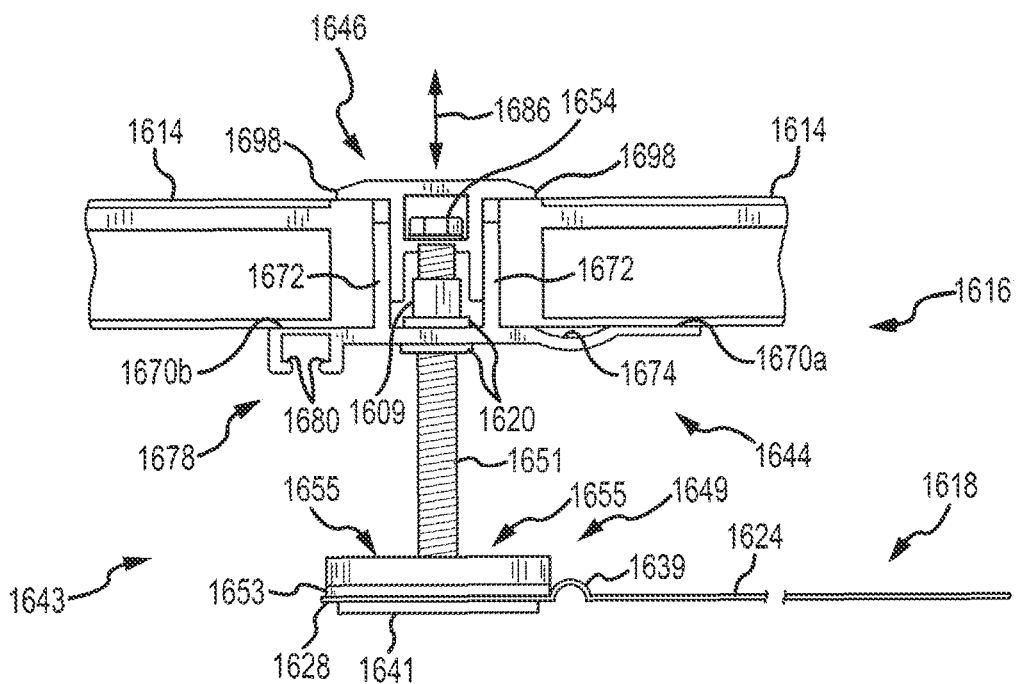
FIG. 59 is a side view of the mounting bracket of FIG. 58 including a flashing.

In some embodiments, the flashing 18 may be illustrated as flashing 1618 (FIGS. 52 and 59). The illustrated flashing 1618 is substantially defined as a rectangular member of sheet metal and is coupled between the roof 12 and the mounting bracket 1616. In particular, the flashing 1618 is positioned (e.g., sandwiched) between adjacent roof shingles (not shown) of the roof 12. The illustrated flashing 1618 includes a first portion 1624, a second portion 1628, an intermediate portion 1639 and a coupling mechanism 1641. The first portion 1624 and the second portion 1628 are separated by the intermediate portion 1639, and the illustrated first portion 1624 includes a larger surface area than the second portion 1628. The illustrated intermediate portion 1639 is a curvilinear protrusion that extends towards the mounting bracket 1616 (e.g., away from the roof 12). In other embodiments, the intermediate portion 1639 may be differently constructed to distinguish the first portion 1624 from the second portion 1628. The illustrated coupling mechanism 1641 is coupled to a bottom surface of the second portion 1628 and located between the roof 12 and the flashing 1618. In the illustrated embodiment, the coupling mechanism 1641 is doubled sided tape to secure the flashing 1618 to the roof 12 without penetrating the roof (e.g., with a fastener); however, in other embodiments, the coupling mechanism 1641 may be any suitable adhesive. In further embodiments, the coupling mechanism 1641 may be a clip that couples the second portion 1628 to a single roof shingle.

The illustrated mounting bracket 1616 includes a first clamp portion 1644, second clamp portions 1646, an adjustment assembly 1648 and a support structure 1643. The mounting bracket 1616 is coupled to the roof 12 by the support structure 1643. The first clamp portion 1644 is moveable relative to the flashing 1618 in an upward direction and a downward direction parallel to a first axis 1686 (FIG. 59). The illustrated first clamp portion 1644 includes a first support surface 1670a and a second support surface 1670b. In the illustrated embodiment, the first support surface 1670a includes a concave recess 1674.

The illustrated first clamp portion 1644 includes a tool aperture 1645, a central aperture 1626 and first and second threaded apertures 1682. The illustrated tool aperture 1645 is located between a threaded aperture 1682 and the central aperture 1626 whereas the central aperture 1626 is located between the first and the second threaded apertures 1682. In other embodiments, the first clamp portion 1644 may include two tool apertures 1645 located on respective sides of the central aperture 1626.

The illustrated first clamp portion 1644 also includes walls 1672 that extend substantially normal to the first and second support surfaces 1670a, 1670b. The walls 1672 abut the second clamp portions 1646 so that the second clamp portions 1646 are inhibited from rotating relative to the first clamp portion 1644.

In addition, the second support surface 1670b includes a channel 1678 having ridges 1680. In some embodiments, the skirt 21 is coupled to the mounting bracket 1616 by engagement with the channel 1678 and the ridges 1680.

The second clamp portions 1646 are illustrated as two distinct members that respectively align with the first and the second threaded apertures 1682. The second clamp portions 1646 are moveable relative to the first clamp portion 1644 in the upward direction and the downward direction parallel to the first axis 1686. Each of the illustrated second clamp portions 1646 include a first aperture and a second aperture 1694 positioned above the first aperture. In addition, each of the illustrated second clamp portions 1646 include clamping protrusions 1698. In other embodiments, the second clamp portions 1646 may be constructed as one integral member with an aperture aligning with the central aperture 1626 and an aperture aligning with the tool aperture 1645.

The adjustment assembly 1648 includes securing fasteners 1654. The securing fasteners 1654 connect the second clamp portions 1646 to the first clamp portion 1644. The securing fasteners 1654 substantially align with a respective one of the first and second threaded apertures 1682.

The illustrated support structure 1643 supports the first clamp portion 1644 at a desired height above the flashing 1618 and ultimately the roof 12. The illustrated support structure 1643 includes a base 1649, a stud 1651 and an adjustment nut 1609. The illustrated base 1649 is generally defined as a cylindrical disk that is configured to abut the flashing 1618 and includes a bottom portion 1653 and a plurality of grooves 1655. Particularly, the bottom portion 1653 is in direct contact with the flashing 1618 and is constructed from material that increases the coefficient of friction between the base 1649 and the flashing 1618. For example, the bottom portion 1653 may be manufactured as an adhesive, sand paper type material, or the like to grip a surface of the flashing 1618. The illustrated grooves 1655 are radially spaced on a circumference of the base 1649. In the illustrated embodiment, the base 1649 includes six grooves equally spaced apart; however, in other embodiments, the base 1649 may include more or less than six grooves. Additionally, the base 1649 is rotatable such that one of the grooves 1655 is moveable into alignment with the tool aperture 1645.

The illustrated stud 1651 includes external threads and couples the base 1649 to the first clamp portion 1644. The illustrated stud 1651 is substantially centrally attached and rotatably fixed to the base 1649. The central aperture 1626 is sized to receive the stud 1651.

The illustrated adjustment nut 1609 extends through the central aperture 1626 and is rotatable relative to the first clamp portion 1644. However, the adjustment nut 1609 is inhibited from movement relative to the first clamp portion 1644 along the first axis 1686 by projections 1620. The illustrated projections 1620 are located on opposite surfaces (i.e., top and bottom) of the first clamp portion 1644 adjacent the central aperture 1626. The projections 1620 radially extend from the adjustment nut 1609. In addition, the adjustment nut 1609 is sized to receive a standard sized wrench or socket wrench.

The illustrated mounting bracket 1616 also includes a tool 1659. The tool aperture 1645 is sized to receive the tool 1659. In addition, the grooves 1655 are sized to receive a portion of the tool 1659. In the illustrated embodiment, the tool 1659 is a round rod with a bent end. In some embodiments, the tool 1659 is an Allen wrench, a threaded rod or a fastener.

In operation, the support surfaces 1670a, 1670b support the corners of the solar panels 14 at a desired height above the flashing 1618 and ultimately the roof 12. The first clamp portion 1644 is moveable relative to the flashing 1618 and the roof 12 along the first axis 1686 upon rotation of the adjustment nut 1609. In particular, the tool 1659 is received within the tool aperture 1645 so a portion of the tool 1659 engages one of the grooves 1655. Consequently, the tool 1659 inhibits relative rotation between the base 1649 and the first clamp portion 1644. As the adjustment nut 1609 is rotated (by a standard socket wrench or the like), the projections 1620 move the first clamp portion 1644 along the first axis 166. To install the solar panels 14 onto the mounting bracket 1616, one of the solar panels 14 is positioned on the second support surface 1670b in abutting relationship with the wall 1672. Each of the second clamp portions 1646 engages a portion of the respective solar panel 14 via the clamping protrusions 1698. The securing fasteners 1654 are tightened to clamp the solar panels 14 between the clamp portions 1644, 1646 to secure the solar panels 14 to the mounting bracket 1616. Another solar panel 14 is positioned on the first support surface 1670a in abutting relationship with the other wall 1672 by utilizing the concave recess 1674. In particular, an edge of the solar panel 1614 is positioned within the concave recess 1674 such that the solar panel 14 is orientated at an acute angle relative to the first support surface 1670a. The solar panel 14 is then rotated towards the flashing 1618 to abut the wall 1672 and the first support surface 1670a. The flashing 1618 is retained on the roof 12 because the intermediate portion 1639 is positioned upslope of the base 1649. The bottom portion 1653 of the base 1649 and the coupling mechanism 1641 also retain the flashing 1618 on the roof 12. Therefore, the flashing 1618 is retained on the roof 12 without using a fastener that penetrates the flashing 1618 and roof 12.

Figure 60:
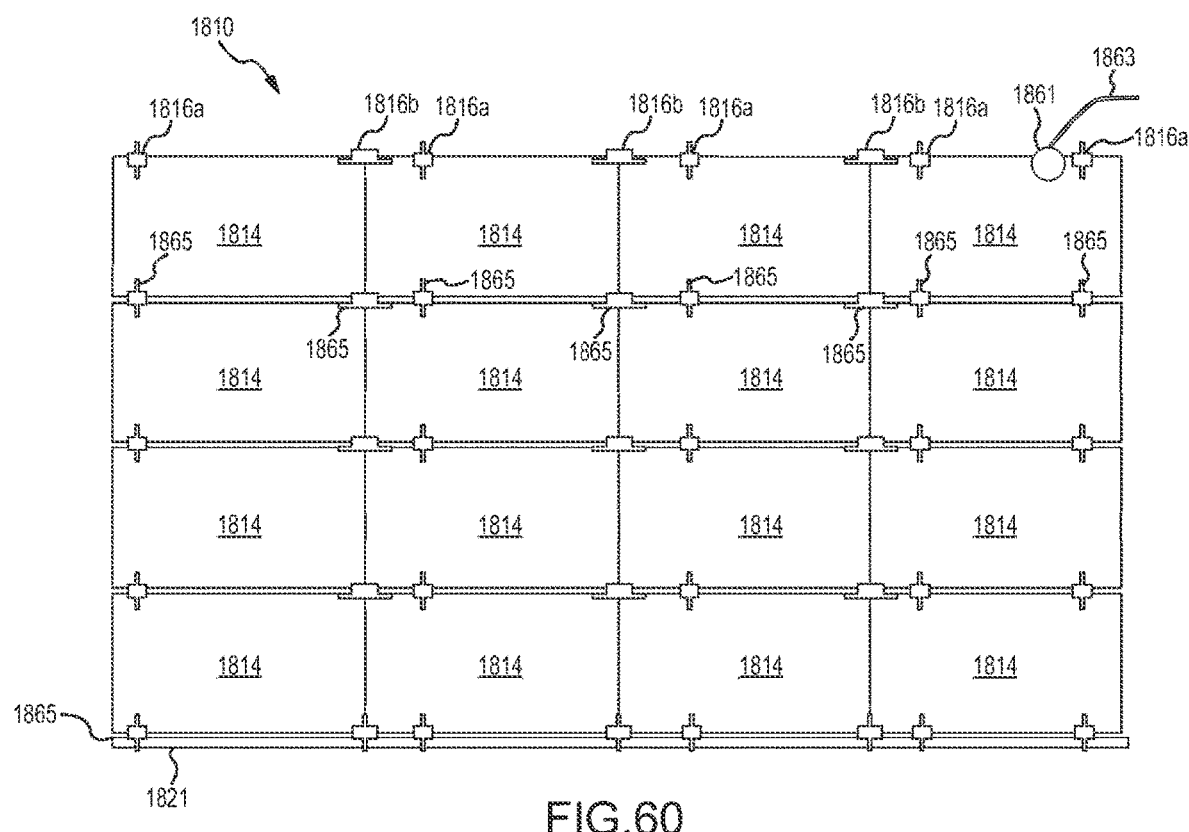
FIG. 60 illustrates an electrical grounding circuit according to some embodiments of the invention.
Figure 61:
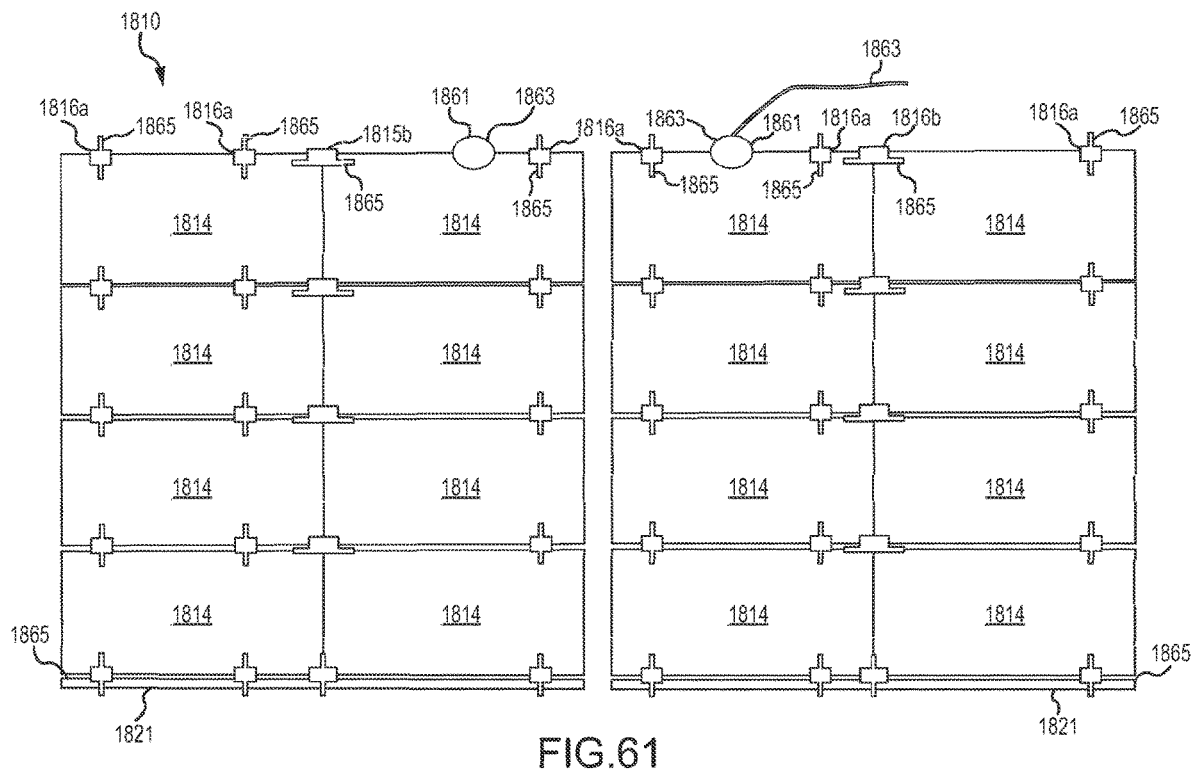
FIG. 61 illustrates an electrical grounding circuit according to some embodiments of the invention.

With reference to FIGS. 60 and 61, a roof mount system 1810 can be electrically grounded (e.g., earth grounding) via a grounding lug 1861 and grounding wire 1863. The grounding lug 1861 is directly coupled to one of the solar panels 1814, and the grounding wire 1863 is electrically coupled to the grounding lug 1861 and is coupled to the earth (e.g., ground). The illustrated solar panels 1814 are coupled to the roof 12 by mounting brackets 1816a. The illustrated mounting brackets 1816a may be anyone or a combination of the mounting brackets 16,216,416, 616, 816, 1016, 1216. In addition, the illustrated solar panels 1814 are coupled to each other by mounting brackets 1816b. The illustrated mounting brackets 1816b may be anyone or a combination of the mounting brackets 1416, 1616. Also, the roof mount system 1810 includes a skirt 1821, which is similar to the skirt 21, 821, 1221, 1421. The mounting brackets 1816a, 1816b and the skirt 1821 provide a grounding path 1865 between adjacent solar panels 1814 to electrically couple every solar panel 1814 to the grounding lug 1861.

With reference to FIG. 61, two adjacent roof mount systems 1810 are electrically coupled and grounded. Each roof mount system 1810 includes a grounding lug 1861 coupled to a single solar panel 1814. The illustrated grounding path 1865 electrically couples every solar panel 1814 together within a respective roof mount system 1810. Both grounding lugs 1861 are electrically coupled together by the grounding wire 1863, and the grounding wire 1863 also couples one grounding lug 1861 to the earth to completely ground both roof mount systems 1810.

In some embodiments, electrical bonding is achieved by cutting into one or more of the solar panel frames with one or more pins or screws coupled to the mounting bracket 16, 216, 416,616, 816, 1016, 1216, 1416, 1616, 1816a, 1816b. In some embodiments, electrical bonding is achieved by cutting into one or more of the solar panel frames by press-fitting the solar panel frame into the mounting bracket 16,216,416, 616, 816, 1016, 1216, 1416, 1616, 1816a, 1816b and/or deforming the solar panel frame with the mounting bracket 16,216,416, 616, 816, 1016, 1216, 1416, 1616, 1816a, 1816b. In some embodiments a stainless steel element pin, screw or protrusion is utilized to form an electrical bond between the respective solar panel and mounting bracket 16,216,416, 816, 1016, 1216, 1416, 1616, 1816a, 1816b. In some embodiments, the skirt 21, 821, 1221, 1421, 1821 is a snow guard that inhibits snow from sliding down the solar panels. In some embodiments, the skirt 21, 821, 1221, 1421, 1821 is a snow guard and an electrical ground for at least one of the solar panels.

What is claimed is:

1. A roof mount comprising:
a slide extending along a second axis;
a standoff moveable along the slide;
an adjustment assembly comprising a stud and a nut, the stud extending from the standoff,
the stud comprising a first part having a threaded length extending along a first axis, wherein the second axis extends substantially perpendicular to the first axis,
a locking bolt acting to restrict movability of the standoff along the slide to fix a location of the standoff along the slide, the stud being fixed in a specific location on the second axis in response to tightening the locking bolt;
a clamp connected to the standoff by the stud and spaced above the slide a distance, the distance between the clamp and the slide along the second axis being adjustable,
the clamp comprising,
a bottom part having a first bottom support surface operable to support a first solar panel, the first bottom support surface comprising a recess, and
a second bottom support surface operable to support a second solar panel,
a top part having a first top flange positioned at a first height relative to the first bottom support surface, and
a second top flange positioned at a second height relative to the second bottom support surface, and
a fastener operable to adjust the first height and the second height in order to clamp the first panel and the second panel between the top part and the bottom part, and
an access to adjust the clamp along the first axis, the access defined between the first top flange and the second top flange.

2. The roof mount of claim 1, wherein the clamp is a unitary, monolithic component.

3. The roof mount of claim 1, further comprising an adjustment assembly.

4. The roof mount of claim 2, wherein the adjustment assembly comprises a nut.

5. The roof mount of claim 2, wherein the adjustment assembly is accessible to a user through the access.

6. The roof mount of claim 2, wherein the adjustment assembly is adjustably coupled to the stud.

7. The roof mount of claim 1, wherein the clamp comprises a wall disposed between the first top flange and the second top flange.

8. The roof mount of claim 1, wherein the recess defines a curvilinear depression.

* * * * *